United States Patent
Ibe et al.

(10) Patent No.: US 6,437,804 B1
(45) Date of Patent: Aug. 20, 2002

(54) METHOD FOR AUTOMATIC PARTITIONING OF NODE-WEIGHTED, EDGE-CONSTRAINED GRAPHS

(75) Inventors: Oliver Ibe, Andover, MA (US); Vick Vaishnavi, Danville; Roger Dev, Durham, both of NH (US)

(73) Assignee: Aprisma Management Technologies, Inc, Portsmouth, NH (US)

( * ) Notice: Subject to any disclaimer, the term of this patent is extended or adjusted under 35 U.S.C. 154(b) by 0 days.

(21) Appl. No.: 08/956,831

(22) Filed: Oct. 23, 1997

(51) Int. Cl.[7] ................................................ G09G 5/00
(52) U.S. Cl. ........................ 345/736; 709/223; 345/853
(58) Field of Search ................................. 345/340, 345, 345/334, 435, 969, 348, 356, 765, 744, 804, 734, 736, 853, 854; 709/223, 224

(56) References Cited

U.S. PATENT DOCUMENTS

| | | | | |
|---|---|---|---|---|
| 5,448,727 A | * | 9/1995 | Annevelink | 707/101 |
| 5,748,844 A | * | 5/1998 | Marks | 706/45 |
| 5,794,224 A | * | 8/1998 | Yufik | 706/14 |
| 5,878,241 A | * | 3/1999 | Wilkinson et al. | 712/203 |
| 5,926,632 A | * | 7/1999 | Kawaguchi | 716/7 |

OTHER PUBLICATIONS

Welch et al. "Metrics and Techniques for Automatic Partitioning and Assignment of Object-based Concurrent Programs", pp. 440–447, 1995.*

Pothen, A. et al., "Partitioning Sparse Matrices with Eigenvectors of Graphs," SIAM J.of. Matrix Analysis. and Applications, 11(3):430–452 (1990).

Miller, G. et al. "A Unified Geometric Approach to Graph Separators," *Proc of 32nd Annual Symposium on Foundation on Foundation of Computer Sci.*, 538–547 (1991);.

Cheng, C. and Y. Wei, "An Improved Two-way Partitioning Algorithm with Stable Performance," *IEEE Trans on Computer–Aided Design*, 10(12):1502–1511 (1991).

Hagen, L. and A. Kahng, "Fast Spectral Method for Ratio Cut Partitioning and Clustering," *Proc. of IEEE International Conf on Computer–Aided Design*, 10–13 (1991).

Hagen, E. and A. Kahng "A New Approach to Effective Circuit Clustering," *Proc of Proc of IEEE International Conf on Computer–Aided Design*, 422–427 (1992).

Garbers, J. et al., "Finding Clusters in VLSI Circuits," *Proc. of IEEE International Conf on Computer–Aided Design*, 520–523 (1990).

Karypis, G. and V. Kumar, "A Fast and High Quality Multilevel Scheme for Partitioning Irregular Graphs," Technical Report 95–035, Dept. of Computer Sci., Univ of Minn.., Minnesota, MN (1995).

* cited by examiner

*Primary Examiner*—Raymond J. Bayerl
*Assistant Examiner*—Tadesse Hailu
(74) *Attorney, Agent, or Firm*—Paul M. Coryea

(57) ABSTRACT

According to an embodiment of the present invention, a method is provided for partitioning a network, comprising modeling the network as a graph comprising nodes which represent network devices, and edges which represent links between the devices, and automatically partitioning the graph into domains. One embodiment of the method includes identifying a number of anchor nodes in the graph and partitioning the domains around the anchor nodes such that each domain contains only one anchor node. Another embodiment of the method includes partitioning a graph without anchor nodes into a number of domains, and assigning controllers to each of the domains. Preferably, the method further includes assigning a weight to each node in the graph, and balancing the partitions as a function of the weight of each node in a respective partition.

29 Claims, 34 Drawing Sheets

| Nodes | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | - | 1 | 1 | | | | | | | | | | | |
| 2 | 1 | - | 1 | 1 | | | | | | | | | | |
| 3 | 1 | 1 | - | 1 | W | 1 | | | | | | | | |
| 4 | | 1 | 1 | - | 1 | | W | | | | | | | |
| 5 | | | W | 1 | - | 1 | | 1 | | | | | | |
| 6 | | | 1 | | 1 | - | | | 1 | | | | | |
| 7 | | | | W | | | - | | | 1 | 1 | | | |
| 8 | | | | | 1 | | | - | 1 | | W | 1 | | |
| 9 | | | | | | 1 | | 1 | - | | | 1 | | |
| 10 | | | | | | | 1 | | | - | 1 | | 1 | 1 |
| 11 | | | | | | | 1 | W | | 1 | - | | | 1 |
| 12 | | | | | | | | 1 | 1 | | | - | | 1 |
| 13 | | | | | | | | | | 1 | | | - | 1 |
| 14 | | | | | | | | | | 1 | 1 | 1 | 1 | - |

Fig. 4

METHOD FOR AUTOMATIC PARTITIONING OF NODE-WEIGHTED, EDGE-CONSTRAINED GRAPHS

BACKGROUND OF THE INVENTION

1. Field of the Invention

This invention relates generally to automatic partitioning of graphs and more particularly to automatic partitioning of communication networks and other physical systems.

2. Discussion of the Related Art

Many physical systems can be modeled by a graph. These include communication networks, distributed computing systems, production systems and printed circuit board layouts.

Graph partitioning belongs to a class of problems called NP-complete problems (Garey, M. R. and D. S. Johnson, *Computers and Intractability: A Guide to the Theory of NP Completeness*, W.H. Freeman & Co., 1979). An NP-complete problem is a problem which can only be solved by the complete enumeration of all the feasible solutions (i.e., those that satisfy all the constraints imposed on the problem) from which the best solution will be chosen. This is a very inefficient method of solving large problems. Unfortunately, there is no known efficient method of solving this class of problems, and this has often necessitated the use of heuristic methods. Heuristic methods are intended to produce good, but not necessarily optimal, solutions.

One of the earliest methods of solving the problem is the spectral partitioning method (Pothen, A. et al., "Partitioning Sparse Matrices with Eigenvectors of Graphs," SIAM J. of Matrix Analysis. and Applications, 11(3):430–452 (1990); Hendrickson, B. and R. Leland, "A Multilevel Algorithm for Partitioning Graphs," Technical Report, SAND93-1301, Sandia National Labs (1993)). However, this method is very expensive since it requires the computation of the eigenvector corresponding to the second smallest eigenvalue. Thus, the method is limited in practice to graphs of very small sizes.

Another method of solving the problem is the geometric partitioning method (Miller, G. et al., "A Unified Geometric Approach to Graph Separators," *Proc of 31st Annual Symposium on Foundation of Computer Sci.*, 538–547 (1991); Heath, M. and P. Raghavan, "A Cartesian Nested Dissection Algorithm," Tech. Report UIUCDCS-R-92-1772, Dept. of Computer Sci., Univ. of Ill., Urbana, Ill. (1992); Nour-Omid, B. et al., "Solving Finite Element Equations on Concurrent Computers," *Am. Soc. of Mech. Engineers*, 291–307, (A. K. Noor, ed. 1986)). However, this method provides partitions that are worse than those of the spectral method. A major limitation of this method is that it requires knowledge of the coordinates of the vertices of the graph. Unfortunately, in many areas, such as communication networks and VLSI design, there is no geometry or "coordinates" associated with the graph.

A multilevel partitioning method has also been proposed (Bui, T. and C. Jones, "A Heuristic for Reducing Fill in Sparse Matrix Factorization," *Proc. of 6th SIAM Conf. on Parallel Processing for Scientific Computing*, 445–452 (1993); Cheng, C. and Y. Wei, "An Improved Two-way Partitioning Algorithm with Stable Performance," *IEEE Trans on Computer-Aided Design*, 10(12):1502–1511 (1991); Hagen, L. and A. Kahng, "Fast Spectral Method for Ratio Cut Partitioning and Clustering," *Proc of IEEE International Conf on Computer-Aided Design*, 10–13 (1991); Hagen, E. and A. Kahng, "A New Approach to Effective Circuit Clustering," *Proc of IEEE International Conf on Computer-Aided Design*, 422–427 (1992); Garbers, J. et al., "Finding Clusters in VLSI Circuits," *Proc. of IEEE International Confon Computer-Aided Design*, 520–523 (1990); Karypis, G. and V. Kumar, "A Fast and High Quality Multilevel Scheme for Partitioning Irregular Graphs," Technical Report 95-035, Dept. of Computer Sci., Univ of Minn., Minnesota, Minn. (1995)). This method coarsens the graph (i.e., reduces the size of the graph) by collapsing the nodes and edges; it partitions the smaller graph, and then uncoarsens it to construct a partition of the original graph. Unfortunately this method is very complicated and has not yet been shown to be better than the other two methods.

In all the above methods, it is assumed that the graph is not weighted. This means that all the nodes are essentially identical and the only objective is to partition the graph to generate an equal number of nodes in each partition. When weights are associated with either the nodes or the edges, none of these methods will work adequately. Moreover, the cost of solving the problem will be very high. None of these methods has been proposed for use in a communication network.

SUMMARY OF THE INVENTION

The present invention is a method for automatically partitioning node-weighted, edge-constrained graphs. In contrast with the prior art, the present invention automatically manipulates the nodes of a graph to partition the graph without the need for manually configuring each node. The present invention uses a software control mechanism to partition the graph and, if necessary, to re-partition the graph, without the need to manually intervene in the configuration of the network.

According to one embodiment of the present invention, a method is provided for partitioning a network comprising modeling the network as a graph comprising nodes which represent network devices, and edges which represent links between the devices, and automatically partitioning the graph into domains. Preferably, the method further includes a step of assigning a weight to each node in the graph, and the partitioning step includes balancing partitions as a function of the weight of each node in a respective partition.

In another embodiment of the invention, a method is provided for developing a partitioning scheme for a communication network having a plurality of interconnected devices. The method includes automatically determining a topology of the communication network, automatically partitioning the communication network into a number of domains, each including a number of the plurality of devices, and informing each of the number of devices in each of the domains of partitioning information.

In another embodiment of the invention, a method is provided for automatically partitioning a graph into domains, the graph having a plurality of nodes interconnected by a plurality of edges. The method includes identifying a number of anchor nodes in the graph, combining the nodes into a number of control groups which number is the same as the number of domains, such that each control group includes only one anchor node.

In yet another embodiment of the invention, a method is provided for operating a partitioned communication network having a plurality of network devices interconnected by a plurality of communication links. The method comprises detecting a failure of a network device, automatically generating a new partition based on a topology of the network without the failed device and operating the communication network using the automatically-generated partition. The automatic generating step includes determining the topology of the network without the failed device. The topology is a graph representation of the communication network having nodes representing the network devices and edges representing the communication links. The method further includes identifying supernodes in the graph representation, forming a plurality of clusters of nodes based on the identified supernodes and generating new domains based on the clusters.

Such an automated system has the advantage that it can have a built-in mechanism that allows the network control agents to monitor one another's status. They cooperatively take over the control of a domain whose control agent has failed. Similarly, when the failed device comes up again, the other agents relinquish control of its domain.

Another advantage of an automated system is load balancing. A manually configured system is generally static and does not respond easily to the load changes in the system. An automated system partitions the system into as many domains as there are available control agents and ensures that each agent has a fair share of the load (or traffic). Typically, there is in the background a continuous monitoring of the load distribution among the different agents and the domain boundaries are periodically adjusted to reflect the changes in the system.

In yet another embodiment of the invention, a domain partitioning engine is provided which includes means for receiving a representation of a graph comprising nodes and edges, means for identifying supernodes and means, responsive to the means for identifying, for automatically partitioning the graph into a number of domains. Preferably, the engine further comprises means for assigning a weight to each node in the graph, and the means for partitioning includes means for balancing the partitions as a function of the weights of each node in a respective partition.

In yet another embodiment of the invention, a method for automatically partitioning graphs is provided, wherein a number of anchor nodes are identified, supernodes are formed from nodes in the graph and clusters are formed from the supernodes around each of the anchor nodes, such that each cluster includes only one anchor node. The weights of the clusters are balanced and domains are generated from the clusters.

These and other features and advantages shall appear from the following detailed description of the present invention.

BRIEF DESCRIPTION OF THE DRAWINGS

FIG. 4 is an adjacency matrix in accordance with the present invention;

DETAILED DESCRIPTION

Figure 1A:
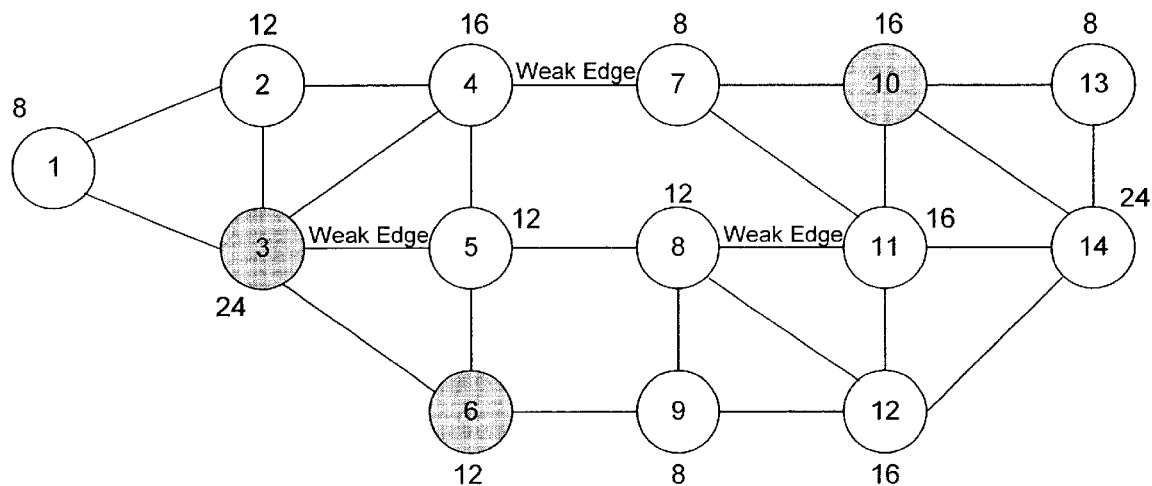
FIG. 1A illustrates an example of a weighted graph.

Communication networks can be modeled as a graph. In the case of a communication network, the nodes of the graph represent the network devices (e.g., hubs, switches, routers, bridges) and the edges of the graph represent the links or communication channels interconnecting the network devices.

The control of a large communication network may then be achieved by partitioning the network into smaller units or sub-networks called control domains (or domains, for short) with each domain being managed by a control agent. Several criteria can be used to effect the partitioning. Partitioning may be done to minimize the communication flow across domains. The desired number of partitions may or may not be known a priori and any node can be in any domain as long as the goal of minimizing the flow across domains is achieved.

For communication networks, the partitioning process is done manually in the prior art. The techniques which are typically used in partitioning prior art switched networks is the same as the manual techniques used to partition connectionless networks. This presents a lot of problems. One problem is an assumption that the number of control agents is known a priori. In the event of failure of one agent, however, a section of the system is left without a controller (or control agent). It would thus be desirable to provide a method for automatically partitioning a communication network to provide efficient distribution and use of nodes for an initial assignment of partitions, for recovery from failure of a control agent, as well as other reasons apparent from this disclosure.

In one embodiment of the present invention, a method for automatically partitioning a graph is provided. This embodiment may be used, for example, to automatically partition nodes in a communication network. While the following discussion is presented in the context of partitioning of a communication network, this is not intended as limiting.

Consider a communication network consisting of N switches interconnected by communication links in an arbitrary manner. Assume that the switches are labeled $1, 2, \ldots, N$, and switch i ($i=1, \ldots, N$) has a value $v_i$. Several criteria can be used to assign a value $v_i$ to a switch. For example, $v_i$ can be proportional to the number of ports on the switch; it can denote a measure of the expected total traffic seen by the switch; or it can denote the number of functions provided by the switch. Whatever criteria is used to assign value, in the embodiment described below, if $v_i > v_j$, for all i not equal to j, then switch i is considered more functionally capable than switch j. Finally, there are anchor nodes to which are attached copies of a network management agent. The number of anchor nodes is typically considerably less than N.

Several criteria can also be used to classify the links. One such criterion is the capacity of the link (or its bandwidth or information carrying power). Links may be classified into three types: normal links (which have average capacity), strong links (which have very large capacity), and weak links (which have smaller than average capacity). Other criteria may reflect a current communication load carried by the link.

Partitioning of the network may be modeled by a weighted graph in which the nodes of the graph denote the switches, the edges of the graph denote the communication links, and the weight of a node of the graph denotes the number of ports each node supports. Thus, two nodes of the graph will be adjacent (i.e., connected by an edge) if the two switches they represent are connected by a link, i.e., a communication channel which may be a physical link such as a cable (optical, electrical or otherwise), or even a wireless link made over the air waves.

FIG. 1A shows an example of a communication network modeled as a graph. The circles represent the nodes and the lines between circles represent the edges of the graph. The number beside each node denotes its weight while identification numbers are placed inside the nodes. Shaded nodes 3, 6 and 10 are anchor nodes. Edges (3, 5), (4, 7), and (8, 11) are weak links, while all other links are normal links.

In practice, there may be certain restrictions to including a node in a particular domain. For example, there may be instances where two adjacent nodes need to be in different domains. One reason for this may be that the two nodes are interconnected by a low-capacity link that would be a bottleneck for intra-domain traffic routing. (Assuming that intra-domain traffic is usually heavier than inter-domain traffic.) Therefore, it may be preferable that the high-capacity links be used for intra-domain traffic while limiting the low-capacity links to inter-domain traffic. Also, experience may show that the traffic across a link between two switches is so small that the nodes can essentially be considered unconnected. Because such restrictions affect the location of nodes among domains, these parameters may be referred to as "edge constraints." A good partitioning algorithm should be robust enough to handle such restrictions.

Another problem often encountered in real networks is that the control agents that manage the domains may be physically attached to select nodes, and thus these select nodes must be located in the domain managed by the attached agent. A node on which a control agent is attached is defined as an "anchor node." A good partitioning algorithm should be robust enough to handle networks with anchor nodes and in such cases, the number of domains depends on the desired number of control agents, i.e., the number of anchor nodes. In practical effect the domain to be managed by a control agent may need to be centered around its anchor node. However, a graph may be partitioned without knowledge of the existence or location of anchor nodes. In this case, the control agents may be assigned to domains after the graph has been partitioned.

Partitioning a Communication Network

Figure 1B:
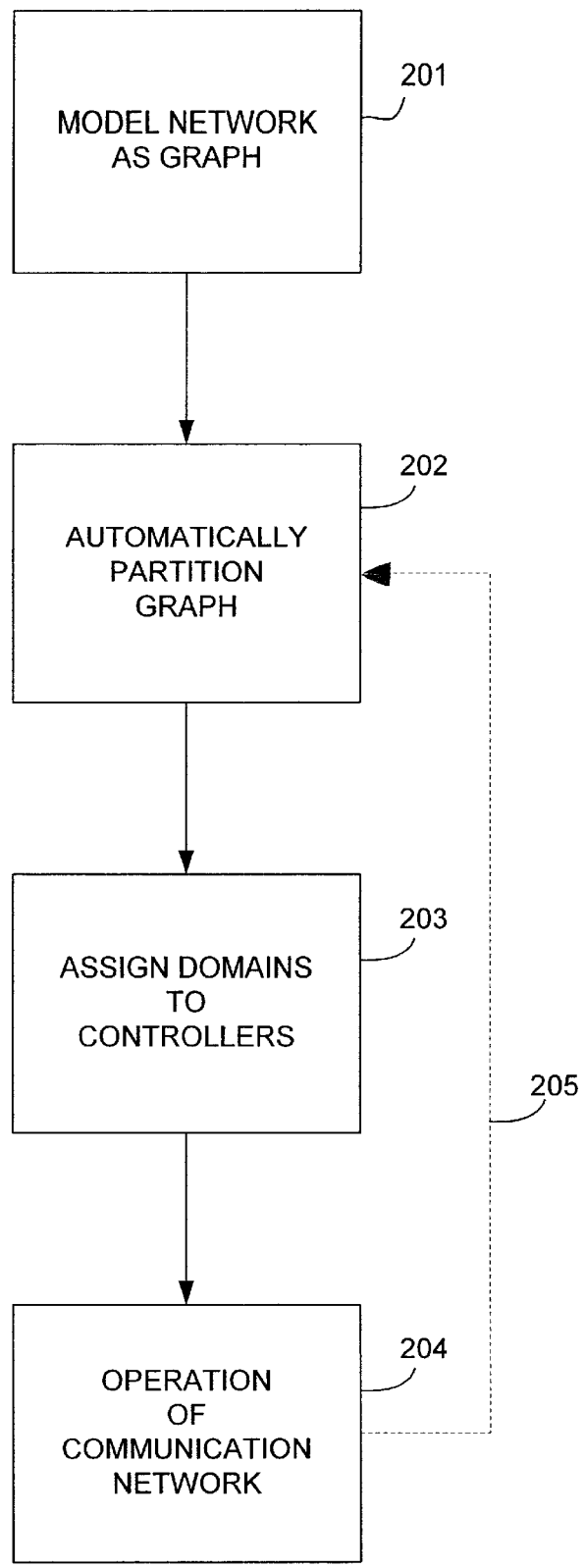
FIG. 1B illustrates one method of partitioning a communication network, according to the present invention.

FIG. 1B illustrates a method of partitioning nodes in a communication network. At a step 201, the network is modeled as a topology, as generally described above. As discussed above, switches are represented as nodes in the graph and communication links are represented as edges of the graph. Edges and/or nodes may be assigned a weight, based on communication capacity or some other parameter. The step 201 may include the step of determining the network topology.

At a step 202, this graph is automatically partitioned. Certain embodiments of processes for automatic partitioning are described in greater detail below.

In one embodiment, partitioning is performed within a partitioning engine in a Network Management Server (NMS) (the engine being software running on a general purpose computer used by the NMS). Such an NMS is described in U.S. Pat. No. 5,261,044, which patent is commonly owned by Cabletron Systems, Inc., Rochester, N.H., USA, and is incorporated herein by reference in its entirety.

Thus, at step 201, the NMS would discover the topology of the communication network. An automatic discovery tool which is used in the NMS is disclosed in U.S. patent application Ser. No. 08/115,232 filed on Sep. 1, 1993, which application is commonly owned with the present patent application and is incorporated herein by reference in its entirety. Once the topology of the network has been discovered, the network is automatically partitioned according to the present invention, at step 202.

In another embodiment, each of the control agents may independently discover the network topology information and independently partition the graph. In such a situation, of course, it may be important that each control agent reach the same conclusions about how the network is partitioned into domains.

The partitioning process problem may (but need not) include one or more of the following parameters as desired characteristics of the partitioned graph/network:

1. The total value of the switches in each of the domains lies within a predefined range. For example, this range may be set to ensure that no one domain is overloaded while some others are lightly loaded. The limit also provides some elasticity in the system because if one strives to generate domains with equal values while meeting all the other conditions that will be defined here, the problem may not have a solution.

2. No two switches interconnected by a weak link are in the same domain. The rationale for this is that it is expected that most of the traffic in the network will be intra-domain traffic. Therefore, intra-domain links will be heavily used and thus are required to have a high capacity in order not to be a bottleneck in the system.

3. Any two switches interconnected by a strong link are required to be in the same domain. The reason for this is clear, based on the discussion in number 2 above.

4. There can be only one anchor node in each domain. Thus, the required number of domains is the number of anchor nodes.

After step 202, at a step 203, the domains (partitions of the graph) are assigned to control agents. This involves informing each control agent which switches are within that agent's domain. (In one embodiment, control agents are assumed to be at fixed points within the communication network. In another embodiment, assignment of control agents may take place as a result of the partitioning process.) Each domain may be assigned a primary control agent, which controls the domain during normal operation, and a secondary control agent, which takes over control of the domain if the domain's primary control agent malfunctions. The secondary control agent is typically the control agent which is closest (i.e. having the shortest hop count) to the primary control agent. In the event that the control agents are independently partitioning the network (each reaching the same conclusion), such a step may be omitted.

At a step 204, operation of the communication network may proceed. Operation of a communication network, given a partitioning of the network, is known in the art.

An arrow 205 indicates that, during operation of the network, automatic partitioning may resume. This may occur to serve one of two goals. First, partitioning may resume in response to detection of a change in the configuration of the network. For example, a new partitioning may be required after a link fails, the network topology is changed or an anchor switch (control agent) fails. Second, as described in greater detail below, the partitioning may be changed to achieve a more balanced communication load over links in the network. Thus, the partitioning process can respond to failed links or the discovery that a certain link in a configuration cannot handle its current communication load.

Automatic Partitioning

At step 202, the graph-model of the communication network is automatically partitioned. This may be done in a variety of ways.

Advantages in the automatic partitioning process may be achieved, according to the present invention, by one or more of the steps of: a) defining a good starting point for the partitioning process; and b) preventing the inclusion of any set of nodes or edges in the same domain.

Figure 2:
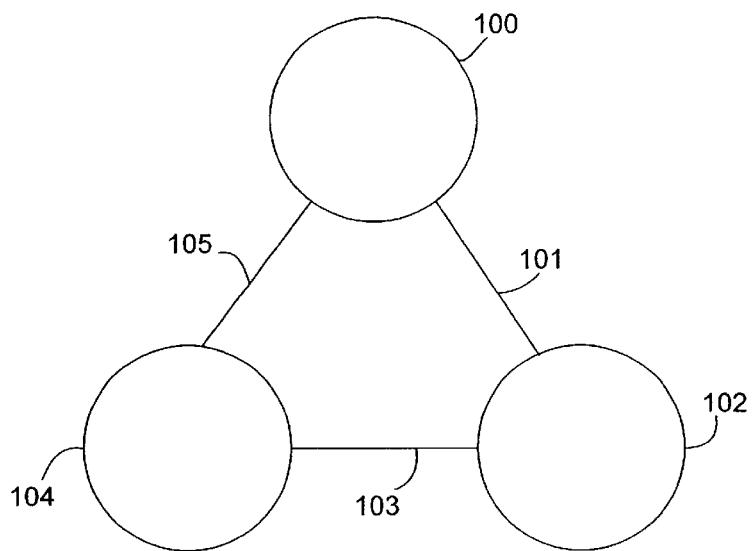
FIG. 2 illustrates a supernode consisting of three mutual adjacent nodes in accordance with one embodiment of the present invention.

One of the major difficulties in finding a solution to the graph partitioning problem is that of finding a good starting point for the partitions. One embodiment of the present invention overcomes this problem by defining the concept of a "supernode." A "supernode" is a set of nodes that are mutually adjacent to one another and there is no weak edge between any two members of the set (i.e. a fully connected graph with no weak edges). The simplest supernode is a triangular supernode or triplet. FIG. 2 shows a triplet consisting of three mutually adjacent nodes 100, 102 and 104 interconnected by links or edges 101, 103 and 105.

Another concept used in one embodiment is that of "clusters." "Cluster" simply refers to a set of nodes. In one embodiment, clusters are simply different sets of nodes that are formed and then adjusted until an acceptable partitioning of the graph is identified.

A node is considered "covered" if it is included in at least one supernode or one cluster; a node is "uncovered" if it is not included in a supernode or cluster. As described in greater detail below, a cluster is configured such that each node in the cluster is adjacent to at least two other nodes in the cluster. If any supernode shares two or more nodes with another supernode, the supernodes are combined into one cluster. If any supernode shares two or more nodes with a cluster, the supernode is absorbed into the cluster. If two clusters have a node in common, one cluster is shunk by removing the shared node from the cluster.

Partitioning Graphs with Anchor Nodes

One embodiment of a method of automatically partitioning a graph may generally be described with reference to FIG. 3A, the individual steps being discussed in greater detail below. In this embodiment, the presence of anchor nodes makes it unnecessary to construct clusters in an arbitrary manner.

These steps will be discussed in greater detail below, but the following overview may assist in understanding this embodiment. First, a range of weights is defined for the domains (step 11). This is usually the total weight of all nodes of the graph divided by the number of anchor nodes, plus or minus some tolerance. Triangular supernodes are then identified in the graph (step 13). After all triangular supernodes have been identified, all uncovered nodes are identified (step 15). At this time, an uncovered node is a node that is not included in any triangular supernode (at this point there are no clusters). All uncovered nodes are included in an uncovered node list for future reference when clusters are formed. If the number of uncovered nodes is more than half of the total number of nodes (step 16), an alternate method (steps 18–34, FIG. 3B) is followed, which is described below. Assuming the number of uncovered nodes is not more than half, a cluster is formed by starting with a first supernode that includes an anchor node (step 17). Any supernode that shares two nodes in common with the first supernode is absorbed into the first supernode to form a cluster. The cluster size is increased by merging it with any supernode which has two nodes in common with the cluster. This is continued until the cluster size cannot be increased any further, that is, until no supernode that has not been included in the cluster shares two nodes with the cluster. No supernode that includes another anchor node can be included in the cluster. Similarly, if the addition of a supernode to the cluster will cause the cluster to include a weak edge, that supernode will not be included in the cluster. The above step (17) is repeated for each anchor node without regard to whether a supernode has been included in another cluster or not. If an anchor node remains uncovered, the supernode definition is expanded to that of a pair of adjacent nodes connected via a non-weak link. Neighbor nodes are then selected with no in-between weak links, and are added to its cluster. The uncovered anchor node is then deleted from the uncovered node list.

The weight of each cluster is then found (step 19). If two clusters have a node in common, the node is assigned to a cluster according to an assignment scheme described below (steps 21, 23). Thus, clusters with unique memberships are generated.

The unincluded supernodes and uncovered nodes are then assigned to the clusters in a manner that ensures that no cluster weight lies outside the defined range and no weak edges are introduced into a cluster (steps 25, 27). If all nodes have been assigned to the clusters (step 29), the weight of each cluster is determined (step 31). If the weight of each cluster lies within the defined range (step 33), each cluster becomes a domain (step 35), and the problem has been solved. Otherwise boundary nodes are moved to balance the weights (step 37).

Each step described above will now be discussed in greater detail.

Figure 3A:
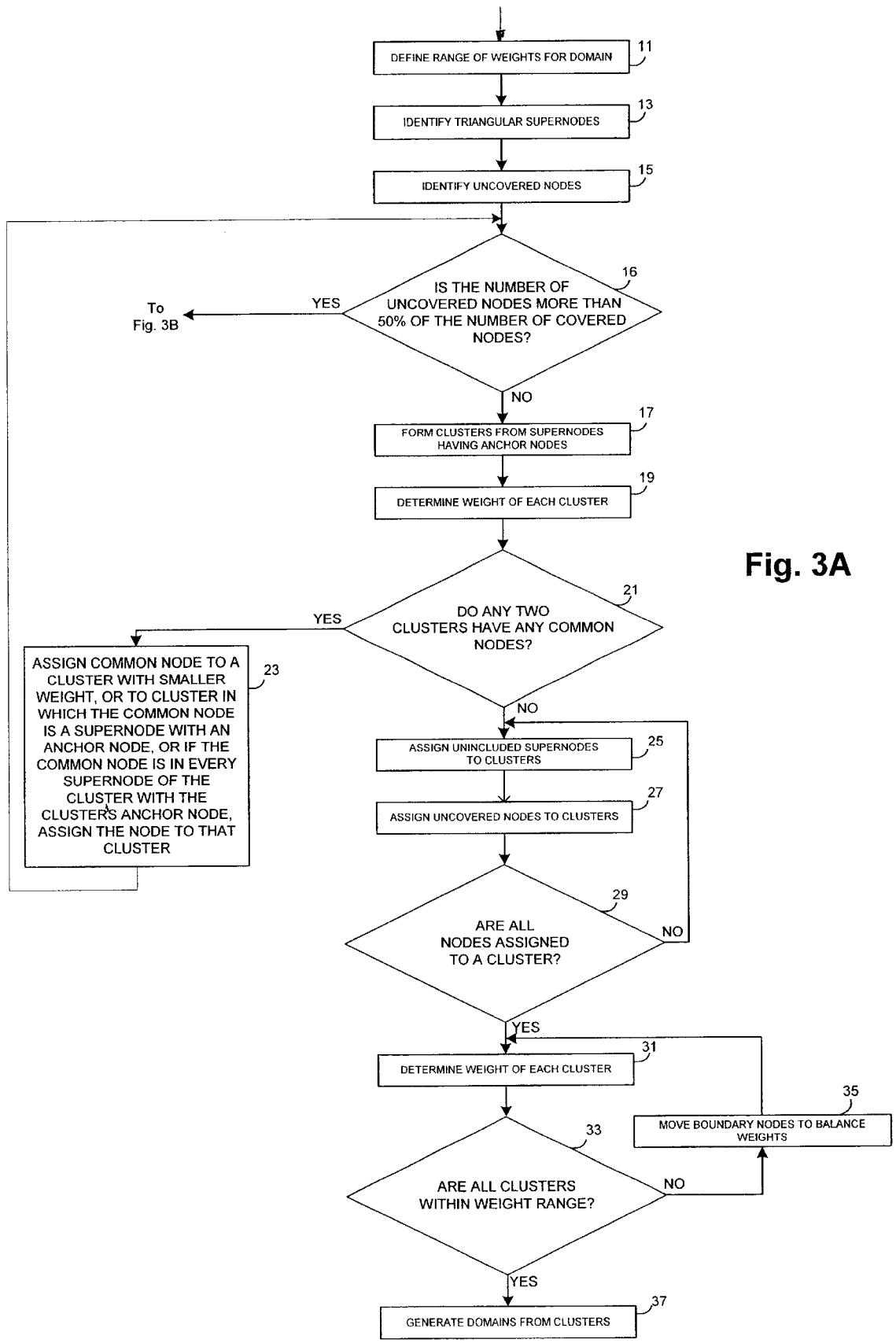
FIG. 3A is a flow diagram of a method performed in order to partition graphs having identified anchor nodes in accordance with the present invention.

Defining Weight Range (Step 11 of FIG. 3A)

To define the weight range, the following method may be used: Let "Tot_Wt" denote the total weight of all the nodes in the graph, and let "n" denote the number of anchor nodes in the graph. Let "Av_Wt"=Tot_Wt/n denote the average weight of a domain in an optimally partitioned graph. Let "Min_Wt" denote the smallest node weight, and "Max_Wt" denote the largest node weight. The range may be defined as:

Range=[Low_Range, Hi_Range], where

Low_Range=Av_Wt—Min_Wt

Hi_Range=Av_Wt+Min_Wt

The low end of the range is the theoretical optimum average minus the smallest weight in the graph, and the high end of the range is the theoretical average plus the smallest weight. Note that other definitions can be used. That is, tolerances other than the smallest weight can be used. In the event that no partitioning is found that meets the tolerances, the method may incrementally increase the tolerance to permit a solution to be found.

Identification of Supernodes (Step 13 of FIG. 3A)

Step 13 of the method specifies identification of the supernodes. The triangular supernode is preferably used because it is the simplest structure with a dimension that is larger than two. Using a pair of nodes (i.e., dimension is 2) would involve listing every pair of adjacent nodes. On the other hand, using a structure of a higher dimensionality than three may lead to a more complex method, e.g., dealing with a graph that does not have such structures. For example, a supernode of dimensionality four is the quad: a four-node graph in which every node is adjacent to every other node. If these do not exist, this aspect of the method would not be helpful. Thus, in a preferred embodiment supernodes of three nodes are used and supernodes having 4 or more nodes are not.

An adjacency list of node i, $A_i$, is the set of nodes that are adjacent to node i. Graph adjacency information may be constructed in the form of an adjacency matrix such that if node i and node j are adjacent, the entry in row i, column j is 1; otherwise, it is zero. Thus, for example, the adjacency matrix for the graph of FIG. 1A is shown in FIG. 4. In the table, the zero-valued entries (representing non-adjacent nodes) have been left blank. Nodes which are adjacent to each other are marked with a "1" in the intersecting columns and rows. For example, node 2 is adjacent to nodes 1, 3 and 4. Adjacent nodes with weak edges interconnecting them have entries labeled "W" to indicate that, as much as possible, the two nodes should be in different domains. Also, although it is not shown, if two nodes are required to be in the same cluster, they are "lumped" into one node and not considered as separate nodes. The weight of the lumped node is the sum of the two node weights.

A supernode list is then constructed that contains the supernodes in the graph. The supernodes are generated as follows:

For each node i, the adjacency list is retrieved. Let $A_i$ denote the adjacency list for i, let $a_{ij}$ denote the $j^{th}$ entry in $A_i$, and let i denote the number of entries in $A_i$.

The supernodes are found as follows:

For each node i in the graph and for each node j for which $a_{ij}$ is not zero:

If node k is in the adjacency list of node i (i.e., $a_{ik}$ is not zero or W (weak)) and k is also in the adjacency list of j (i.e., $a_{jk}$ is not zero or W), then the triplet {i,j,k} is a supernode. Order the triplet (to make comparison easy) and if the ordered triplet is not in the supernode list, append it to the list; otherwise drop the triplet.

Continue until all triangular supernodes that include nodes i and j have been identified and added to the supernode list.

In step 15, FIG. 3A, the uncovered nodes are identified. That is, the nodes that are not included in any triangular supernode are identified as such.

The computational complexity of a method is a measure of the "efficiency" of the method; the more "complex" the method, the less efficient it is. The computational complexity of a method is determined by the number of operations the method requires to solve the problem. The operations include additions and multiplications, since all other operations are composites of additions and multiplications.

The largest number of operations in the present algorithm is incurred in the supernode formation. For an N-node, E-edge graph, let the maximum number of non-zero entries in the adjacency table (i.e., the largest degree of the graph) be d. Then the maximum number of comparisons required to generate all the supernodes associated with an arbitrary node is d(d−1)/2. This is obtained by observing that in the supernode generation process, for the first member of the adjacency list, d−1 comparisons are done to see if any of the other d−1 nodes is in its adjacency table. The next member of the list is then compared with the remaining d−2 members since it need not compared again with the first; (the ordering of the nodes in a supernode is not important). This is continued until the second to the last member is only compared with the last member; the number of operations is thus the sum of the first d−1 integers. Thus the process of generating all the supernodes requires at most $Nd^2$ comparisons. In conventional notation, the complexity of the supernode generation process is $O(Nd^2)$.

Even for a complete graph (in which every node is adjacent to every other node), this results in a complexity of $O(N^3)$. For graphs with sparse connectivity matrices (i.e., d is very small), the complexity is approximately linear in N; that is, the complexity is approximately O(aN), where a is some scale factor. An algorithm with a computational complexity that is linear in the number of nodes in the graph is a very desirable algorithm because it scales well with the size of the network. Unfortunately such algorithms are hard to design, and the goal is to find algorithms that have a complexity that is approximately linear in the number of nodes, N. Since most networks of practical interest have graphs with very sparse adjacency matrices, the present algorithm tends to scale very well with the size of networks of practical interest. For example, consider a 4,000-node graph (i.e., N=4,000) and define $b=N^*(d^2)$. If d=3, then b=36,000; if d=4, then b=64,000; and if d=7, then b=196,000. Note that this is a very loose bound. A tighter bound is $b=N^*d(d-1)/2$, which gives b=12,000 for d=3; b=24,000 for d=4; and b=84,000 for d=7.

For most graph partitioning methods, the complexity is a function of both the number of nodes and the number of edges. However, as we have demonstrated above, the complexity of the present method is a function of the number of nodes and the largest node degree. Thus, the algorithm can be scaled to large graphs or networks without becoming intractable.

More efficient search routines for identifying supernodes could be implemented by one of ordinary skill in the art. For example, after the supernode (i j, l) has been formed, the above method would also search for and form the supernodes (i, l, j), (j, i, l,), (j, l, i), (l, i, j) and (l, j, i) that are obtained when the adjacency list of node j and node l are processed. In practice, however, the six (equivalent) supernodes need be obtained only once and never rediscovered. Thus, supernodes may be identified using computational processes that have significantly less computational complexity than that stated above.

Degenerate Cases (Step 16 of FIG. 3A)

If more than half the nodes are uncovered, the graph is treated as a "degenerate" case. In this event, the partitioning process proceeds as described below with reference to FIG. 3B. Of course, the percentage of uncovered nodes which triggers a degenerate case could be different than 50%.

Cluster Generation from Supernodes (Step 17 of FIG. 3A)

In this phase of the procedure, the supernodes have already been identified and included in the supernode list, and the uncovered nodes have also been identified and included in an uncovered node list. The clusters are formed around known anchor nodes in the following manner.

For each anchor node that is "covered," one of the supernodes that the anchor node is a member of is chosen as the initial cluster for the anchor node. The selected supernode must not include another anchor node. Where more than one supernode can be selected, a supernode is selected that has the fewest nodes adjacent to another anchor node.

After the initial supernode is selected, for any other supernode that includes the anchor node, if the other supernode has two nodes in common with the initial cluster and none of its nodes is adjacent to a node in the cluster via a weak link, the other supernode is included in the cluster and the cluster node membership is updated. This step is continued until a cluster for each covered anchor node has been formed.

For an anchor node that is not covered, all adjacent nodes to the anchor node are found and used to form the initial cluster for the anchor node, with the anchor node included in the cluster. If these nodes are in the uncovered node list, they are deleted from the list. The cluster membership is then updated by the following rule. If any of the nodes in the initial cluster is in a supernode, the supernode is included in the cluster and the rule for the covered anchor node is then followed. That is, all supernodes that have two nodes in common with the cluster are found, added to the cluster and the cluster membership is updated, provided that weak links are excluded within the cluster. If none of the nodes in the initial cluster is a member of a supernode, any supernode having two nodes adjacent to the nodes in the initial cluster is found and the supernode is added to the cluster. Thereafter, the rule for a covered anchor node is followed. All the unincluded supernodes are then identified and an unincluded supernode list is formed.

Domain Generation (Steps 19–37 of FIG. 3A)

This part of the method assumes that the clusters have been formed in the manner described above. In forming the clusters, no attempt is made to prevent any supernode, and hence any node, from being in more than one cluster. A domain may be derived from a cluster through the following actions:

1. Ensuring that every uncovered node has been included in a cluster.

2. Ensuring that every node in an included supernode is in exactly one cluster.

3. Ensuring that when the cluster memberships are eventually unique, the weights of the clusters lie within the predefined range.

The domain generation phase may work in the following manner. The weight of each cluster is determined by adding the weights of each node in the cluster (i.e., at step 19). If a node is in more than one cluster (step 21), it is assigned to a cluster according to the following scheme (step 23): Initially, the node is attempted to be assigned to the cluster with the lower weight. However, if the common node is in a supernode with an anchor node, it is assigned to the cluster in which the anchor node is located. If neither of the above options is possible, if the common node is in every supernode of a cluster with the cluster's anchor node, the node is assigned to that cluster. An example of this case is shown in Example 6 below. Cluster weights then are updated (step 19).

Once this is complete, if the unincluded supernode list is not empty, those supernodes, all of whose members have been included in the clusters through other supernodes, are identified and such supernodes are deleted from the unincluded supernode list. If the unincluded supernode list is still not empty, then for each supernode in the list, it is determined if there is a supernode (in a given cluster), wherein two of the nodes of the given supernode are adjacent to two nodes in the unincluded supernode, and wherein no node in the given supernode is connected to a node in the cluster via a weak link. If this condition is satisfied, the unincluded supernode is assigned to the cluster and deleted from the unincluded supernode list. This condition ensures that every node in a cluster is reachable from other nodes in the cluster via at least two paths having no node in common, which can be an important reliability issue in communication networks.

If, after the above steps, the unincluded supernode list is still not empty, then the nodes in the unincluded supernode list (that are not in any cluster) are identified and included in the uncovered node list.

If the uncovered node list is not empty, then for each node in the list, the clusters that contain nodes that are adjacent to the node via non-weak edges are found and the uncovered node is included in the cluster with the smallest weight (step 27). The cluster weight is updated and the node is deleted from the uncovered node list. If all the nodes are now included in the clusters (step 29), a partitioning process that makes cluster membership unique is commenced. If, in step 29, it is determined that there are still unassigned nodes, steps 25–29 are repeated.

The weights of the clusters again are determined (step 31). If the weight of every cluster lies within the range defined in step 11 (step 33), the clusters become the domains (step 37). If the weight of any cluster is outside the range (step 33), the cluster with the largest weight having at least one node adjacent to a node in the cluster with weight outside the range, is found. A node that is adjacent to another node in the smaller-weight cluster is deleted from the larger-weight cluster and the deleted node is included in the cluster with the smaller weight (step 35) (the weights being defined as described above). Of course, modifications and improvements in the movement of nodes between clusters are possible. Cluster memberships and cluster weights are then updated. The above process is repeated until all clusters have weights that lie within the range. The clusters then become the desired domains (step 37).

The method attempts to both balance the weights of the clusters and ensure that each node is adjacent to at least two other nodes in the cluster. However, adjacency of nodes within each cluster is preferred over balancing the weight of each cluster. There may be a case where, in order for the weight of the cluster to be balanced, a leaf node may be included in a cluster in which the leaf node is adjacent to only one other node in the cluster. ("Leaf node" refers to a node that is adjacent to only one node in a cluster.) In this case, since a choice must be made between balancing the weight of the cluster and causing a leaf node to be formed, or not balancing the weight of the cluster and ensuring that each node is adjacent to at least two other nodes, the latter configuration may be preferred. The weight of the cluster may not be brought to within the desired range, but all of the nodes of the cluster will be adjacent to at least two other nodes in the cluster.

EXAMPLES OF PARTITIONING GRAPHS WITH ANCHOR NODES

The following examples demonstrate how graph partitioning with assigned anchor nodes is implemented.

Example 1

Figure 5A:
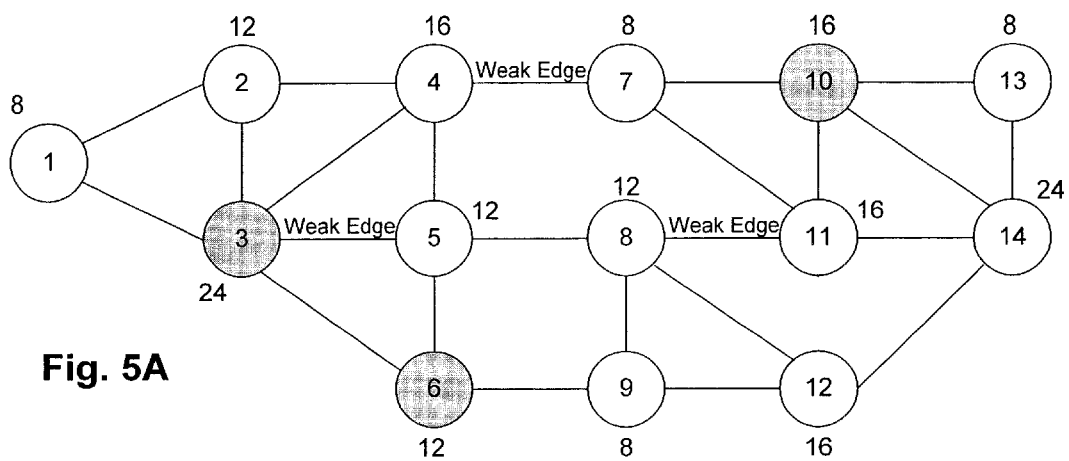
FIGS. 5A–5C illustrate an example of partitioning a graph with anchor nodes in accordance with the present invention.
Figure 5B:
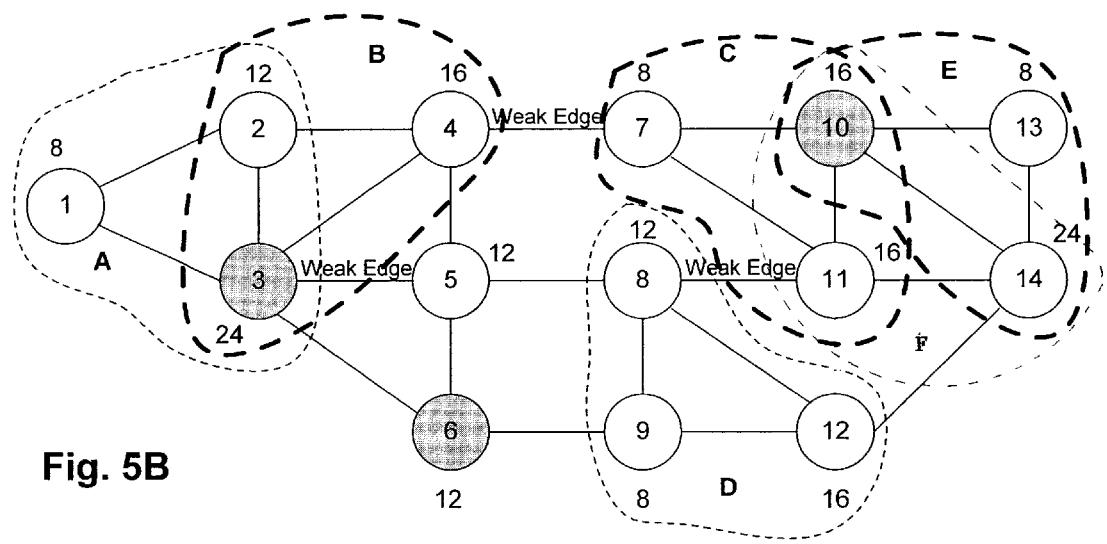
Figure 5C:
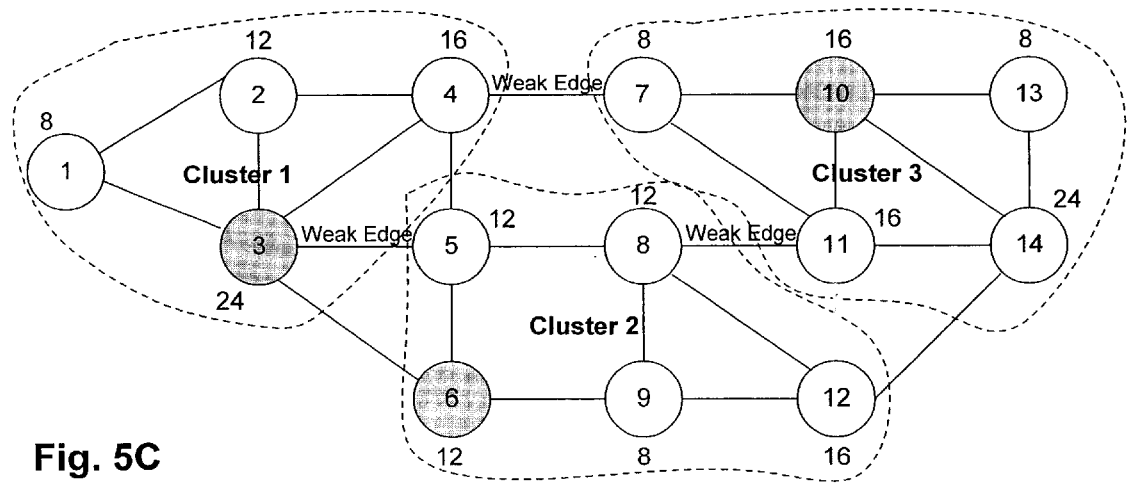

This example illustrates how the invention partitions the graph of FIG. 1A. FIG. 5A shows the graph of FIG. 1 including anchor nodes 3, 6 and 10. First, the weight range of the domains is determined (step 11 of FIG. 3A). The total weight of the graph is 192, and the theoretical average weight is 64 (i.e., 192/3). Since the minimum weight in the graph is 8, the range is (64−8, 64+8)=[56, 72]. The supernodes then are identified (step 13). These are denoted by dashed lines and labeled A, B, . . . , F in FIG. 5B. That is, the supernode list is {A, B, C, D, E, F}. Next, the uncovered nodes are identified and the uncovered node list is formed (step 15). This list is {5, 6}. Here, an anchor node (node 6) is an uncovered node. Since not more than half of the nodes are uncovered (step 16), the cluster formation phase is then commenced (step 17). Starting with anchor node 3, supernode A (containing nodes 1, 2 and 3) is chosen as the starting supernode and a member of a cluster. Supernode B has two nodes in common with the cluster: nodes 2 and 3. Supernode B becomes part of the cluster since it has two nodes in common and its inclusion does not bring into the cluster any nodes that are adjacent via a weak edge. Supernodes A and B are now placed in the included supernode list. Since no other supernode shares two nodes with the cluster, the cluster is the set of nodes {1, 2, 3, 4}. Next we consider the second anchor node, anchor node 6, which is an uncovered node. An initial cluster is formed that includes node 6 and its neighbors: nodes 5 and 9, but not node 3 since it is an anchor node. Thus the initial cluster is the set of nodes {5, 6, 9}. Now, node 9 is in supernode D; thus, the supernode D (containing nodes 8, 9 and 12) is included in the cluster, it is placed in the included supernode list, and the cluster membership is updated to be the set of nodes {5, 6, 8, 9, 12}. No other supernode has two nodes in common with the cluster, so consideration of anchor node 6 is complete. Next anchor node 10 is considered, which is in three supernodes, C, E and F. Supernode C is arbitrarily chosen as the initial cluster and it is placed in the included supernode list. It shares two nodes with supernode F, so the latter is included in the cluster which consists of the set of nodes {7, 10, 11, 14}. The only supernode left in the supernode list is supernode E. However, is has two nodes in common with the cluster: nodes 10 and 14. Thus, it is included in the cluster and deleted from the supernode list that is now empty. The cluster is the set {7, 10, 11, 13, 14}. Supernodes E and F are also included in the included supernode list. Clusters 1–3 are shown in FIG. 5C.

The domain generation phase is then commenced. First, it is observed that all the nodes have been included in at least one cluster (no uncovered nodes). As was determined in step 11, the weight range of each domain is [56, 72]. The weight of each cluster then is determined (step 19). The weight of cluster 1 is 60, that of cluster 2 is also 60, and that of cluster 3 is 72. Thus, all three clusters have weights that lie within the range, include all nodes, and no cluster has any node in common with another cluster (step 21). There are no unincluded supernodes (step 25) or uncovered nodes (step 27), and all nodes have been assigned to a cluster (step 29). Since all clusters are within the weight range (step 33), the required domains are the clusters: cluster 1 becomes domain 1, cluster 2 becomes domain 2, and cluster 3 becomes domain 3 (step 37).

Example 2

Figure 6A:
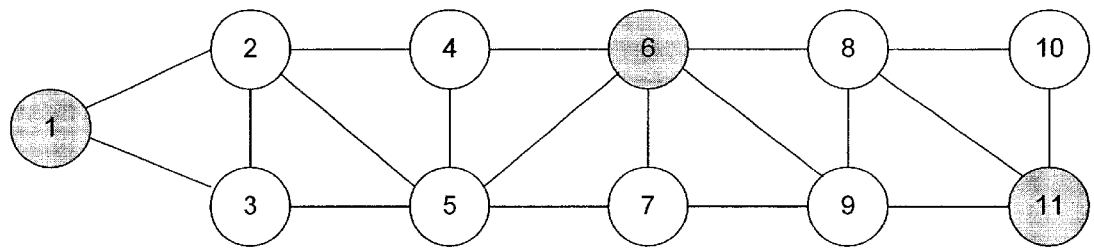
FIGS. 6A–6C illustrate an example of partitioning a graph with anchor nodes in accordance with the present invention.
Figure 6B:
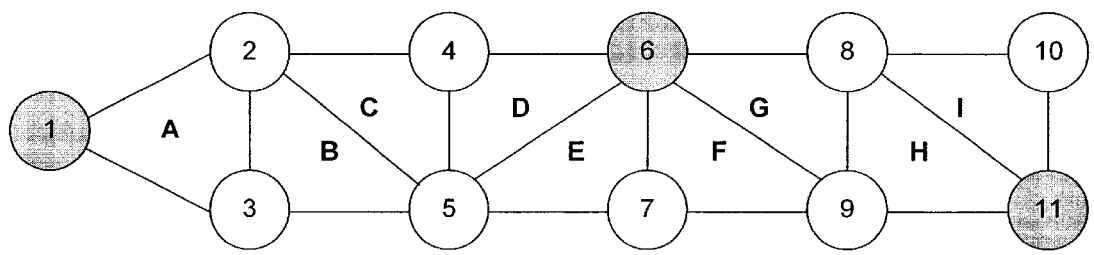
Figure 6C:
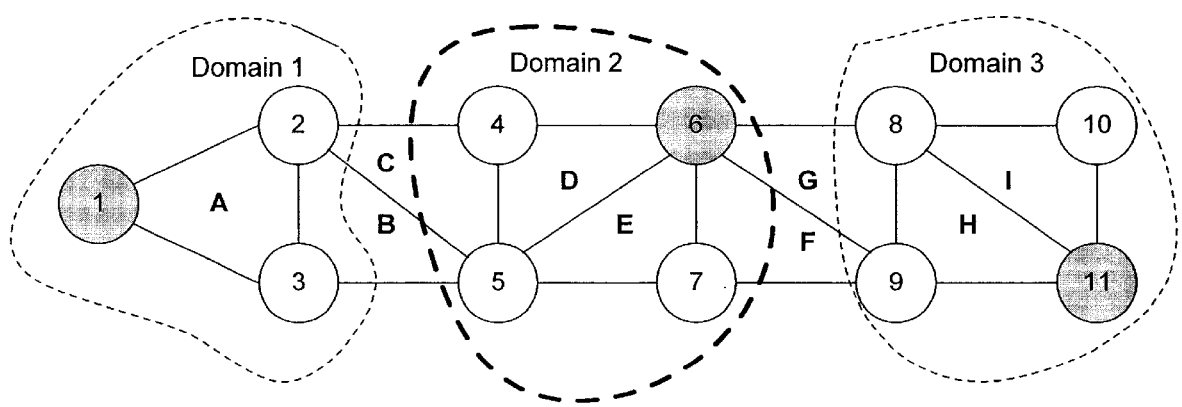

In the example of FIGS. 6A–6C, a method for partitioning a different graph around anchor nodes is shown. There are three anchor nodes, 1, 6, and 11. These are shaded in FIG. 6A. In step 13, nine supernodes, labeled A through I in FIG. 6B, are identified, all of which form a single cluster, since each supernode has at least two nodes in common with an adjacent supernode.

Since there are three anchor nodes, 1, 6 and 11, clusters are partitioned around the anchor nodes (step 17). Supernode A is assigned to anchor node 1. This is because supernode A has no other nodes adjacent to an anchor node. Supernode E (or D, both meet the requirement) is assigned to anchor node 6, because supernode E (or D) has no other nodes adjacent to another anchor node. Supernode I is assigned to anchor node 11, because supernode I has only one other node adjacent to another anchor node (node 8 being adjacent to anchor node 6).

No other supernodes may be assigned to anchor node 1 in a next round, since no other supernode includes node 1. Supernode D (or E) is assigned to anchor node 6, both having no nodes adjacent to another anchor node and which share an edge with a previously chosen supernode. Supernode H is assigned to anchor node 11, since supernode H shares an edge with the previously chosen supernode I. All nodes are now marked and the following clusters have been generated: Cluster 1, consisting of nodes 1, 2 and 3; Cluster 2, consisting of nodes 4, 5, 6 and 7 and Cluster 3, consisting of nodes 8, 9, 10 and 11. The weight balancing phase is then commenced (steps 19–37). In this example, it will be assumed that the clusters are fairly equally weighted, and thus they become the domains (step 37) as shown in FIG. 6C.

Example 3

Figure 7A:
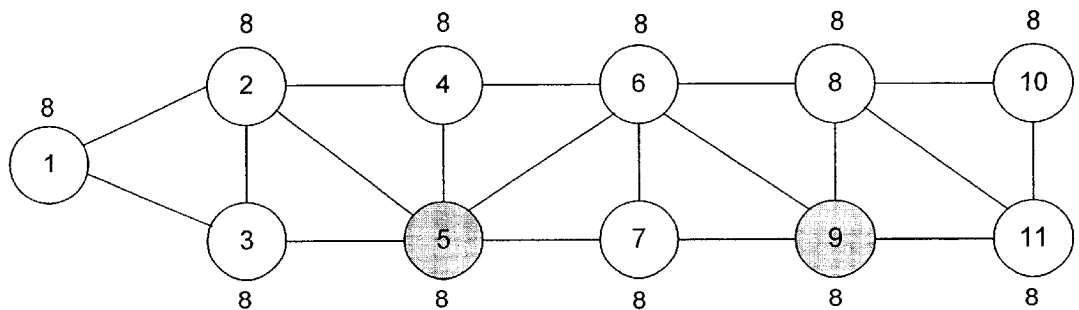
FIGS. 7A–7C illustrate an example of partitioning a graph with anchor nodes in accordance with the present invention.
Figure 7B:
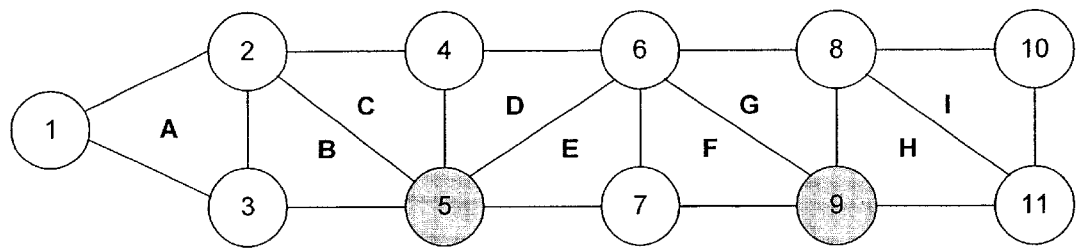
Figure 7C:
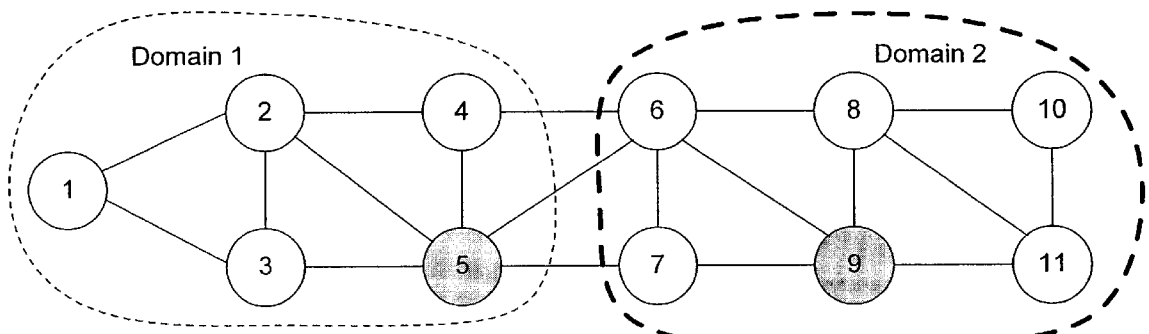

This is a modification of Example 2. As shown in FIGS. 7A–7C, there are 11 weighted nodes all having the same weight, 8 for example, and two anchor nodes, nodes 5 and 9 (FIG. 7A). First, the domain weight range is determined (step 11). The total weight is 88 (8×11), and the average weight is 44 (88÷2). Therefore, with a tolerance of ±8, the weight range is (44–8, 44+8)=[36, 52]. Nine supernodes are identified (step 13), labeled A through I in FIG. 7B, which form one cluster. Since there are no uncovered nodes (step 15), the cluster is partitioned into two clusters (one for each of anchor nodes 5 and 9).

Anchor node 5 forms the cluster made up of supernodes B, C, D and E, having a weight of 48 (step 17, 19). Anchor node 9 forms the cluster made up of supernodes F, G and H, having a weight of 40 (steps 17, 19). The unincluded supernode list is {supernode A, supernode I}. Since nodes 6 and 7 are contained in both clusters (step 31) and the weight of the cluster formed by anchor node 5 is greater than that formed by anchor node 9, both nodes are removed from the cluster formed by anchor node 5 by deleting supernode D and E from the cluster (step 26). The weight of the cluster of anchor node 5 is now 32 and the weight of the cluster of anchor node 9 is still 40 (step 19). Since two nodes in supernode A are in the cluster formed by anchor node 5, the supernode is assigned to the cluster and deleted from the list. Since two nodes of supernode I are in the cluster formed by anchor node 9, the supernode is included in the cluster and deleted from the list (step 25). Every node has now been included in exactly one cluster (step 29), and the cluster weights are 40 and 48 (step 31) and within the range (step 33). Thus, the domain configuration shown in FIG. 7C is obtained (step 33).

Example 4

Figure 8A:
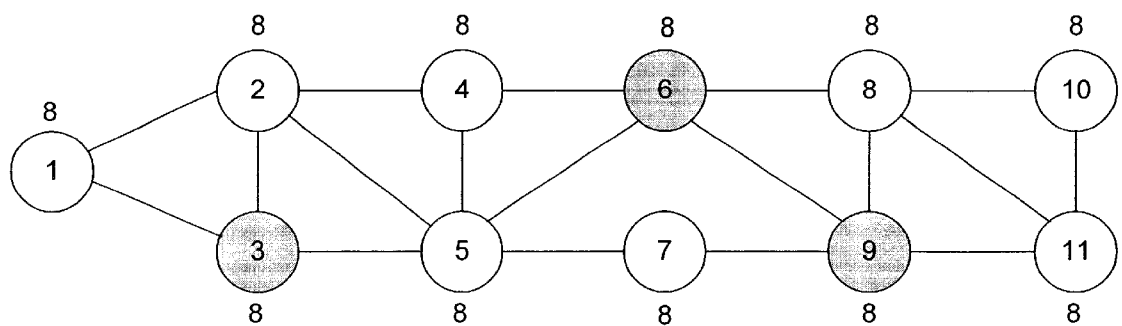
FIGS. 8A–8D illustrate an example of partitioning a graph with anchor nodes and uncovered nodes (as defined below)
Figure 8B:
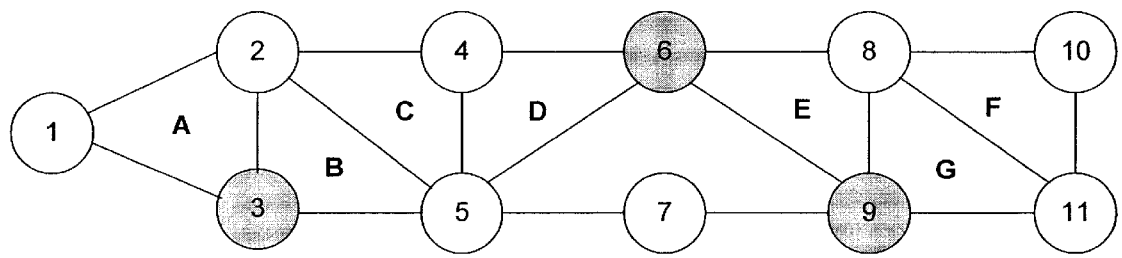

In Example 4, FIGS. 8A–8D, a method for partitioning a graph with eleven nodes, all having the same weight, 8, for example, is shown. Nodes 3, 6 and 9 are the anchor nodes, as shown in FIG. 8A. There are no weak edges. The total weight of the graph is 88, and the theoretical average weight is (88/3)=29.33. Since the minimum weight is 8, the permissible range is (29.33–8, 29.33+8) or [21.33, 37.33] (step 11). To solve this example, the supernodes are first identified (step 13). These have been labeled A, B, . . . , G in the different triangular sections of the graph, as shown in FIG. 8B. There is one uncovered node, node 7 (step 15).

Figure 8C:
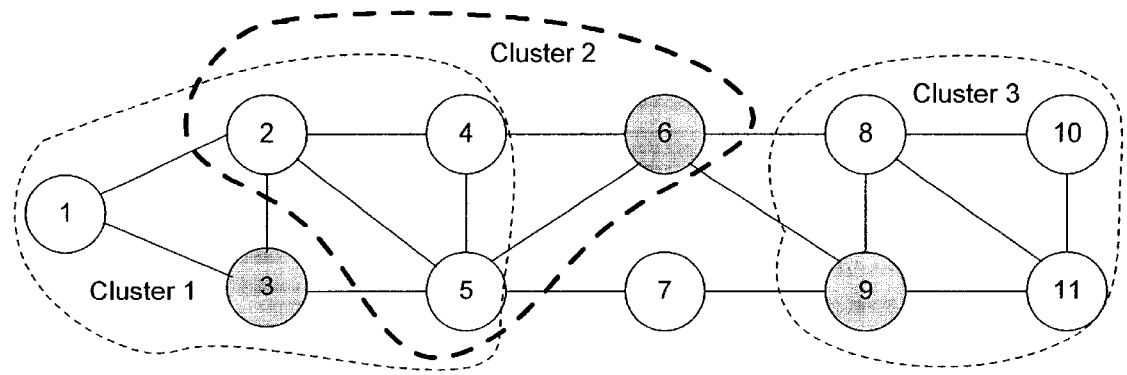

Having identified the supernode list and the uncovered node list, cluster formation is commenced (step 17). Starting with anchor node 3 and choosing supernode A as the initial cluster, the cluster is expanded to include supernode B, then supernode C. (Supernode D includes another anchor node and so is not included.) The following set of nodes comprises the cluster {1, 2, 3, 4, 5}. Next, anchor node 6 is considered. Supernode E cannot be used for anchor node 6 since it includes anchor node 9. Thus, for anchor node 6, supernode D is used as the initial cluster. Next, supernode C is added. Supernode B cannot be included because its membership includes anchor node 3. Thus the cluster is the set of nodes {2, 4, 5, 6}. Finally, anchor node 9 is considered. Again, supernode E cannot be included since it includes anchor node 6. Thus, supernodes G and F form the cluster with the node set {8, 9, 10, 11 }. There is no unincluded supernode, and the clusters are as shown in FIG. 8C.

Figure 8D:
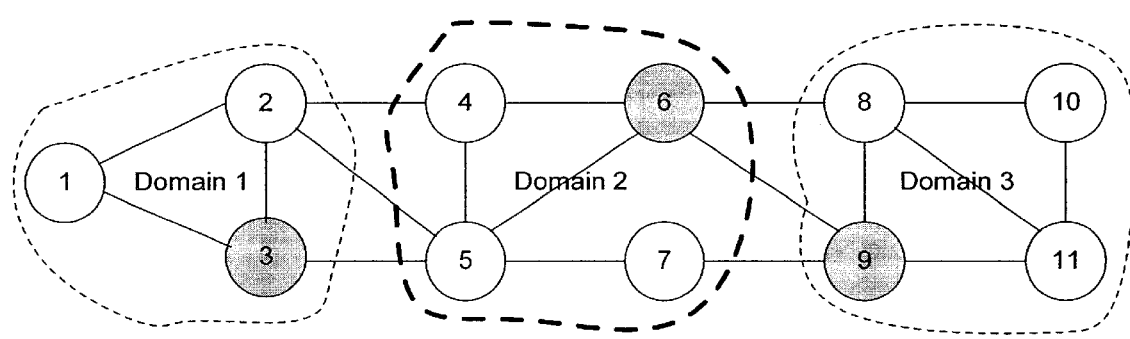

The weights of clusters 1–3 are 40, 32 and 32, respectively (step 19). Now, clusters 1 and 2 have nodes 2, 4 and 5 in common (step 21). Starting with node 2, it is observed that it is in the same supernode as anchor node 3, so it is assigned to cluster 1 (step 23). Because cluster 2 has a smaller weight than cluster 1, nodes 4 and 5 are assigned to it (step 23). Thus, the new cluster configuration is Cluster 1={1, 2, 3} and Cluster 2={4, 5, 6} both of which are now unique, and have weights of 24 (step 19). There is an uncovered node, node 7, which has not been assigned. It is adjacent to nodes in clusters 2 and 3. Since the weight of cluster 2 (24) is less than that of cluster 3 (32), node is assigned to cluster 2 (step 27). Thus, all nodes have been assigned (step 29), and the cluster memberships are unique. The weight of each cluster is then computed (step 31). The weight of cluster 1 is 24, that of cluster 2 is 32, and that of cluster 3 is also 32. Since all clusters have weights that lie within the range (step 33), the clusters become the domains (step 37), as shown in FIG. 8D.

Example 5

Figure 9A:
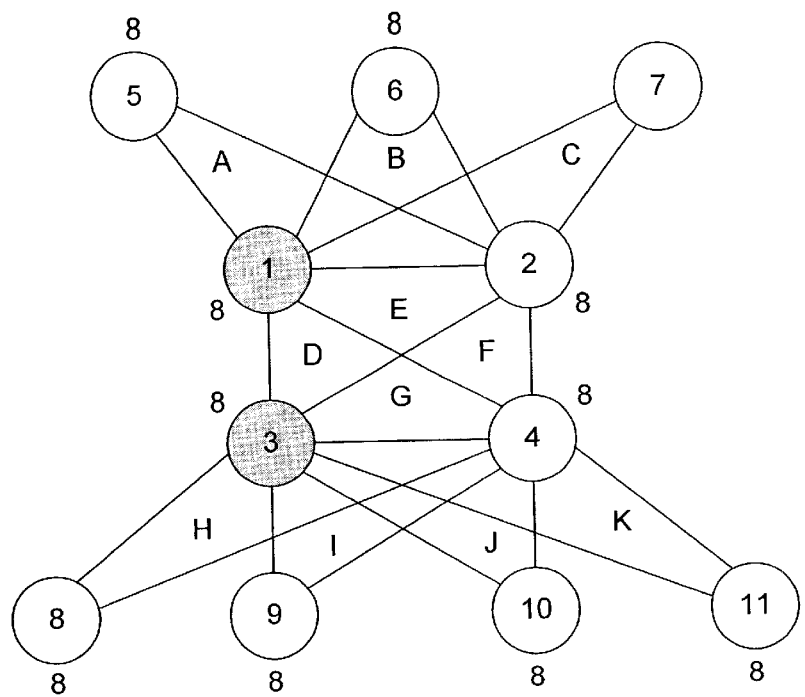
FIGS. 9A–9B illustrate an example of partitioning of a graph with anchor nodes in accordance with the present invention.
Figure 9B:
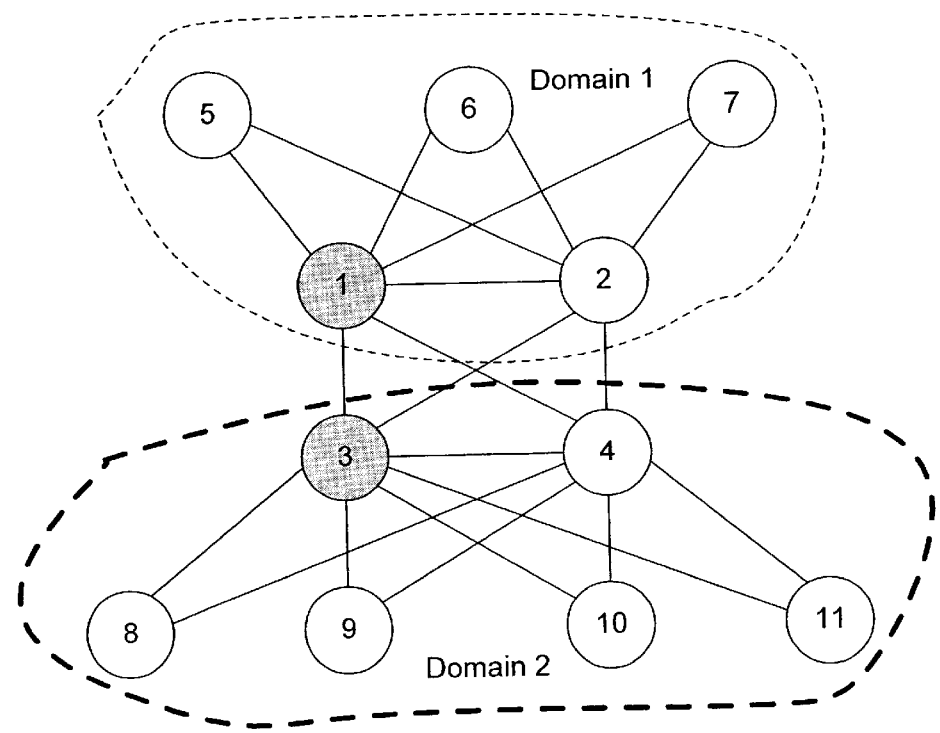

In the example of FIGS. 9A–9B, there are two anchor nodes, 1 and 3, and the nodes are equally weighted. This example follows the same steps as example 1. FIG. 9A shows a backbone network with four switches represented by nodes 1, 2, 3 and 4, and seven other switches, represented by nodes 5 through 11 in the graph, each of which is connected to two of the four backbone switches 1–4.

To commence the partitioning the weight range is determined (step 11). The total weight is 88 and the average weight is (88/2)=44. Therefore, the range is [36, 52]. It then is observed (step 13) that there are eleven supernodes, A–K, FIG. 9A, all of which form one cluster since each supernode has two nodes in common with an adjacent supernode. No nodes are uncovered (step 15). Since there are two anchor nodes, the cluster must be partitioned into two clusters (step 17). Since nodes 1 and 3 are anchor nodes, they are required to be in different clusters. Thus, the cluster partitioning process is started with two supernodes associated with nodes 1 and 3. With respect to anchor node 1, there is no supernode of which it is a member whose other nodes are not adjacent to anchor node 3. The same applies to anchor node 3. Thus, a supernode will be assigned to an anchor node if it has at most one node adjacent to the other anchor node. Supernode A (or supernode B or supernode C, all of which meet the criterion), is assigned to anchor node 1 and supernode H (or supernode I or supernode J or supernode K, since they all meet the criterion) is assigned to anchor node 3.

Anchor node 1 will add supernodes B and C to supernode A. Similarly, anchor node 3 will add supernodes I, J and K to supernode H. The weight of the cluster of anchor node 1 is 40 and the weight of the cluster of anchor node 3 is 48 (step 19). The clusters have no nodes in common (step 21) and no supernodes are unincluded (step 25). All nodes are now covered (steps 27, 29), and the clusters have weights within the range (steps 31, 33). The new clusters now become the required domains (step 37), as shown in FIG. 9B.

Example 6

Figure 10A:
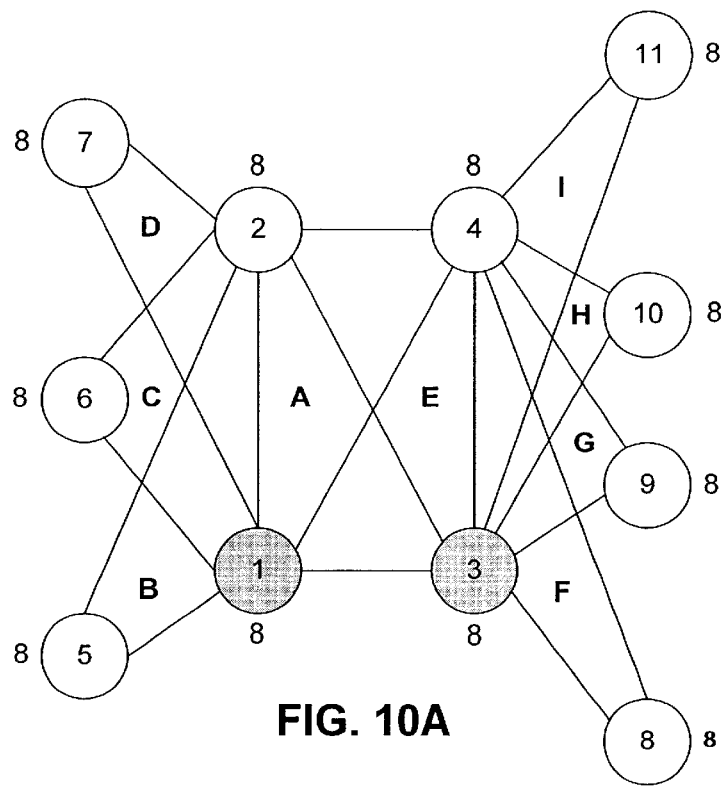
FIGS. 10A–10B illustrate an example of partitioning a graph having anchor nodes as backbone nodes.
Figure 10B:
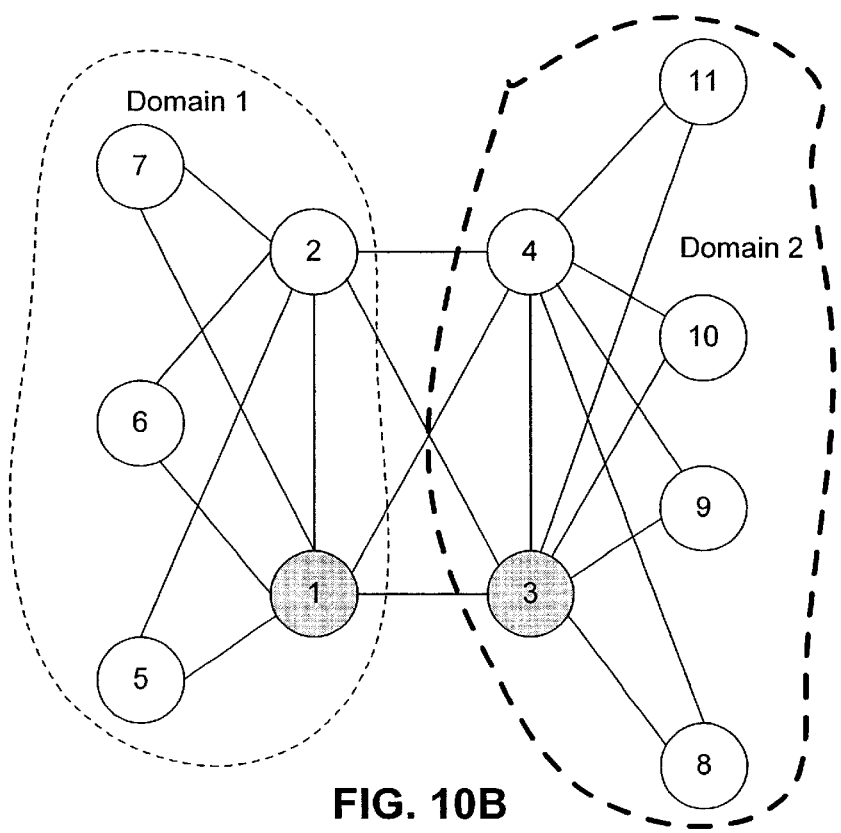

In the example of FIGS. 10A–10B, the nodes are equally weighted. Each of seven nodes (5 through 11) is connected to two of four backbone nodes (1–4). The anchor nodes are nodes 1 and 3, shown shaded in FIG. 10A.

As described above in Example 5, since there are 11 nodes and 2 anchor nodes, the weight range is [36, 52] (step 11). The supernodes are labeled A–I (step 13). All nodes are covered (step 15) since every node is adjacent to at least two other nodes, thus the uncovered node list is empty. The cluster formed by anchor node 1 consists of supernodes A, B, C and D. The cluster formed by anchor node 3 consists of supernodes E, F, G, H and I (step 17). The weight of the cluster of anchor node 1 is 48 and the weight of the cluster of anchor node 3 is 56 (step 19).

Since nodes 2 and 4 are in both clusters (step 21), and since the cluster formed by anchor node 3 has a larger weight than that formed by anchor node 1 (simply by having more nodes), supernode E is deleted from the cluster formed by anchor node 3 so that node 2 is solely within the cluster of anchor node 1 (step 22). However, node 4 is still common to both clusters. For the special case of a quadded system, a rule is established that if an anchor node and some other node are in every supernode in a cluster, that other node cannot be in another cluster. Thus, supernode A is deleted from the cluster formed by anchor node 1 since node 4 is contained in every supernode in the cluster formed by anchor node 3 (step 23). Now the weight of the cluster of anchor node 1 is 40 and the weight of the cluster of anchor node 3 is 48 (step 19). No nodes are in common clusters (step 21), there are no unincluded supernodes (step 25) or uncovered nodes (step 27), and all nodes are assigned to a cluster (step 25). The weights are within the range (steps 31, 33) and the domains are formed (step 37). The domains are as shown in FIG. 10B.

Partitioning Degenerate Graphs

In some cases, the graphs which are to be partitioned may include more uncovered nodes than covered nodes. In this case, the method described above may not provide the desired results. If, after step 15 of FIG. 3A, more than a threshold number of nodes of the graph are on the uncovered node list, the graph is considered a "degenerate" graph. In a preferred embodiment of the invention, if the number of uncovered nodes is more than 50% of the number of covered nodes, the graph is considered a degenerate graph. In a degenerate graph, there are more leaf nodes than nodes which are adjacent to at least two other nodes in a cluster. In this case, since supernodes and clusters cannot be formed and combined as discussed above, the following alternative embodiment of the method may be carried out.

As explained with reference to FIG. 3B below, to partition degenerate cases, control groups are generated. Next, intra-group connectivity is tested in order to define the domains. Specifically, if every pair of nodes in the group can communicate without passing through a node that is outside the group, the group constitutes a single domain; otherwise, it consists of two or more domains.

Figure 3B:
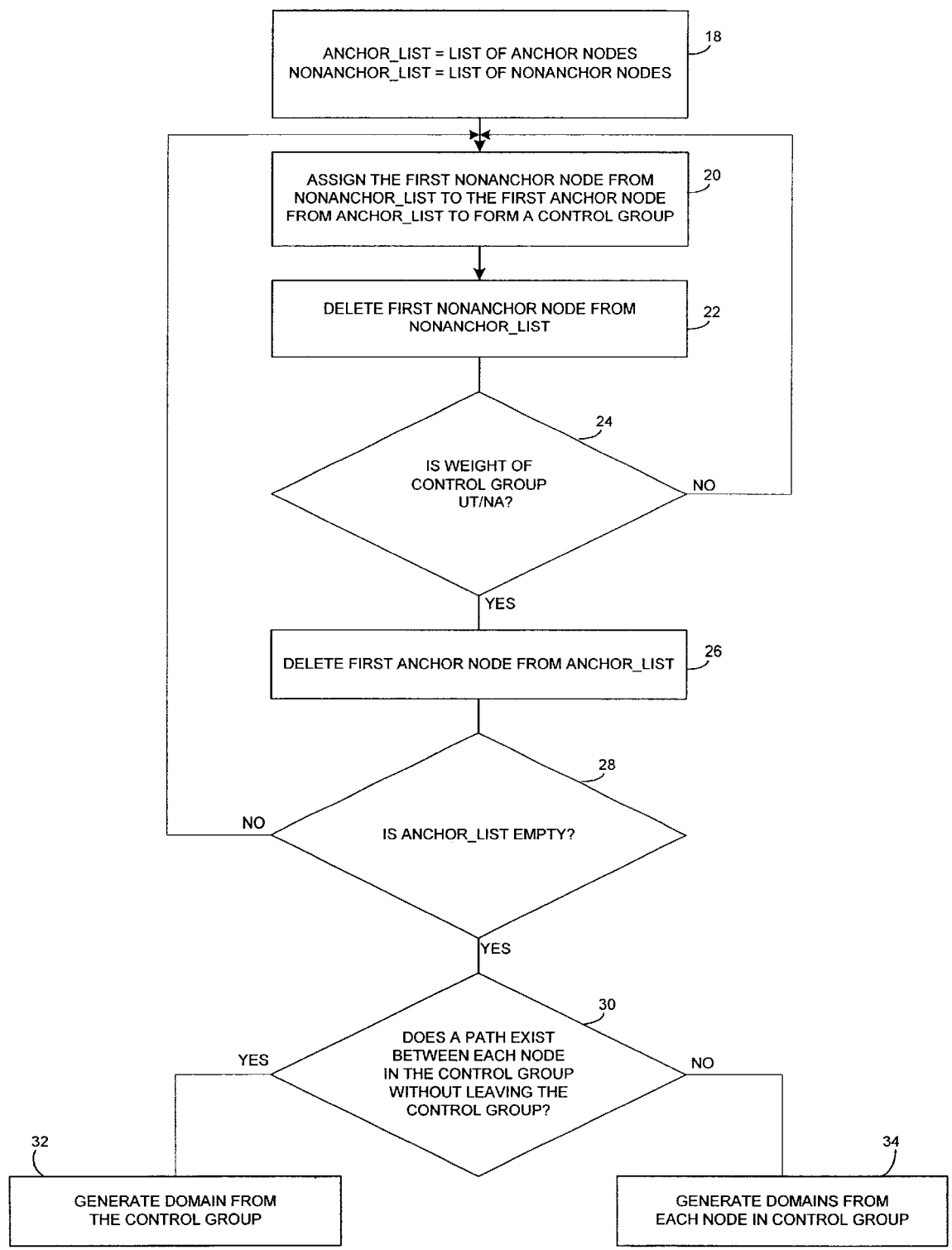
FIG. 3B is a flow diagram of an alternate method performed in accordance with the present invention.

A simple way to partition the network into $N_A$ control groups (where $N_A$ is the number of anchor nodes), illustrated in FIG. 3B.

Let "Anchor_List" denote the list of anchor nodes, and let "Nonanchor_List" denote the list of non-anchor nodes (step 18).

If $W_T$ is the total weight of the nodes in the graph, the first member of the Anchor_List is chosen as the starting member of the first control group. Starting with the first member of the Nonanchor_List, as many nodes as possible are assigned to the first anchor node (step 20). As each non-anchor node is assigned, it is deleted from the Nonanchor_List (step 22). This is done until the total weight, including that of the selected anchor node, is $W_T/N_A$, plus or minus a tolerance factor (step 24). When the weight of the control group is approximately $W_T/N_A$, the anchor node is deleted from Anchor_List (step 26).

The above process is repeated with the next anchor node and the next set of nodes in the Nonanchor_List. The process is continued until all the anchor nodes have been chosen and the Anchor_List is empty (step 28).

Intra-group connectivity is tested (step 30) and the appropriate domains are defined. In this case a distinction is made between a control group and a domain. A control group is a set of nodes under the control of one control agent or Virtual Name Server (VNS), which is a network management server which runs the switched network. A control group becomes a domain if a path exists between every pair of nodes in the group without passing through a node outside the group (step 32). A control group can consist of several domains if the path between every pair of nodes in the group passes through a node that is not a member of the control group. If this is the case, domains are generated from each node in the control group (step 34).

EXAMPLES OF PARTITIONING DEGENERATE GRAPHS

Example 7

Figure 11A:
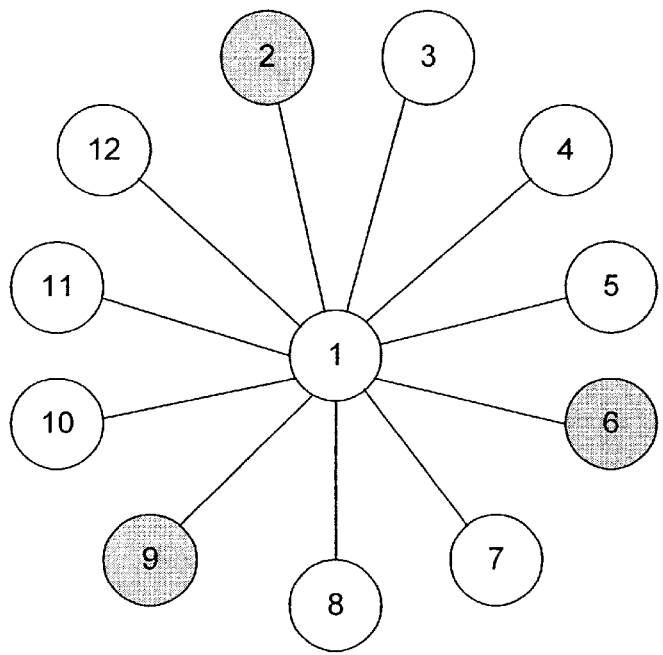
FIGS. 11A–11B illustrate an example of partitioning a star-configured graph having anchor nodes as leaf nodes.
Figure 11B:
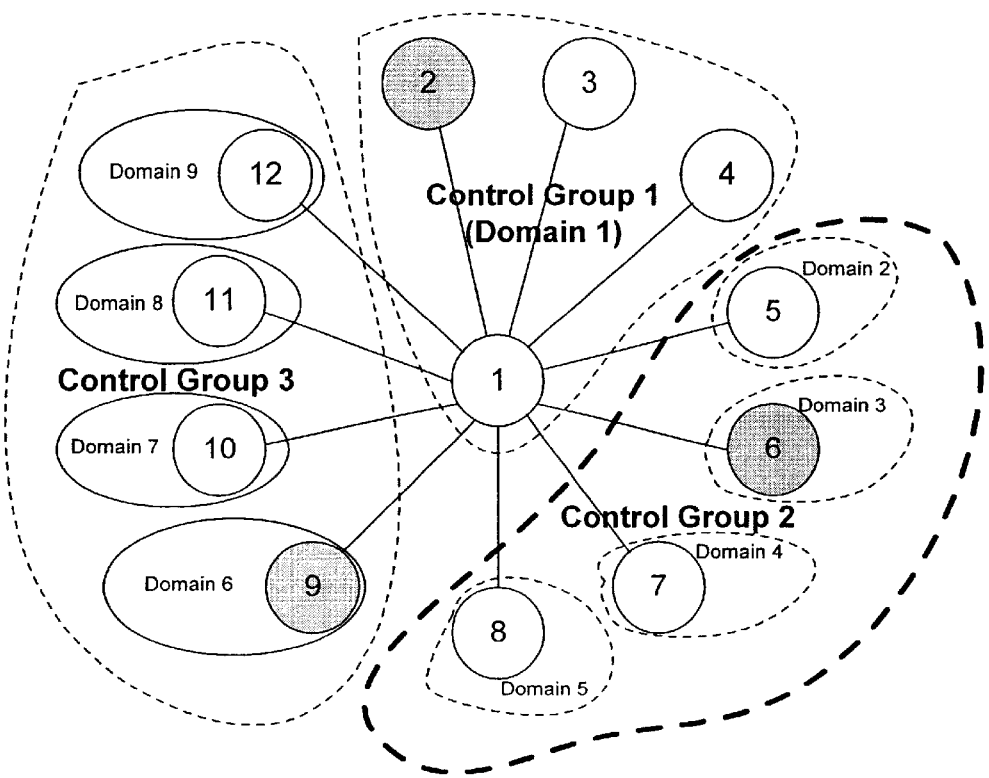

In the example of FIGS. 11A–11B, a star configuration is shown, in which all nodes are connected to a hub node. In FIG. 11A, there are 12 nodes, eleven of which are connected to node 1 in a star configuration. Nodes 2, 6 and 9 are the anchor nodes. Thus, three domains must be formed. In this example, it is assumed that all nodes are equally weighted.

This example is a degenerate case because other than the hub switch (or node), every other node is a leaf node. A leaf node is a node which is adjacent to only one other node. Thus, the desired feature that every node in a domain be adjacent to at least two other nodes in the domain is non-existent.

Applying the method shown in FIG. 3B to the problem in FIG. 11A the following is obtained:

Anchor_List=nodes {2,6,9} (step 18)

Nonanchor_List=nodes {1, 3, 4, 5, 7, 8, 10, 11, 12} (step 18)

Since, in this example, all the nodes have equal weight, the method reduces to assigning the first three nodes in Nonanchor_List to the group controlled by anchor node 2, assigning the second set of three nodes to the group controlled by anchor node 6, and assigning the third set of three nodes to the group controlled by anchor node 9 (steps 20–28). Thus, the control group configuration becomes the following:

Control Group 1, consisting of nodes {1, 2, 3, 4}, under the control of anchor node 2.

Control Group 2, consisting of nodes {5, 6, 7, 8}, under the control of anchor node 6.

Control Group 3, consisting of nodes {9, 10, 11, 12}, under the control of anchor node 9.

Since all members of Control Group 1 can communicate with each other via node 1 (step 30), the group constitutes a domain (step 32). However, all intra-group communication in the other control groups passes through node 1 which is in Control Group 1 (step 30). Thus, there are four domains in each of control group 2 (Domains 2–5) and control group 3 (Domains 6–9) (step 34). The final configuration is as shown in FIG. 11B. That is, there are three control groups and 9 domains in the graph.

Example 8

Figure 12A:
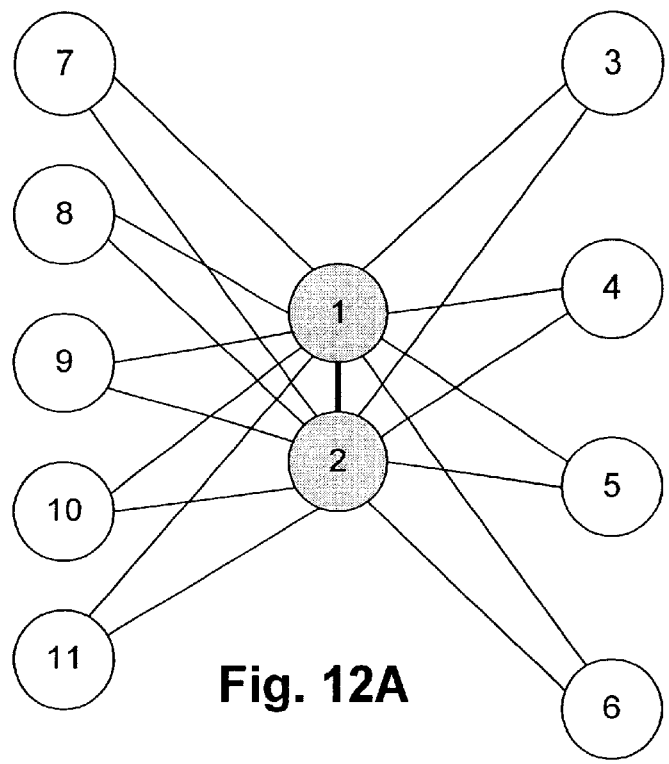
FIGS. 12A–12B illustrate an example of partitioning a double star-configured graph having anchor nodes as backbone nodes.

Another example of a degenerate case is shown in FIG. 12A, where two interconnected anchor nodes form the hub of a butterfly (or double star) configuration. Anchor nodes 1 and 2 essentially constitute the backbone network. This example occurs when the star configuration is required to have a built-in redundancy. The redundant system can be on active standby and, therefore, may be required to control a portion of the network while the primary system is operational.

Figure 12B:
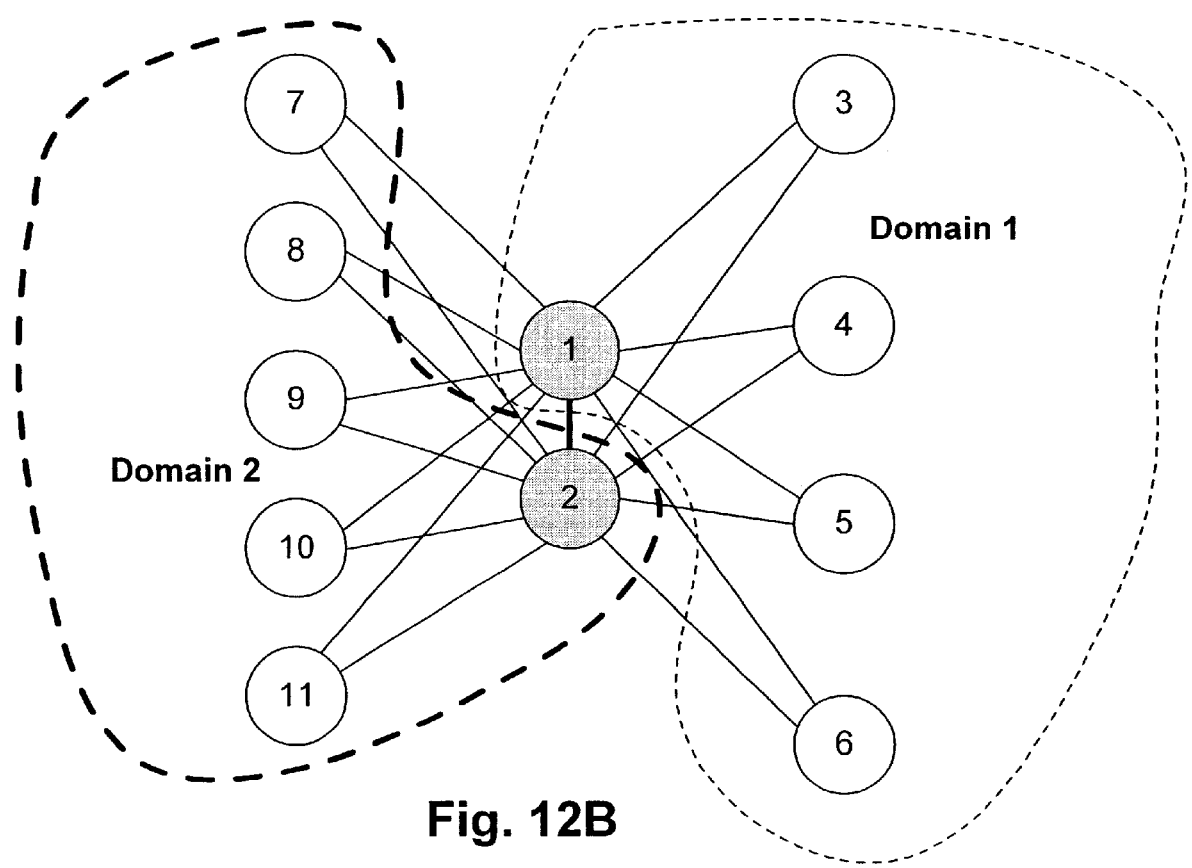

Since every node that is not an anchor node is adjacent to both anchor nodes only, no supernodes may be formed and all of the nodes are uncovered (step 16). Two lists are defined as in Example 7, namely, the Anchor_List and the Nonanchor_List (step 18). The first set of nodes on the Nonanchor_List are assigned to the first node on the Anchor_List until their weights sum to approximately half the total weight ($W_T/2$) (two anchor nodes). In this case, nodes 3, 4, 5 and 6 are assigned to anchor node 1. The remaining nodes are then assigned to the second node on the Anchor_List. Nodes 7, 8, 9, 10 and 11 are assigned to anchor node 2 (steps 20–28). Thus, two control groups are generated. Since the nodes in each group are all connected to the anchor node in each group (step 30), each control group is a domain (step 32). Thus, the result shown in FIG. 12B is obtained. Domain 1 consists of nodes 1, 3, 4, 5 and 6, and Domain 2 consists of nodes 2, 7, 8, 9, 10 and 11.

Figure 13:
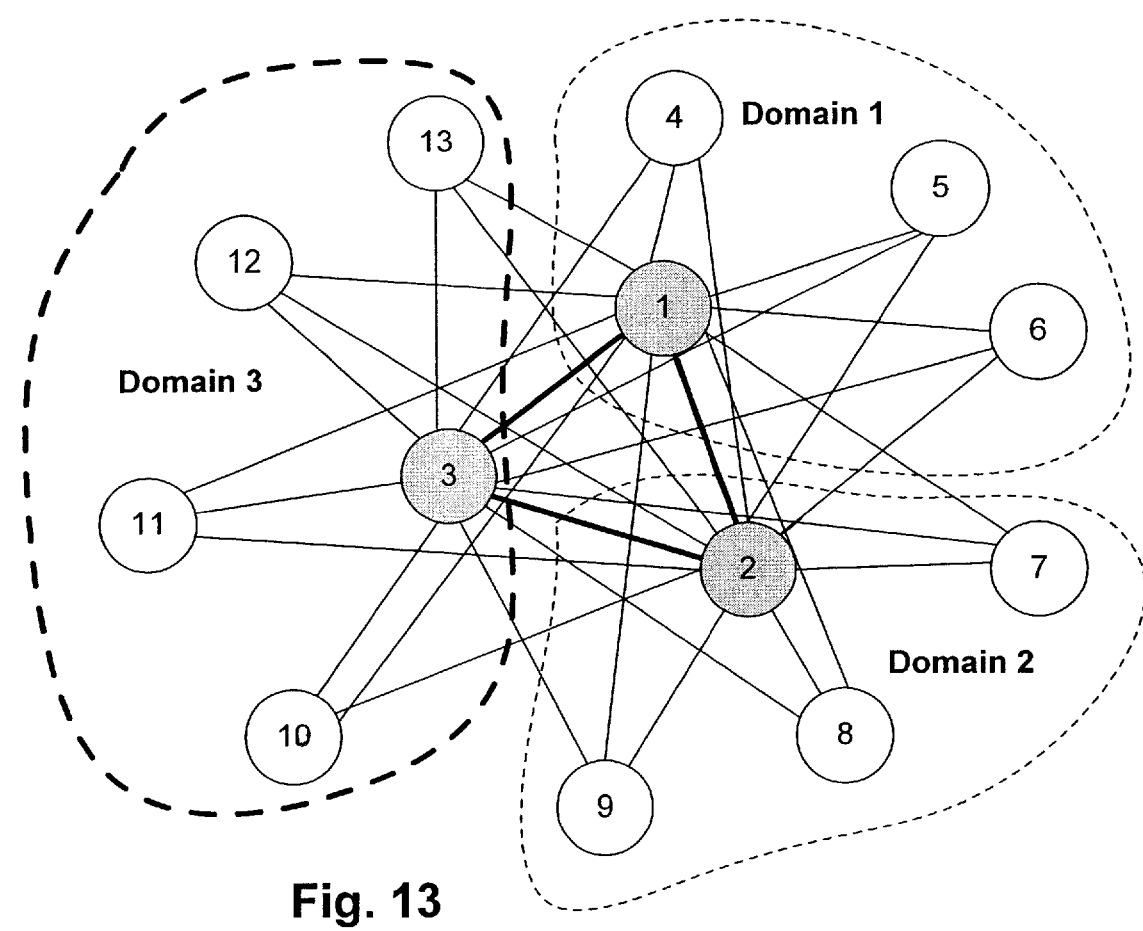
FIG. 13 illustrates an example of partitioning a triple star-configured graph having anchor nodes as backbone nodes.

The same general rule applies when k anchor nodes constitute the backbone nodes of the graph (for any k>2) and when every non-anchor node is adjacent to every anchor node. The case of k=3 (i.e., the triple star configuration) is show in FIG. 13. The partition rule, as described with reference to FIG. 3B, is to assign the first set of non-anchor nodes to the first anchor node until the total weight is approximately 1/k of the total weight, to assign the next set of non-anchor nodes to the second anchor node until the weight constraint is met, and so on until all the nodes have been assigned.

Example 9

In Example 8, it was assumed that the number of anchor nodes required was equal to the number of nodes in the backbone network. In practice this may not be the case. In particular, the number of anchor nodes may be more than the number of nodes in the backbone network. However, because of the special structure of the network, it is necessary to distinguish between network partitioning into domains and the assignment of anchor nodes to the domains.

Figure 14A:
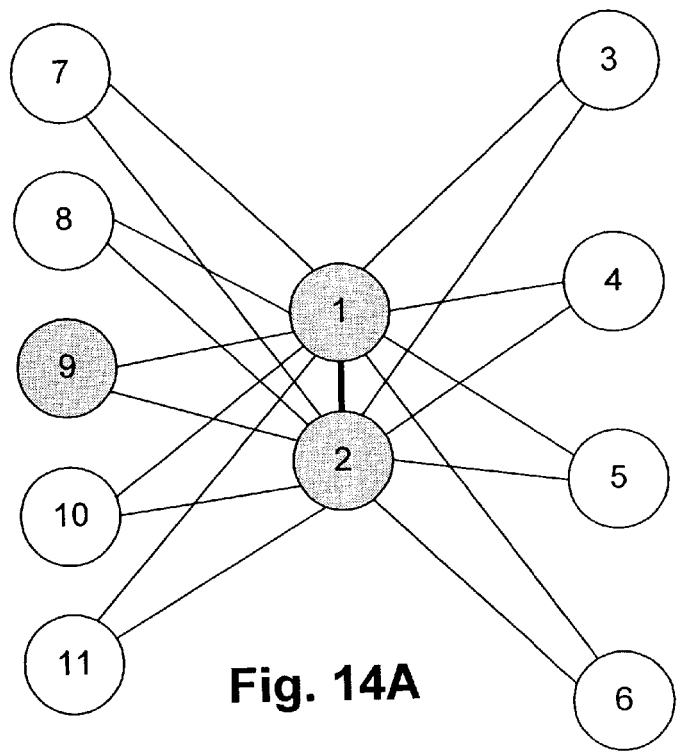
FIGS. 14A–14B illustrate an example of partitioning a double star-configured graph having anchor nodes as backbone nodes and non-backbone nodes.

For example, in FIG. 14A there are three anchor nodes and two backbone nodes. Assume that the nodes are equally weighted. Thus, two anchor nodes will support four nodes each and the third one will support three nodes. Now, since anchor nodes 1 and 2 are adjacent to all the other nodes in the network, each anchor node is assigned to a control domain. However, anchor node 9 is not adjacent to any non-anchor node and none of the non-anchor nodes is adjacent to another non-anchor node. Thus, each of the nodes not assigned to a control domain under a backbone anchor node (1 or 2) constitutes a control domain. Applying the method described above for assigning VNS's, the two node lists are formed:

Anchor_List=nodes {1, 2, 9} (step 18)

Nonanchor_List=nodes {3, 4, 5, 6, 7, 8, 10, 1 1} (step 18)

With the average weight at approximately 29 ((8×11)÷3), the assignments are made as follows (steps 20–28):

Control Group 1, consisting of nodes {1,3,4,5}. This is Domain 1 under anchor node 1 (step 32).

Control Group 2, consisting of nodes {2,6,7,8}. This is Domain 2 under anchor node 2 (step 32).

Control Group 3, consisting of nodes {9, 10, 11}. This is under anchor node 9 and consists of three domains:

Domain 3 (node 9), Domain 4 (node 10), and Domain 5 (node 11) (step 34).

Figure 14B:
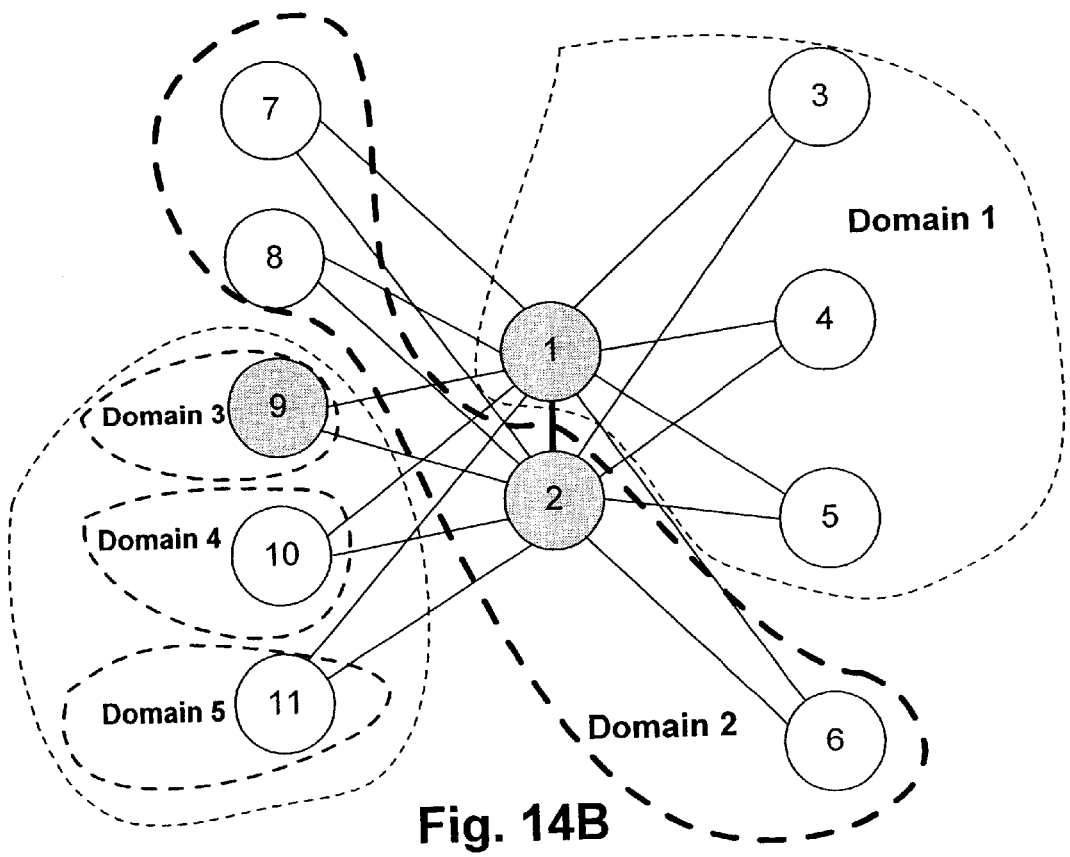

The configuration becomes as shown in FIG. 14B.

Thus, if the topology is a star configuration, whether a simple star with one hub or a complex star configuration with multiple hub nodes, the result is the same: First, the nodes are assigned to control groups managed by the anchor nodes. If every node in each control group can be reached by every other node in the group without going through a node outside the group, the control group constitutes a domain. For a given control group, if a node in the group cannot be reached by other nodes in the group without passing through a node outside the group, that node constitutes a domain.

Example 10

Figure 15A:
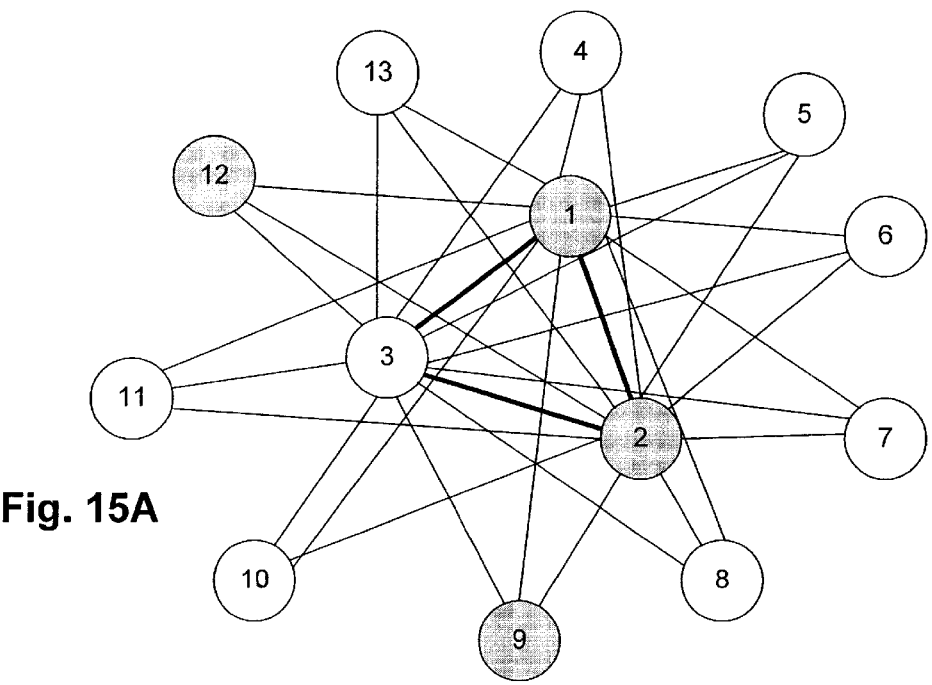
FIGS. 15A–15B illustrate an example of partitioning a triple star-configured graph having anchor nodes as backbone nodes and non-backbone nodes.

As another example, consider the three-star configuration in FIG. 15A. There are four anchor nodes 1, 2, 9, 12. Two of the nodes are backbone nodes (1 and 2) and the other two are non-backbone nodes (9 and 12). Assuming again that all nodes have equal weights, 8, for example, then each anchor node must carry an approximate weight of 24 ((13×8)÷4). Following the method of listing the nodes, the following is obtained:

Anchor_List=nodes {1, 2, 9, 12} (step 18)

Nonanchor_List=nodes {3, 4, 5, 6, 7, 8, 10, 11, 13} (step 18)

Since one of the backbone nodes is not an anchor node (node 3), it is not included in any control group that contains another backbone node. Thus, the control groups are as follows (steps 20–28):

Control Group 1, consisting of nodes {1, 4, 5}. This is Domain 1 under anchor node 1 (step 32).

Group 2, consisting of nodes {2, 6, 7}. This is Domain 2 under anchor node 2 (step 32).

Control Group 3, consisting of nodes {3, 8, 9}. This is Domain 3 under anchor node 9 (step 32).

Control Group 4, consisting of nodes {10, 11, 12, 13}. These are Domains 4, 5, 6 and 7, respectively, under anchor node 12 (step 34).

Figure 15B:
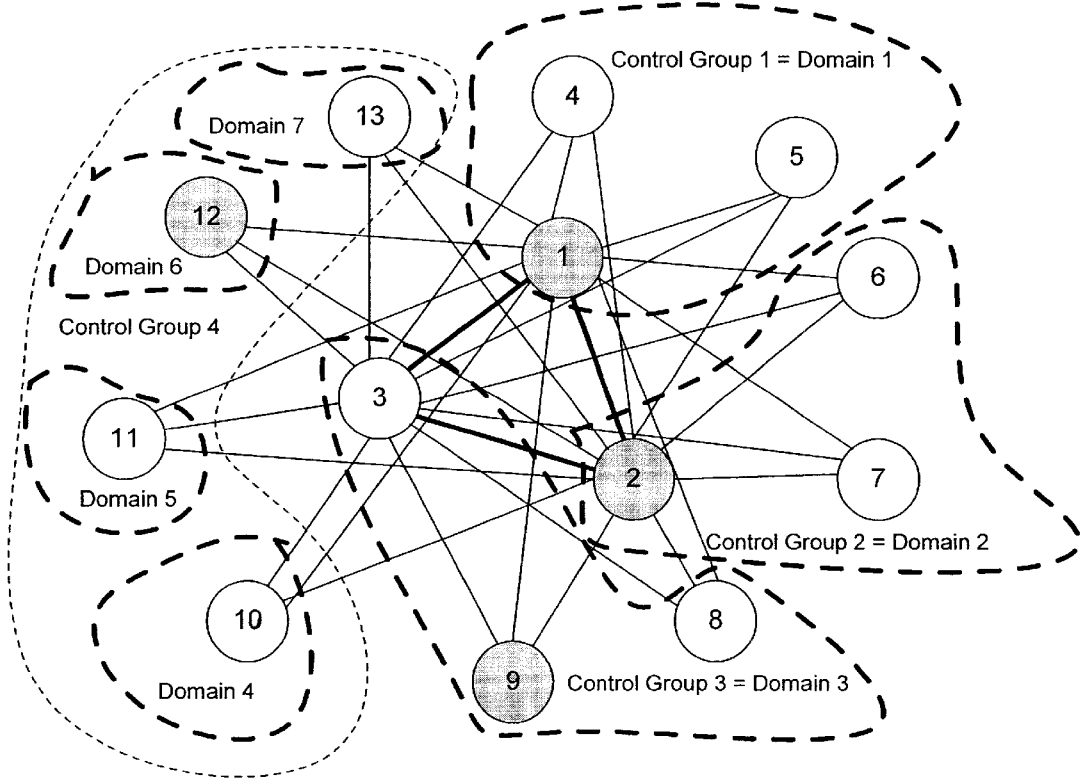

The final configuration becomes the seven-domain, four control group system shown in FIG. 15B.

Example 11

Figure 16A:
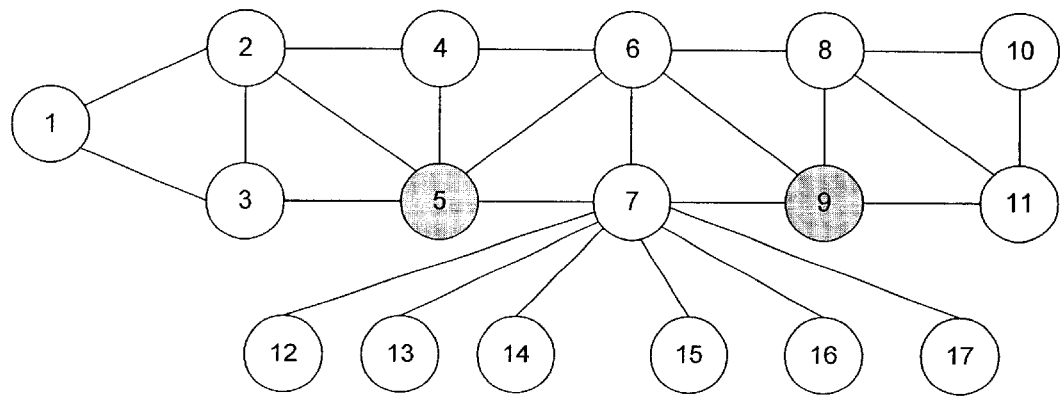
FIGS. 16A–16B illustrate an example of partitioning a graph having both a backbone structure and a mesh structure.

In the above examples, two extreme cases have been considered: where there is no backbone structure, and where a backbone structure exists. In some applications, there can be a mixture of these two cases. Consider the example shown in FIG. 16A. Shown in FIG. 16A is a tree structure embedded in the mesh configuration of FIG. 7A.

The partitioning, according to the above method, proceeds as follows. First, the three-node supernodes and the uncovered nodes are identified (steps 13, 15). For the uncovered nodes, their two-node supernodes are identified. Since nodes 12, 13, 14, 15, 16 and 17 are uncovered, the number of uncovered nodes (6) is more than 50% of the number of covered nodes (11). Therefore, at step 16, the method of FIG. 3B is chosen. Nodes 5 and 9 are placed on the Anchor_List and nodes 1–4, 6–8 and 10–17 are placed on the Nonanchor_List (step 18). Using the anchor nodes as the starting points, control groups are formed. After all three-node supernodes have been included, the weight of each control group is found and the two-node supernodes are assigned in a manner that balances the load among the control groups (steps 20–28). The domains in each control group are then generated (steps 30–34).

Figure 16B:
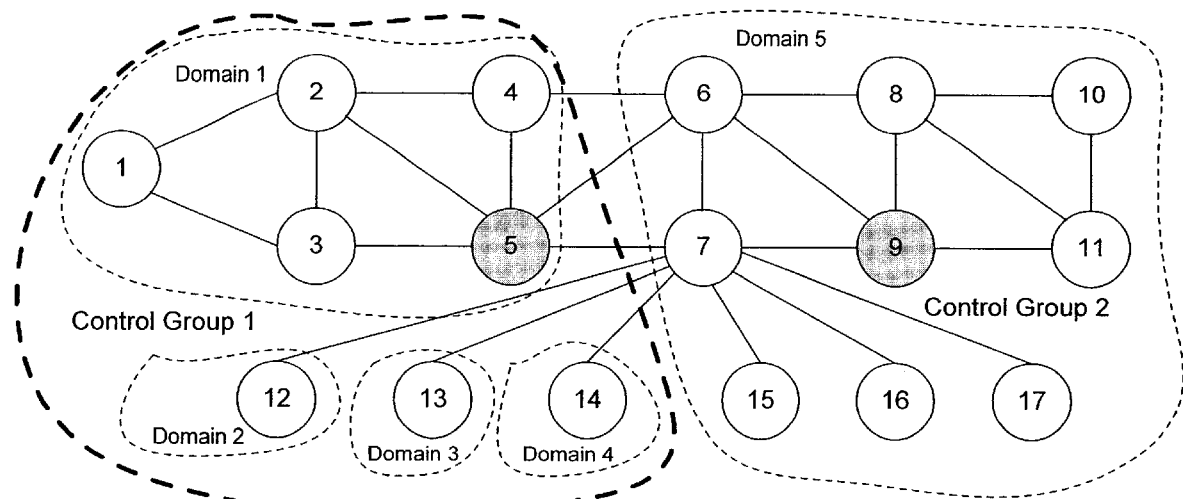

Applying the above scheme to the example, the control group/domain configuration of FIG. 16B is obtained. As FIG. 16B illustrates, there are two control groups (one under each anchor node) and five domains. There are four domains in Control Group 1 and only one domain in Control Group 2 since intra-control group communication in Control Group 2 does not require passing through a node that is outside that control group. Control group 1 consists of nodes 1, 2, 3, 4, 5, 12, 13 and 14. This is under anchor node 9 and consists of four domains. Domain 1 consists of nodes 1, 2, 3, 4, and 5, domain 2 consists of node 12, domain 3 consists of node 13 and domain 4 consists of node 14. Control group 2 consists of nodes 6, 7, 8, 9, 10, 11, 15, 16 and 17. This is Domain 5 under anchor node 9.

If, after the control groups and domains have been formed, one or more nodes goes out of service or is otherwise unable to operate properly, the VNS may rerun the partitioning method of the present invention. Once the network is re-partitioned into domains and control groups to reflect the changed topography, and the server loads are balanced, and the network is operated based on the new partitioning.

Partitioning Graphs Without Anchor Nodes

According to another embodiment of the present invention, a method of partitioning graphs without anchor nodes is provided. This method is useful when the number and location of anchor nodes is not known or when a server which operates a domain becomes inoperable, and therefore leaves a domain without a server or controller. It is also useful when it becomes necessary to reassign the servers in a network, due to an overload on a particular server or controller or to better distribute load across a network, for example. In this embodiment, the graph is partitioned into a number of clusters and then the number of clusters is manipulated to match a desired number of domains, which number will allow the most efficient operation of the network.

Although the method of this embodiment of the present invention is described in more detail below, the method may generally be described as follows with reference to FIG. 17. A preliminary phase of the method first partitions the graph starting with the supernode identification process outlined above. In step 310, strong and weak edges of the graph are identified, as described above. After the supernodes have been identified (step 312), they are then combined to form clusters (step 314).

As described above, a node is considered "covered" if it is included in at least one supernode or one cluster. A cluster is configured such that each node in the cluster is adjacent to at least two other nodes in the cluster.

If any supernode shares two or more nodes with another supernode, the supernodes are combined into one cluster. If any supernode shares two or more nodes with a cluster, the supernode is absorbed into the cluster. If two clusters have a node in common, one cluster is shrunken by removing the shared node from the cluster. The number of clusters is denoted by $N_c$, and the number of desired domains is denoted by $N_D$.

In step 316, $N_c$ is compared to $N_D$. If $N_c=N_D$, the domain weight balancing stage (described below) is commenced (step 318), which attempts to balance the weights across the domains. The weight of a cluster is the sum of the weights of the nodes in the cluster. Controllers are then assigned to each domain (which corresponds to the identified cluster) (step 320).

If the number of clusters is greater than the number of domains ($N_c>N_D$), clusters and supernodes are combined until the desired number of clusters is obtained (step 322). The remaining uncovered and common nodes are moved in order to balance the domains (step 318), and controllers are assigned to the domains (step 320).

In a case where the number of clusters is less than the number of domains ($N_c>N_D$), clusters are formed around uncovered nodes (step 324) and larger clusters are split up to form smaller clusters (step 326). In step 328, the number of clusters is reassessed, and compared once again to the number of desired domains in step 316. The process continues until the number of clusters equals the number of desired domains and steps 318 and 320 are then executed.

Each step described above will now be discussed in greater detail.

Figure 17:
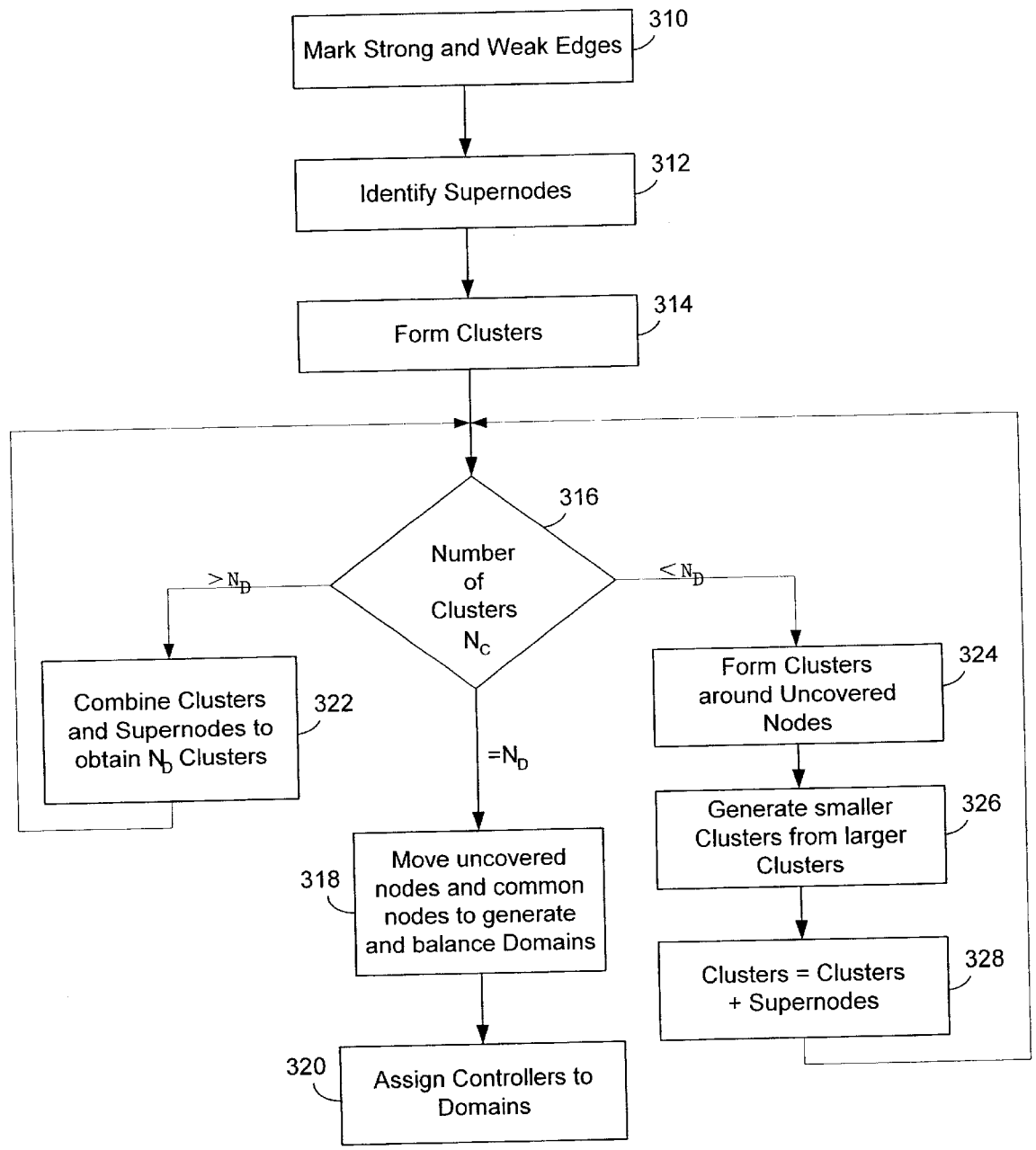
FIG. 17 is a flow diagram of a process performed in order to automatically partition graphs in accordance with a second embodiment of the present invention.

Cluster Generation from Supernodes (step 314 of FIG. 17)

After the links have been identified (step 310) and the supernodes have been generated and placed in the supernode list as described above (step 312), clusters are generated (step 314). A cluster is initially generated by combining two supernodes that are adjacent (in the sense that they have two nodes in common). The size of a cluster is increased by progressively combining two clusters (or a cluster and a supernode) that are adjacent into larger clusters. When a supernode is absorbed into a cluster, it is "marked" and will not be considered again in the cluster generation since the supernode cannot be in more than one cluster. Note, however, that the same node can be in more than one cluster if the node is in two or more supernodes that have no other node in common. Thus the scheme can be formally defined as follows:

Let S denote a supernode list and let C denote a cluster list. Let S[i] denote the $i^{th}$ member of S;

Let "app" denote an "append" operation, let "mrg" denote a "merge" operation, and let "cmp" denote a "comparison" operation; and Let Len(S) denote the number of elements in S.

The cluster generation method can be stated as follows:

```
C = [ ]                  // initially the cluster list is empty
fir (I=1; I<=Len(S); I++) {
        for S[i] unmarked {
                Mark S[i]
                for (j=I+1; j<=Len(S); j++) {
        Compare S[i] and S[j]
        if S[i] and S[j] match in two or more places
                {S[i]=S[i] mrg S[j]    //merge S[i] and S[j]
                if S[j] is unmarked {Mark S[j]}
                if S[i] contains weak link
                { S[i]=S[i]–S[j]
```

```
                    Unmark S[j] } } } }
C=C app S[i] }      // append S[i] to C
```

Thus, C contains clusters that are each composed of supernodes and clusters of supernodes where the supernodes have more than one node in common with another supernode. The cluster does not include a weak edge that may inadvertently be introduced via the supernode merging process.

Once the supernodes have been formed, the cluster formation complexity can be computed as follows. Assume that there are m supernodes. To form clusters, those supernodes that have two nodes in common are considered. In the best case, all the supernodes form one cluster and so starting with any supernode m−1 comparisons are made and a cluster is formed. In the worst case, all the supernodes are disjoint and m(m−1) comparisons must be made. Thus, the complexity is $O(m^2)$. The complexity of the domain formation process depends on both the number of clusters formed, the number of domains required, and the number of uncovered nodes.

Domain Generation and Domain Weight Balancing (step 318 of FIG. 17)—Overview As stated earlier, the purpose of the preliminary phase is to provide an initial starting point for partitioning the graph with no attention paid to the weight of each partition. The domain weight balancing phase addresses the need to ensure that all nodes are covered and that the weights are approximately the same in all domains (yet to be generated). If the total weight of the graph is W, the weight of each domain ideally is $L=[W/N_D]$.

As described above, a tolerance factor t may be defined for balancing of weight among domains. If all nodes are covered, the graph is partitioned around the clusters. If the weight of each cluster is L plus or minus t, the domains have been generated. If the weight of at least one cluster is larger than L plus t, boundary nodes are moved to reduce the weight until all clusters have weights within the range, making sure that such adjustment does not include a weak edge in a cluster.

As described more fully below, if there are uncovered nodes, they are moved into the clusters to balance the weights and avoid the inclusion of a weak edge in a cluster. In cases where the node can be included in more than one cluster, it is preferable to include a node in a cluster where it is not adjacent to any member of the cluster via a weak edge. Alternatively, it is better to include a node in a cluster where it is adjacent to at least two other members of the cluster via non-weak edges. In general, unless it is absolutely necessary, an uncovered node should not be included in a cluster where it is adjacent to only one other node in the cluster. When all nodes are covered and all clusters have weights in the designated range, the clusters become domains.

In any event, when this step is performed, all the nodes may not be covered, but $N_c=N_D$. Also, a covered node may belong to more than one cluster. Since each node must belong to only one domain, membership in each cluster may need to be modified not only to achieve the above goal but also to balance the weights of the different domains. Two cases are considered—when all the nodes are covered and when at least one node is uncovered.

Weight Balancing with All Nodes Covered (step 318 of FIG. 17 Where all Nodes Covered)

There are two cases to consider: either all the clusters are disjoint or at least two clusters overlap (i.e., they have a node in common). If all the clusters are disjoint, their weights are computed to ensure that they are within the predefined range, L±t.

The more challenging case is when the clusters are not all disjoint. Consider two clusters that have a node in common. First, the weight of each cluster is computed, by summing the weight of all nodes in each cluster.

If one cluster was generated from an uncovered node and the other cluster was not generated from an uncovered node, the cluster generated from an uncovered node retains all its nodes while all its neighboring clusters lose the nodes they share with that cluster. The cluster membership and weight of all its neighboring clusters are updated.

If both clusters were generated from uncovered nodes, the common node is assigned to the cluster with the smaller weight. Each cluster retains all its other nodes and the membership of the other clusters is updated to reflect the nodes they lost to the clusters generated from uncovered nodes.

If neither of the clusters was generated from an uncovered node, the node is assigned to the cluster with the smaller weight and the weights and the membership of the clusters are updated. This process is repeated until all clusters are disjoint.

Having obtained disjoint clusters with modified cluster membership, some of the clusters may contain nodes that are leaf nodes relative to their clusters. A "leaf" node is a node that is adjacent to only one other node in its environment. In this situation, the environment is the cluster.

Next, an attempt is made to balance two objectives. One objective is to ensure that the weights in the clusters are balanced, and another objective is to ensure that every node in a cluster is adjacent to at least two other nodes, that is, there are no leaf nodes unless absolutely necessary.

The adjacency objective is addressed first, followed by weight balancing. If a node is a leaf node in a cluster but is adjacent to at least two other nodes in another cluster, the node is moved into the cluster where the other two nodes are located. Cluster membership and weights are updated. If no such cluster can be found, the node remains in its present cluster.

The weights may then be balanced as follows. The weight of each cluster is determined and it is determined if the weight lies in the predefined range. If every weight lies in the range, the clusters become the domains. If a cluster's weight is larger than the maximum allowed weight (W>L+t), a neighboring cluster having the smallest weight without a weak link interconnecting them is found. A node which is adjacent to the smaller cluster is moved to the smaller-weight cluster. Since the moved node may now be a leaf node, the cluster will examine its nodes to see if it is still adjacent to the cluster into which it moved a node. If it is, and the new node (which is adjacent to a node in the other cluster) is also adjacent to the previously moved node, the second node is also moved into the other cluster; cluster membership and weights are then updated. If it is not, the new node remains a leaf node.

If its weight is less than the minimum allowed weight (W<L−t), the weights of all clusters to which the cluster is adjacent via non-weak edges are examined. If at least one such cluster exists, it will request from the cluster with the largest weight the transfer of the node through which the two clusters are adjacent. If the node transferred to it is now a leaf node, the cluster will attempt to acquire another node from the cluster which is both adjacent to it and to the previously moved node. If such a node can be found and there is no weak edge involved, it is also moved into the cluster; otherwise, the moved node remains a leaf node.

This process of moving nodes continues until all clusters have weights that lie within the prescribed limits.

Weight Balancing with Nodes Uncovered (step 318 of FIG. 17. Where Not All Nodes are Covered)

Consider a cluster that shares a node with one or more other clusters. If none of the clusters involved is adjacent to an uncovered node, the common node is assigned to the cluster with the smallest weight. If at least one of the clusters is adjacent to an uncovered node, the uncovered node is moved into a cluster first before assigning the common node to one of the clusters. First, all weights of clusters that are adjacent to the uncovered node via a non-weak edge are found. The node is then moved into the cluster with the smallest weight, the weights and membership of the clusters are updated, and after all uncovered nodes have been assigned, the weights of all clusters that have a node in common are determined and the common node is assigned to the cluster with the smallest weight.

If an uncovered node is adjacent to two or more disjoint clusters via non-weak edges, the node is assigned to the cluster with the smallest weight. If a node is adjacent to a set of clusters via non-weak edges and one of these clusters is adjacent to the uncovered node via a leaf node, the uncovered node is assigned to the cluster with a leaf node if the weight of each cluster in the set is above the minimum weight. Otherwise, the node is assigned to the cluster with the smallest weight.

Cluster Generation from Uncovered Nodes (step 324 of FIG. 17)

When the number of clusters that have been generated is less than $N_D$, and some nodes are uncovered, an attempt is made to define clusters around these uncovered nodes (step 24). The following method may be used to generate clusters from uncovered nodes. Let $S_N$ denote the set of nodes in the graph. Let $S_C$ denote the list of nodes that appear at least once in the cluster list. Finally, let $S_U$ denote the list of uncovered nodes; that is, $S_U = S_N - S_C$.

For each node l in $S_U$ and for each $a_{ij}$ (=k) in $A_l$ (adjacency list for node l), the smallest circuit (i.e., a closed loop through the nodes) through l is found and appended to a cluster C. A variety of methods for identifying loops would be readily apparent to one of skill in the art. If two nodes x and y in $A_l$ are both adjacent to a node t (which can be found from their adjacency lists), then a cluster {l, x, t, y} is formed from the circuit {l, x, t, y, l}, otherwise, for each node in $A_l$, the next level of the adjacency search is started. Let x and y be nodes in $A_l$. If a node m in $A_x$ and a node n in $A_y$ are both adjacent to a node z, then a circuit {l, x, m, z, n, y, l} exists and the cluster {l, x, m, z, n, y} is included in cluster C. The method is continued until $N_D - N_c$ clusters have been generated using the uncovered nodes or all uncovered nodes are covered, whichever comes first.

Examples 13 and 14 (below) demonstrate cluster generation from uncovered nodes.

Cluster Partitioning (step 326 of FIG. 17)

When the number of clusters that have been generated is less than $N_D$ ($N_c < N_D$) and all the nodes are covered, the larger clusters may be partitioned into smaller clusters. Let $N_c$ denote the number of clusters in the current partitioning, C; that is, $N_c$ is the cardinality of C. Thus, $N_D - N_c$ additional clusters must be generated. The method starts with the cluster with the largest number of nodes and breaks it up into two clusters. If $N_c$ is still less than $N_D$, it determines the next largest cluster and breaks it up into two clusters, and so on until $N_D = N_c$. The details of a cluster partitioning method according to the present invention will now be described. The clusters are arranged in decreasing order of cardinality (number of nodes within a cluster) and the cluster with the largest cardinality is chosen. Any two supernodes in the cluster that do not have a node in common are taken and two clusters, each having one of the two supernodes are formed as the starting point. Any other supernode is then added to one of the two partitioned clusters if that supernode does not share a node with any supernode in the other cluster. This process is continued until all the nodes in the original cluster are covered, and the cluster count is updated ($N_c = N_c + 1$). If $N_c = N_D$, the domain generation stage (described below) is commenced; otherwise the process is repeated with the next cluster with the largest cardinality.

Figure 18:
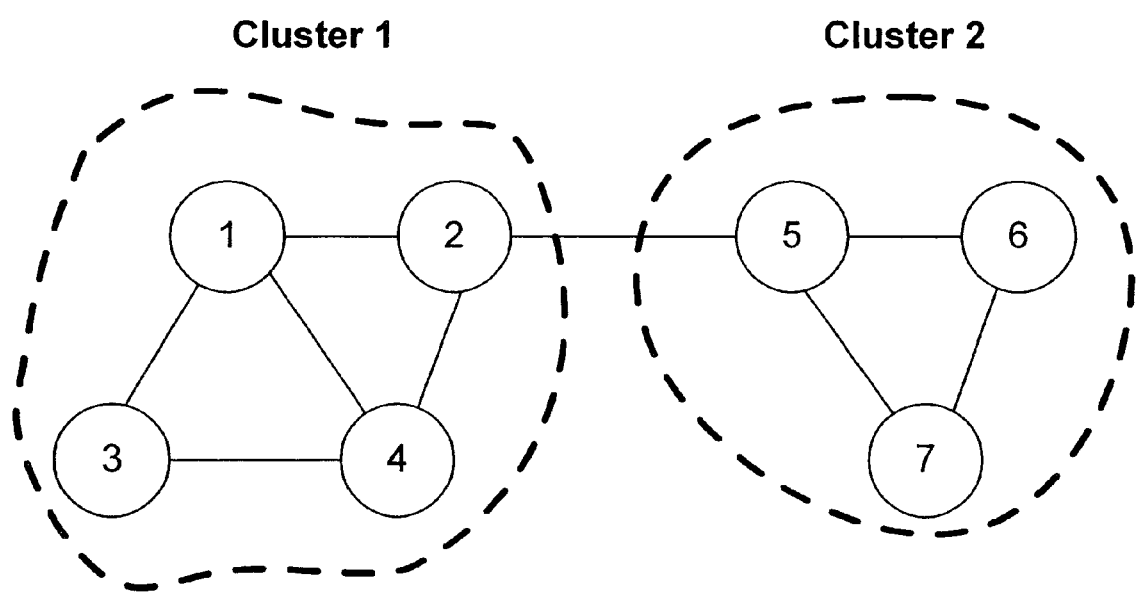
FIG. 18 illustrates a graph which is partitioned into two domains.

If the clusters are configured such that there are no supernodes in a cluster that do not have a node in common, and therefore the cluster cannot be partitioned into two clusters, the number of clusters remains the same, and any unassigned servers are used as back-ups to the assigned servers, or are reserved for future expansion. For example, consider the graph of FIG. 18. When the graph is partitioned according to the present invention, the graph contains two clusters ($N_c = 2$). Cluster 1 includes nodes 1, 2, 3 and 4, and cluster 2 includes nodes 5, 6 and 7. If $N_D = 3$, an attempt is made to partition the clusters so that $N_c = 3$. However, in this case, neither cluster has supernodes having no nodes in common. Therefore, neither cluster may be partioned into two separate clusters. In this case, the first server is assigned to cluster 1, the second server is assigned to cluster 2 and the third server is used either as a back-up for the first and second servers or is reserved for future expansion of the graph. If more nodes are added to the graph, the graph is repartitioned and, as soon as the graph is capable of being partitioned into three domains using the method described above, the third server is assigned to one of the three domains.

Note that the method works well for the case where two nodes in two separate supernodes in the cluster are preferred to be in different clusters (if they are connected by a weak edge, for example). In this case, two supernodes are chosen such that one supernode includes one of these two nodes and the other includes the other node, but the two supernodes must not have a common node.

Example 15 (below) demonstrates cluster partitioning.

Cluster Combination (step 322 of FIG. 17)

When the number of clusters $N_c$ is greater than $N_D$ ($N_c > N_D$), a total of $N_c - N_D$ clusters must be merged with the other clusters. To achieve this goal, all the clusters are first made to be disjoint.

Accordingly, every common node is assigned to the cluster with the largest weight in the set of clusters in which it is located. If the number of nodes remaining in a cluster after the common node is removed is less than three, that cluster disappears from the cluster list (since the basic unit of cluster membership is the supernode and a supernode must have at least three nodes). Then, the weight of each cluster is determined.

If the number of clusters is still greater than $N_D$, the two lowest-weight clusters that are adjacent via at least two non-weak edges, if two such clusters exist, are combined into one cluster. The cluster list, cluster weights and cluster membership are then updated accordingly.

If the number of clusters is still greater than $N_D$, two lowest-weight clusters that are adjacent through one non-weak edge and an uncovered node, if two such clusters exist, are combined into one cluster that includes the uncovered node.

If the number of clusters is still greater than $N_D$, then, starting with the smallest cluster by weight, any cluster that is adjacent to it via two or more non-weak edges is combined into one cluster. This process is continued until the number of clusters is $N_D$.

Example 16 (below) demonstrates cluster combination.

Examples of Partitioning Graphs Without Anchor Nodes

In the following sections, the method is detailed via examples 12–16. In all the examples that follow it is assumed that there are three controllers; that is, $N_D$=3. The flowcharts which illustrate the examples include corresponding references to the process illustrated in FIG. 17.

Example 12

Figure 19A:
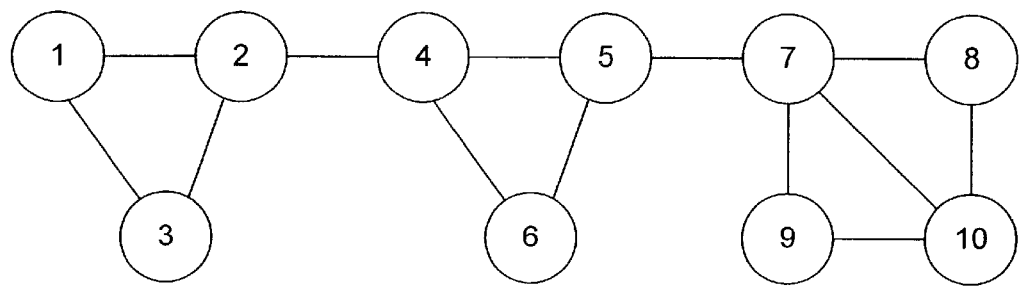
FIGS. 19A–19C illustrate an example for generating domains in accordance with the second embodiment of the present invention.
Figure 19B:
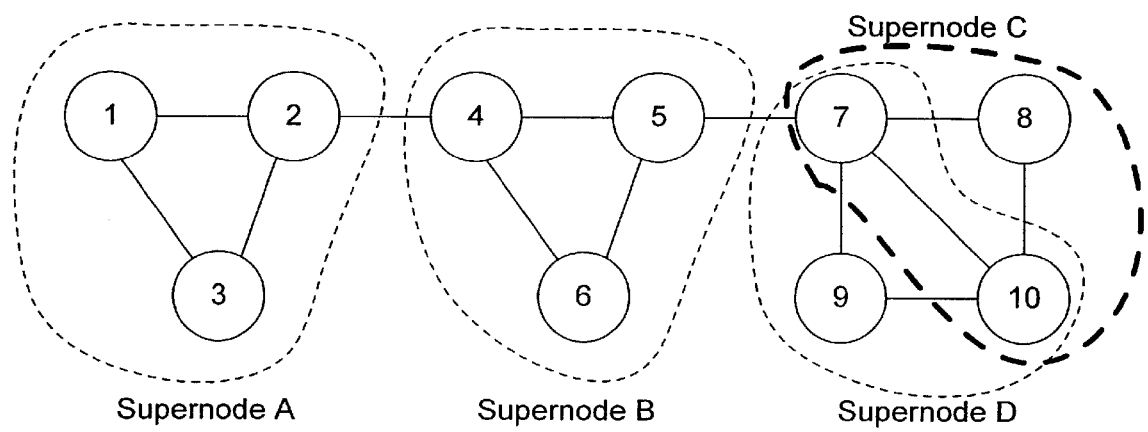
Figure 19C:
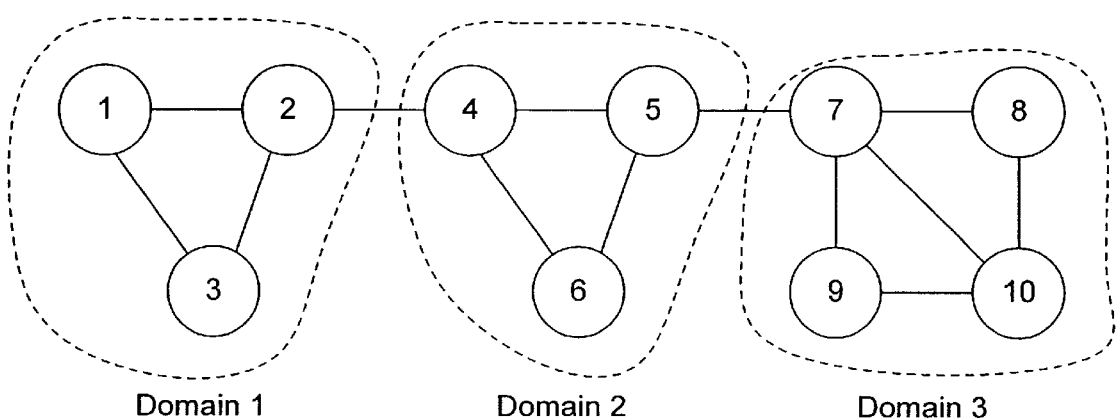
Figure 19D:
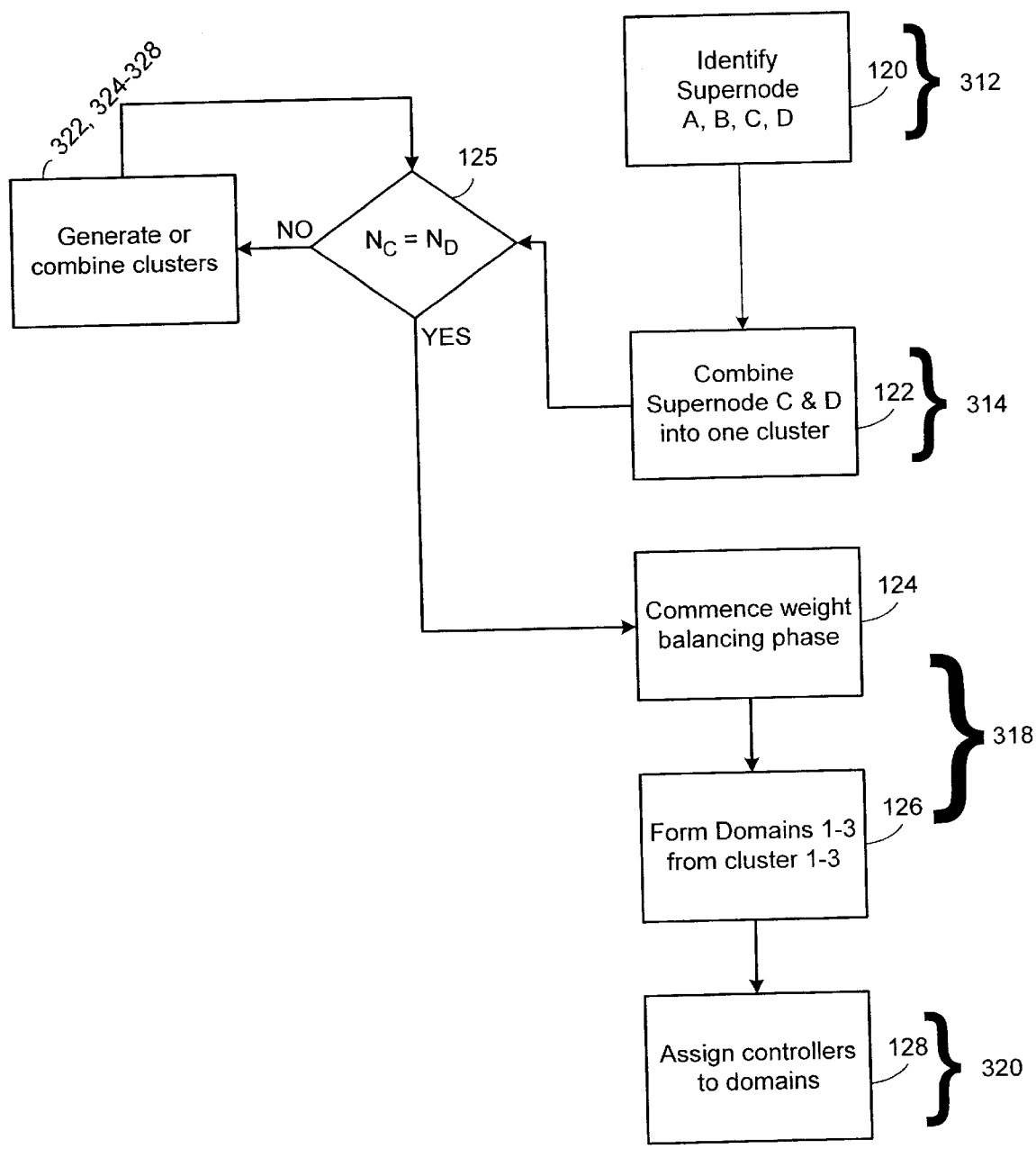
FIG. 19D is a flow diagram of the process performed in the example of FIGS. 18A–18C.

FIGS. 19A–19C show a graph model of a communication network having nodes 1–10 interconnected by edges, including two "bridge" edges connecting nodes 2 and 4 and nodes 5 and 7. In this example, it is assumed that all nodes have the same weight. FIG. 19D is a flowchart of a method to automatically partition the graph of FIG. 19A. In step 120, four triangular supernodes are identified. These supernodes are outlined and labeled supernodes A, B, C and D in FIG. 19B. Since supernodes C and D have nodes 7 and 10 in common, they are combined into one cluster (step 122), thus giving three clusters. Since the total number of clusters and domains is 3 ($N_D$=$N_c$) (step 125), the weight balancing phase is then commenced (step 124). Clusters 1–3 are transformed into domains 1–3 (step 126). In the weight balancing phase, it is first noted that all nodes in the graph are covered. Also, the weight of each potential domain is approximately the same. Thus the process is complete, and domains 1–3 are as shown in FIG. 19C.

Having generated the domains, the domain controllers can then be assigned to them based on the appropriate assignment rules (step 128). Note that adding an edge between nodes 3 and 6 or between nodes 6 and 9 would not change the above configuration (because the supernodes are the same). On the other hand, if an edge were present between nodes 3 and 4 (or between nodes 2 and 6), another triangular supernode is generated consisting of nodes 2, 3, and 4 (or nodes 2, 4, 6). Such a supernode would share nodes 2 and 3 with supernode A and therefore it would be merged with supernode A leaving node 4 in a cluster and a supernode. However, during the domain weight balancing phase, node 4 will be taken out of the cluster to balance the weights. Thus, the same configuration as above would be obtained.

Example 13

Figure 20A:
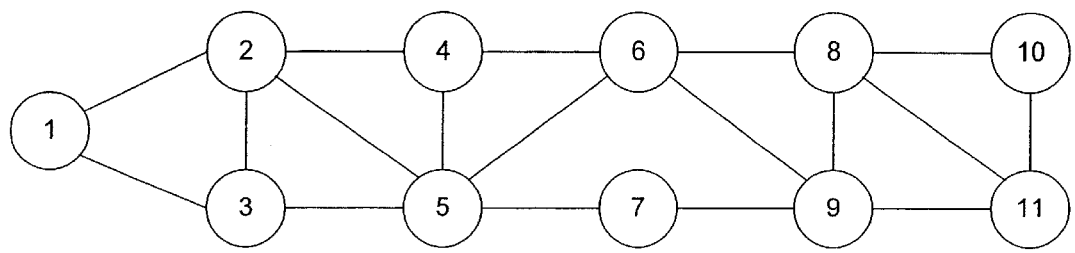
FIGS. 20A–20F illustrate cluster generation from uncovered nodes.
Figure 20B:
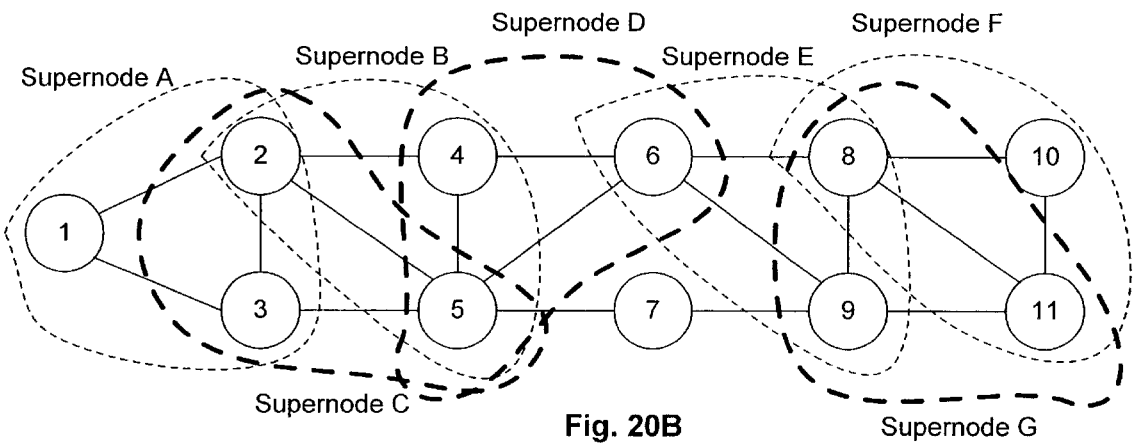
Figure 20C:
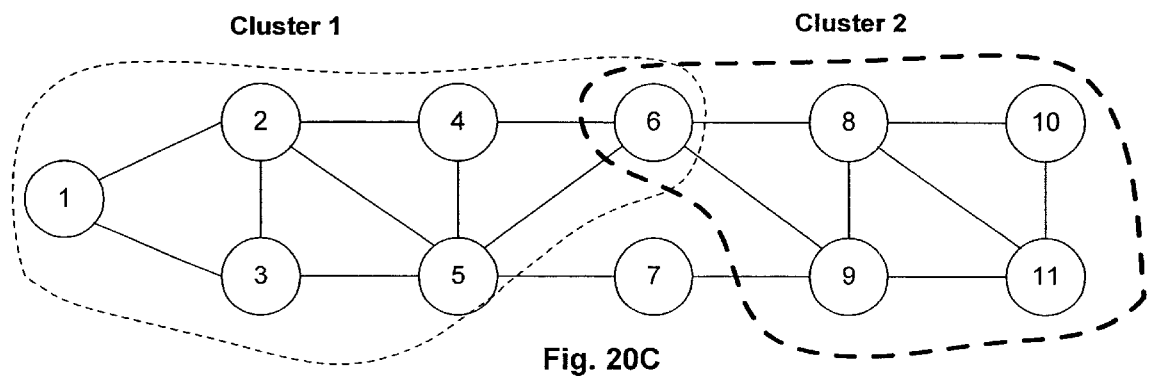
Figure 20D:
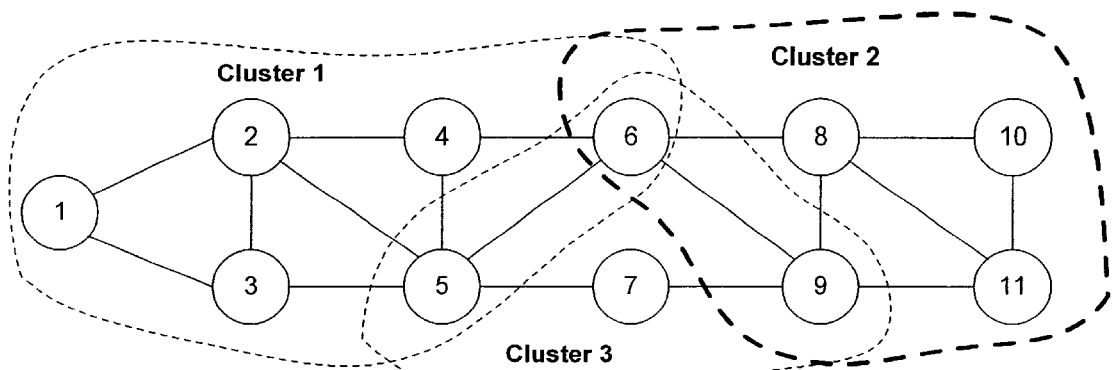
Figure 20E:
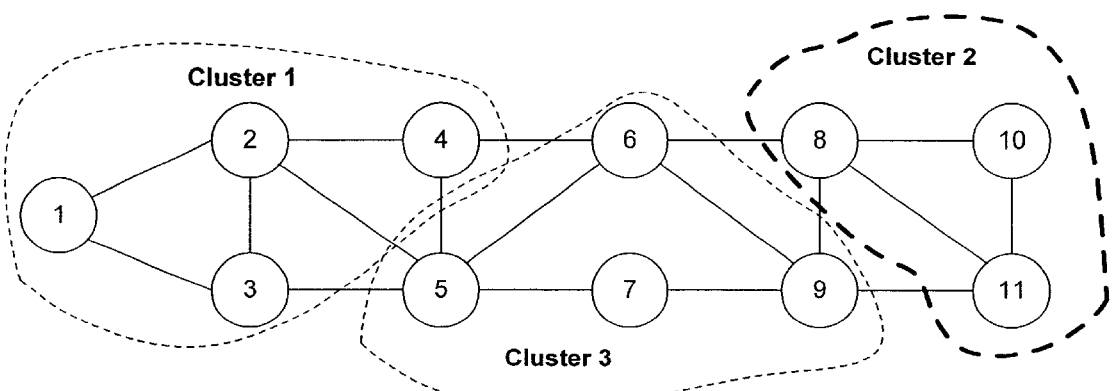
Figure 20F:
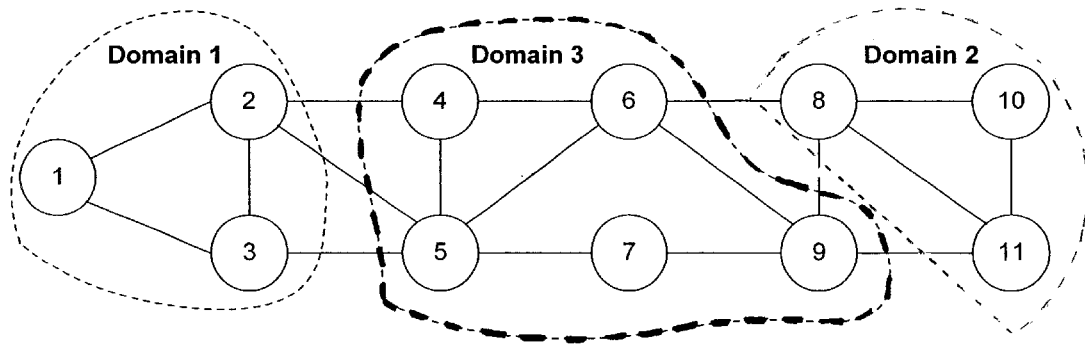
Figure 20G:
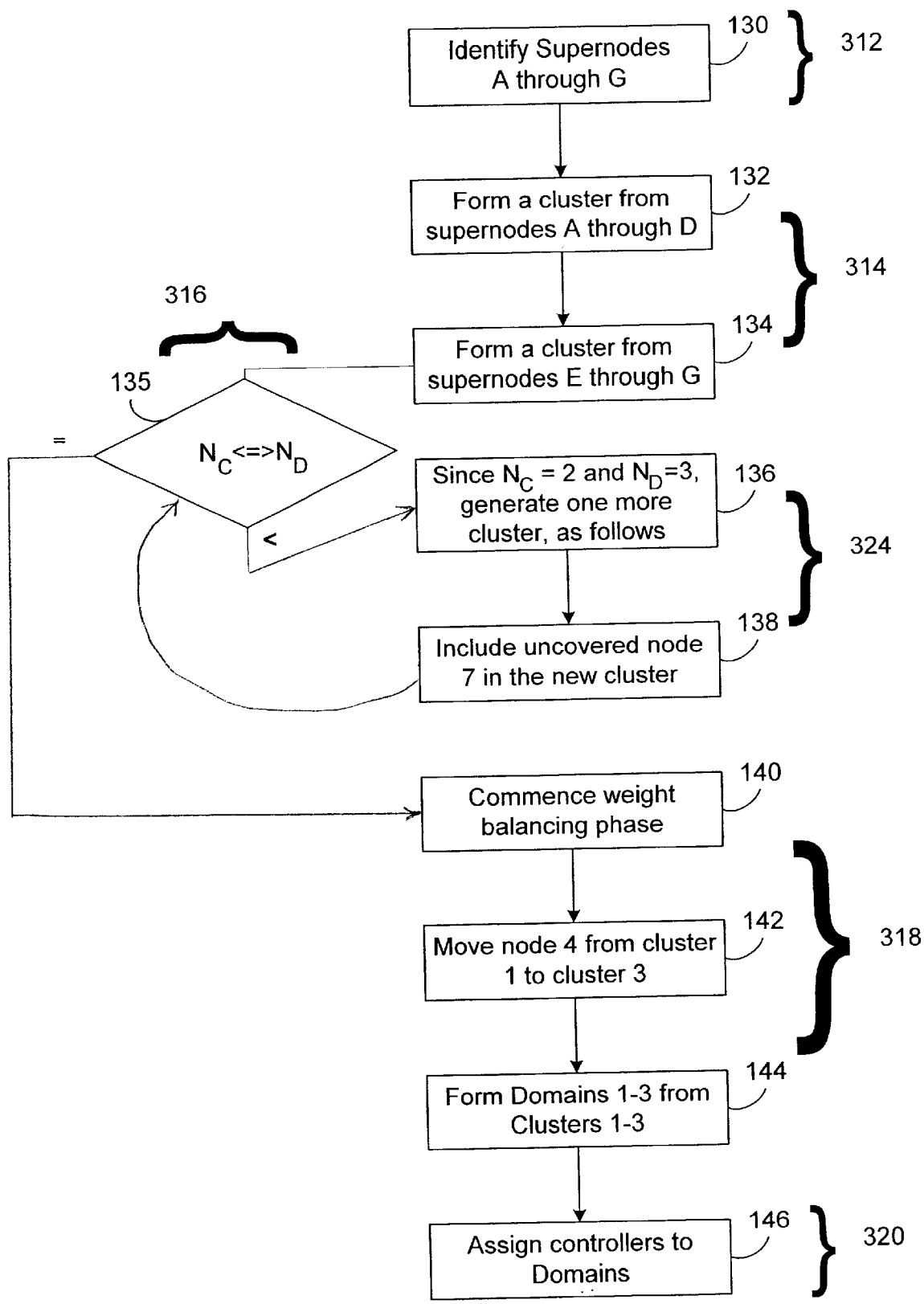
FIG. 20G is a flow diagram of the process performed in the example of FIGS. 19A–19F.

Referring now to the graph of FIGS. 20A–20F, which show nodes 1–11 interconnected by edges, the method described above is implemented as shown in the flowchart of FIG. 20G. First, the supernodes are identified, as described above (step 130). There are 7 of them, outlined and labeled supernodes A through G in FIG. 20B. Since supernodes A through D each have two nodes in common, a cluster is formed from these nodes (step 132). Similarly, since supernodes E through G each have two nodes in common, a second cluster is formed (step 134). (Both as described above.) The new cluster configuration is shown in FIG. 20C. Now, there are two clusters ($N_C$=2) and three controllers ($N_D$=3). So, one more cluster must be generated (step 136). Since there is an uncovered node (node 7), an attempt to center the new cluster around it must be made. Since a cluster is a set of nodes such that each member of the cluster is adjacent to at least two other members, a simple cluster comprising nodes 5, 6, 7 and 9 is identified (step 138). The resulting cluster configuration is shown in FIG. 20D.

There are now an equal number of clusters and controllers and the domain weight balancing phase is commenced (step 140). (This method is described in greater detail above, with respect to the section titled "Weight Balancing with All Nodes Covered.") Since Cluster 3 was generated from an uncovered node, it retains all its nodes, as shown in FIG. 20E. Now, node 4 of Cluster 1 is a "leaf" node in cluster 1, as it is only connected to one other node in cluster 1. Since the weights of all the clusters must fall within a predetermined range (±t), there are two choices: to not apply the adjacency rule (requiring any node in a cluster to be adjacent to at least two other nodes in the cluster) meaning that node 4 remains in Cluster 1; or apply the adjacency rule and move node 4 into Cluster 3 (step 142). This means that Cluster 1 consists of nodes 1, 2 and 3, Cluster 3 consists of nodes 4, 5, 6, 7 and 9, and Cluster 2 consists of nodes 8, 10 and 11. The latter case which has no leaf nodes is preferred, and the configuration shown in FIG. 20F is obtained. Clusters 1–3 are then transformed into domains 1–3 (step 144), and a controller is assigned to each domain (step 146).

Note that Domain 3 has five nodes while Domains 1 and 2 have three nodes each. If the number of nodes is balanced by either assigning node 4 to Domain 1 or node 9 to Domain 2, domain configurations are obtained in which node 4 is adjacent to only one node in Domain 1 and node 7 is adjacent to only one node in Domain 3. In order to avoid these potential leaf nodes, the domains remain as shown in FIG. 20F, as slightly unbalanced domains are preferred over domains having leaf nodes.

Example 14

Figure 21A:
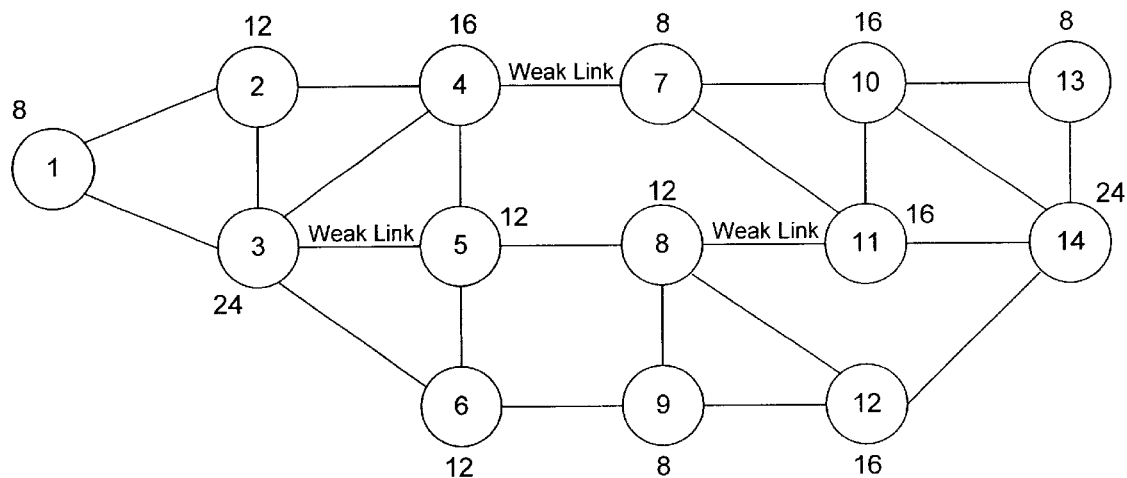
FIGS. 21A–21D illustrate another example of cluster generation from uncovered nodes.
Figure 21B:
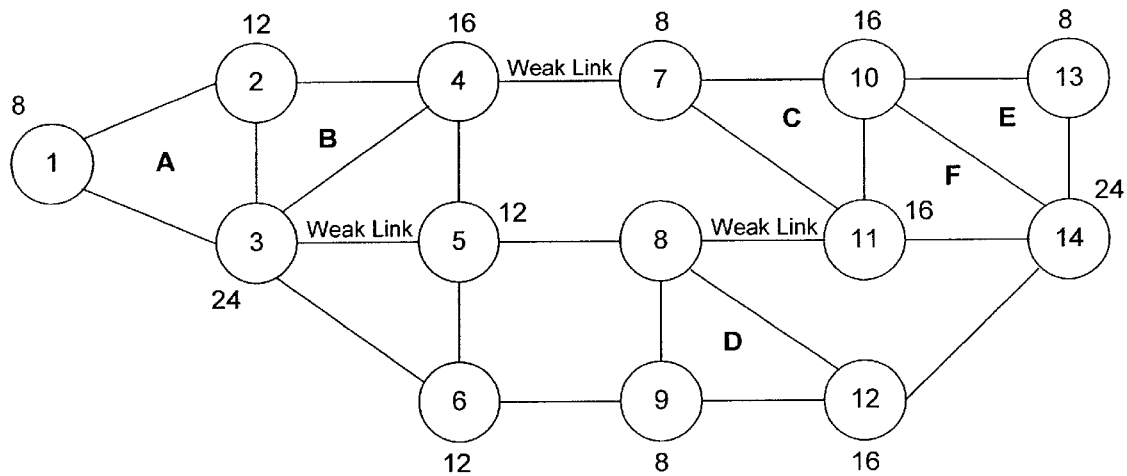
Figure 21C:
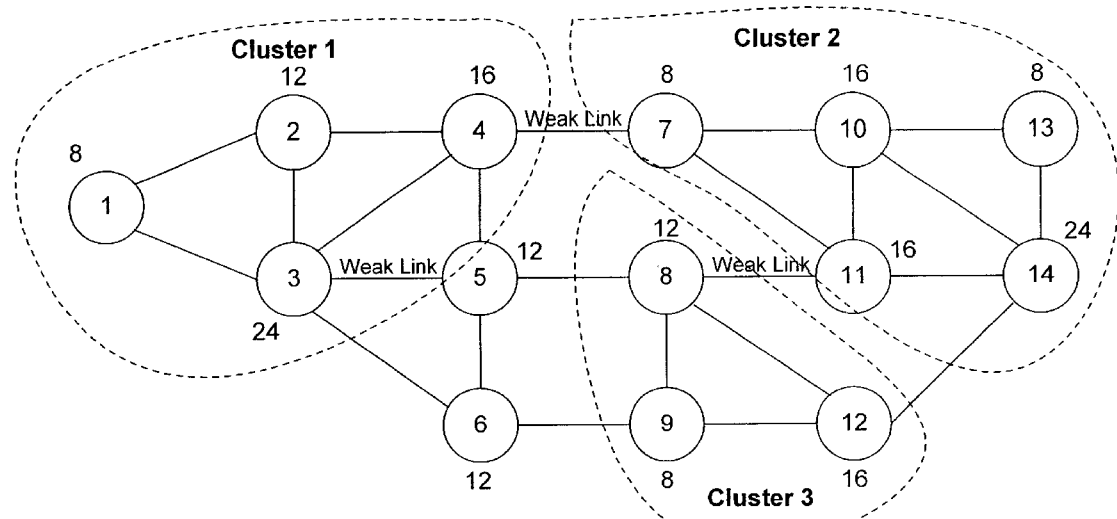
Figure 21D:
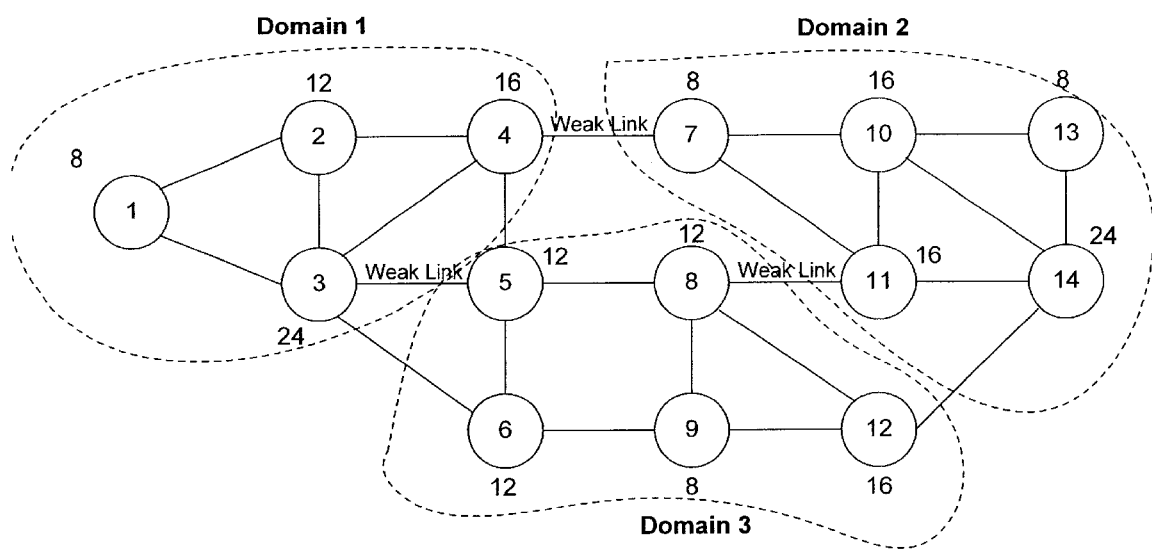
Figure 21E:
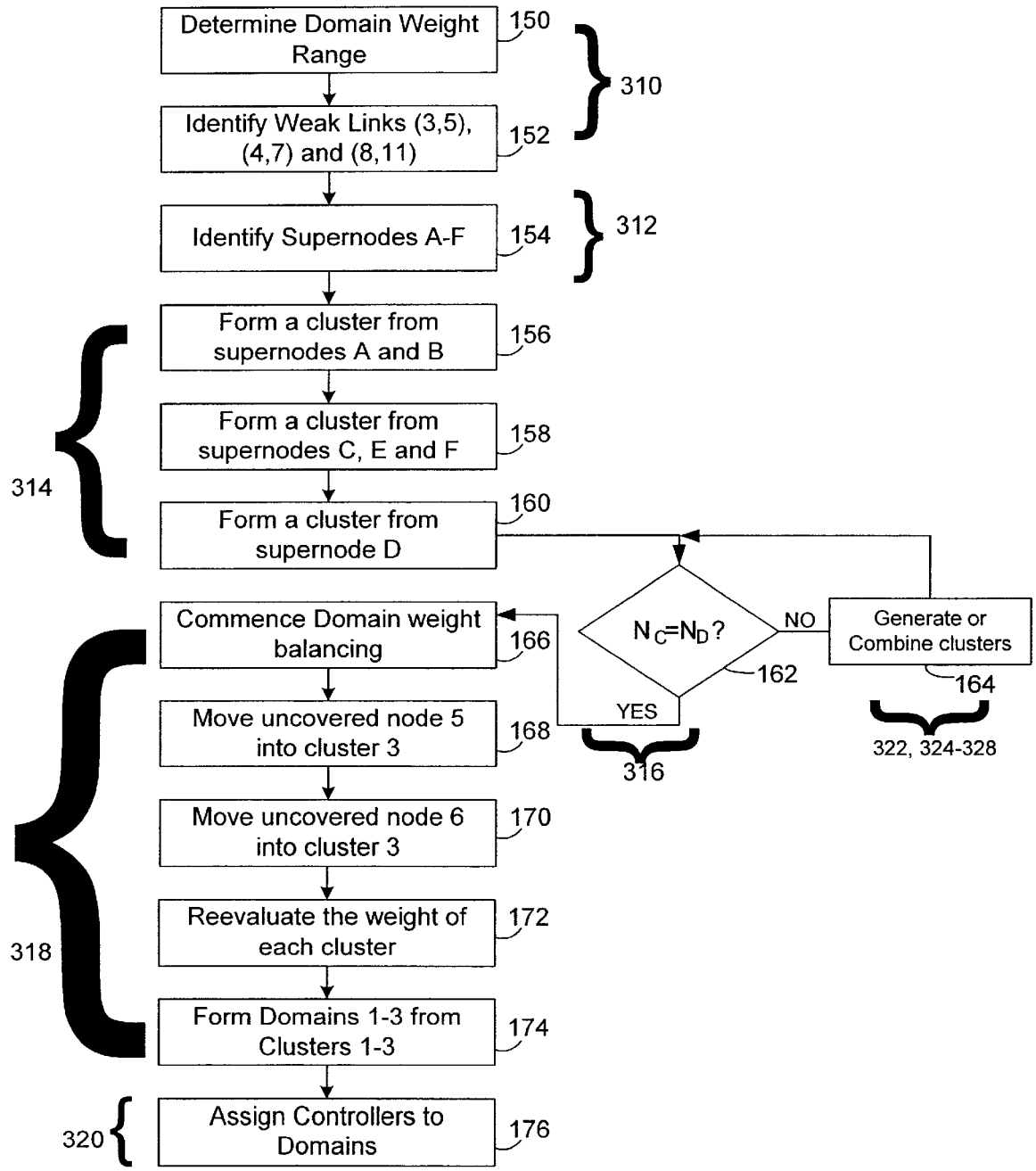
FIG. 21E is a flow diagram of the process performed in the example of FIGS. 20A–20D.

In the earlier examples, it was assumed that the nodes were equally weighted. In the example of FIGS. 21A–21D, a graph model of a communication network is illustrated, in which the nodes have different weights. The weight of each node is indicated by the number next to each node. As shown in the flowchart of FIG. 21E, first, the domain weight range is determined (step 150). In this example, the graph has a total weight of 192. If a tolerance (t) of 8 is allowed, the weight in each of the three domains to be generated should be 192/3 (=64) plus or minus 8, or weights in the range [56–72]. Weak edges are then identified (step 152). FIG. 21A shows three weak edges, edges (3, 5) (the edge from node 3 to node 5), (4, 7), and (8, 11). As such, these are not expected to be intra-domain edges.

In generating the three required domains, first the supernodes are identified (step 154). In this example, they are all triangular supernodes, which are labeled A through F in FIG. 21B. Note that because edge (3, 5) is a weak edge, the triplets (3, 4, 5) and (3, 5, 6) are not identified as supernodes.

Next, clusters are formed from the supernodes. Supernodes A and B share two nodes (step 156), and so form cluster 1, FIG. 21C. Similarly, supernodes C and F, and F and E share two nodes and so form cluster 2 (step 158). Supernode D forms cluster 3 (step 160). The number of clusters is then compared to the desired number of domains (step 162). Since three clusters have been generated ($N_C=3=N_D$), the preliminary phase is complete. Had the number of clusters been below or above the desired number of domains, clusters would be generated or combined, respectively, until $N_C=N_D$ (step 164), as described in more detail elsewhere herein.

The domain weight balancing phase is then commenced (step 166). First, it is observed that nodes 5 and 6 are not covered. Since they are not adjacent to any node in Cluster 2, they cannot be assigned to that cluster. Also, since node 5 is adjacent to a node in Cluster 1 via a weak edge, it cannot be assigned to that cluster. Thus, it is assigned to Cluster 3 (step 168), where it remains currently as a leaf node. (See discussion above for a detailed description of a method for accomplishing this.) Finally, node 6 can be assigned to either Cluster 1 or Cluster 3. However, if it is assigned to Cluster 1, it will be a leaf node in that cluster. If it is assigned to Cluster 3, it is adjacent to both leaf node 5 and node 9 in that cluster. So node 6 is assigned to Cluster 3 (step 170), such that there are no leaf nodes in any cluster.

In step 172, the weight of each cluster is reevaluated. The weight of Cluster 1 is the sum of the weights of nodes 1–4 (60), the weight of Cluster 2 is the sum of nodes 7 and 10–14 (72), an weight of Cluster 3 is the sum of nodes 5, 6, 8, 9 and 12 (60). Since these weights lie within the desired range (56–72), clusters 1–3 become the domains 1–3 (step 174) and controllers are assigned to the domains (step 176). The final configuration is shown in FIG. 21D.

Example 15

FIGS. 22A–22D illustrates an example graph model of a communication network. This is a modification of Example 12, and it is assumed that the nodes are equally weighted. Operation of a method according to the present invention and processing the example of FIGS. 22A–22D is shown in the flowchart of FIG. 22E.

Figure 22A:
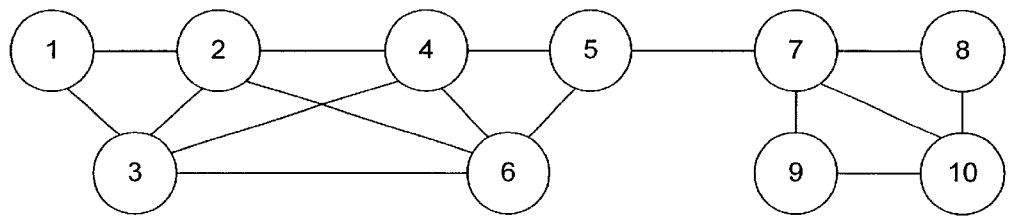
FIGS. 22A–22D illustrate an example of cluster partitioning.
Figure 22B:
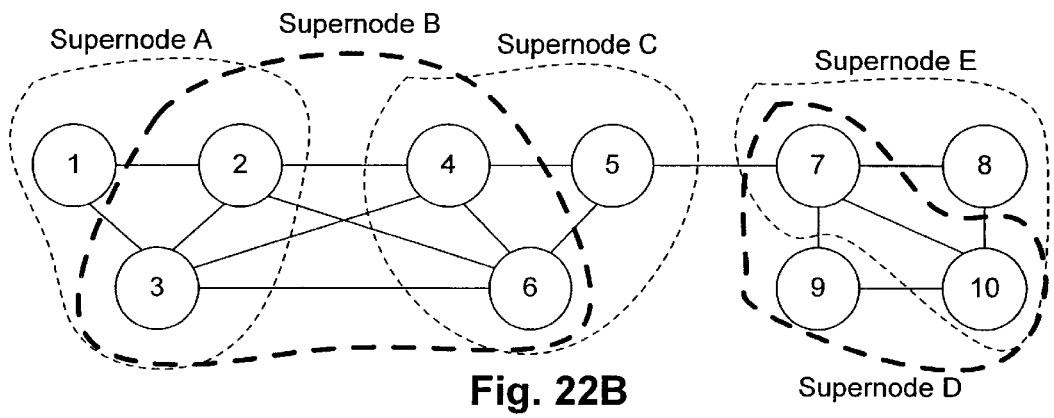
Figure 22C:
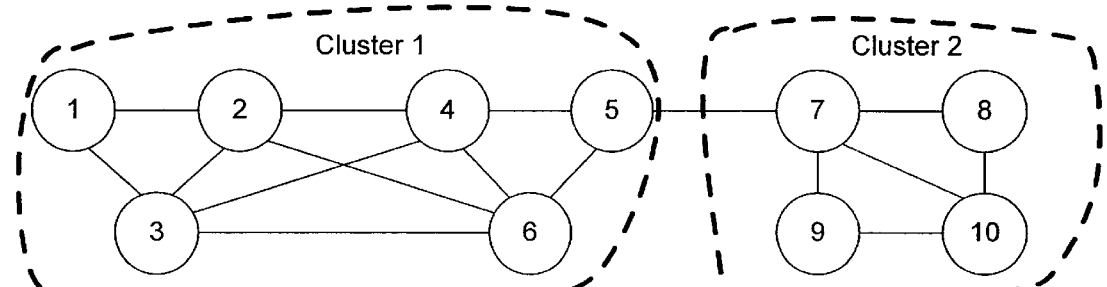
Figure 22D:
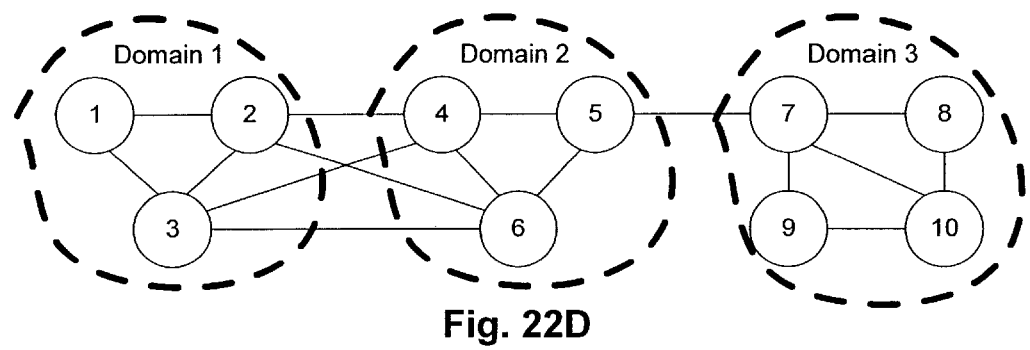
Figure 22E:
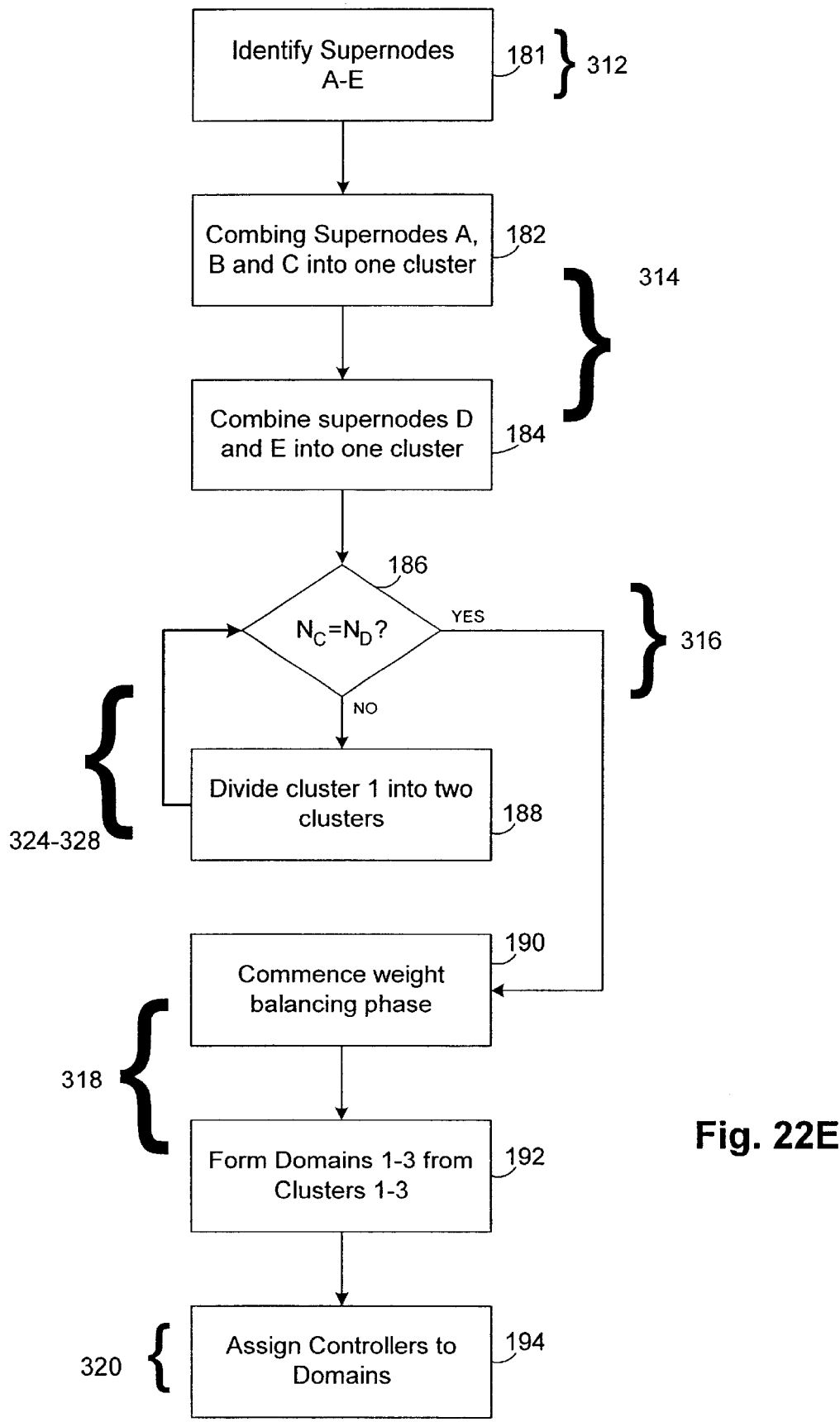
FIG. 22E is a flow diagram of the process performed in the example of FIGS. 21A–21D.

Supernodes A–E are identified (step 180) as shown in FIG. 22B. Supernode identification is described above. Note that the supernode consisting of nodes 2, 3, 4 and 6 is a quad which encompasses supernodes of smaller dimensionality. Thus, the smaller supernodes contained in it are no longer considered. Supernodes A, B and C are combined into one cluster (step 182), since supernodes A and B have two nodes in common, and supernodes B and C have two nodes in common. Similarly, supernodes D and E form one cluster (step 184). Thus two clusters result ($N_c=2$), as shown in FIG. 22C. (This may be accomplished according to the methods described above.)

Since the number of clusters $N_C$ (2) is less than $N_D$ (3) (step 186), the larger cluster, Cluster 1, is subdivided into two clusters (step 188). This is done by isolating supernodes in the cluster that do not have any node in common, namely supernode A and supernode C. If any supernode is added to either of these, a node in the other supernode will be encountered. Supernodes A and C then become clusters. Since all nodes in the cluster are covered, the required partition of the cluster has been produced ($N_c=N_D$) (step 186) and the weight balancing phase is commenced (step 190). Domains 1–3 are then formed from clusters 1–3 (step 192), and a controller is assigned to each domain (step 194). This results in the configuration of FIG. 22D.

Example 16

Figure 23A:
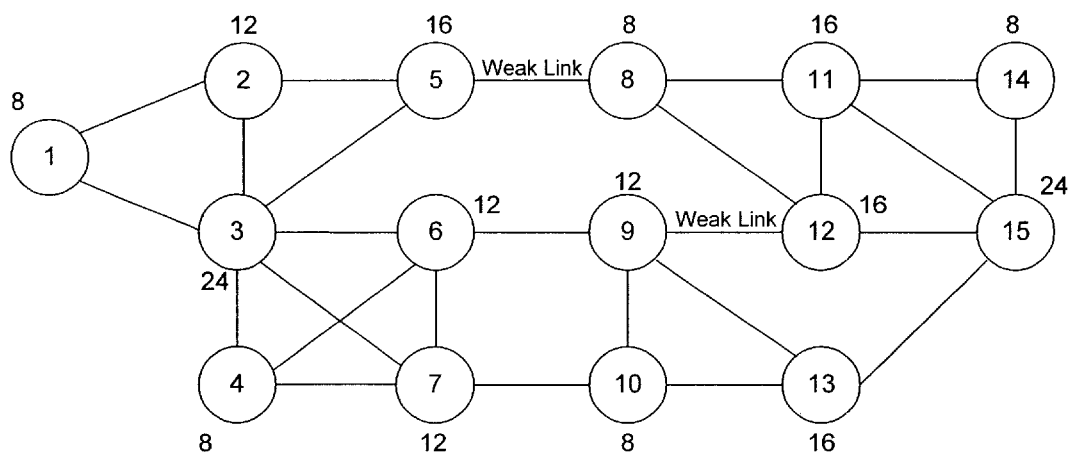
FIGS. 23A–23D illustrate an example of cluster combination.
Figure 23B:
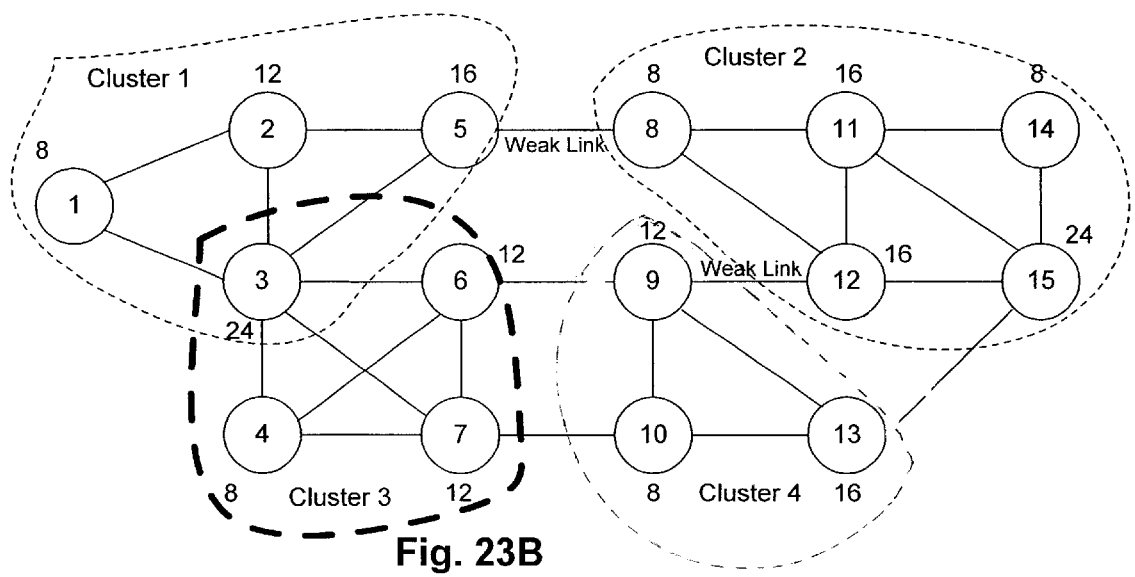
Figure 23C:
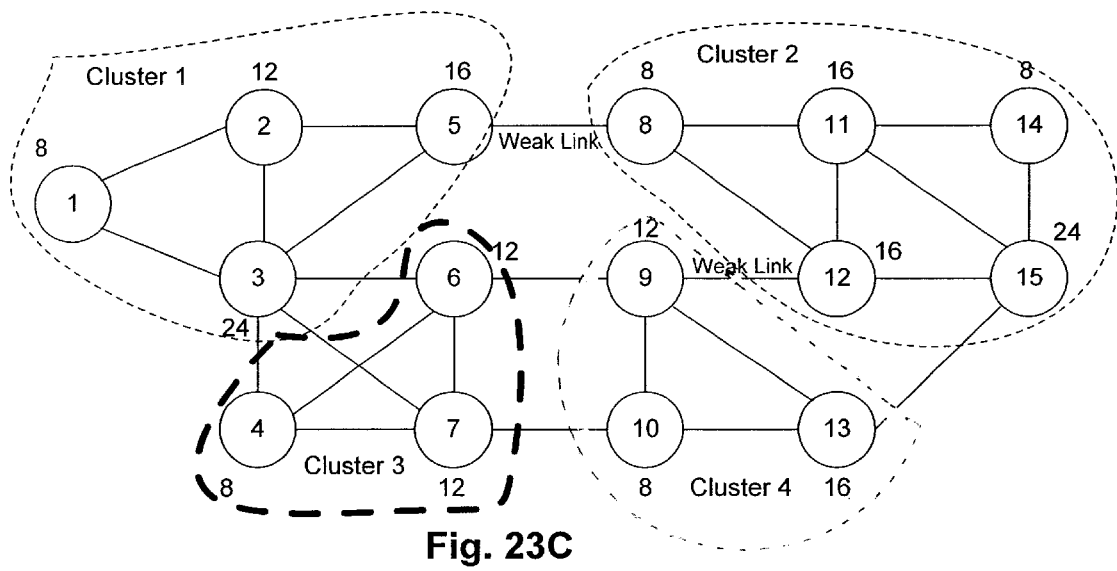
Figure 23D:
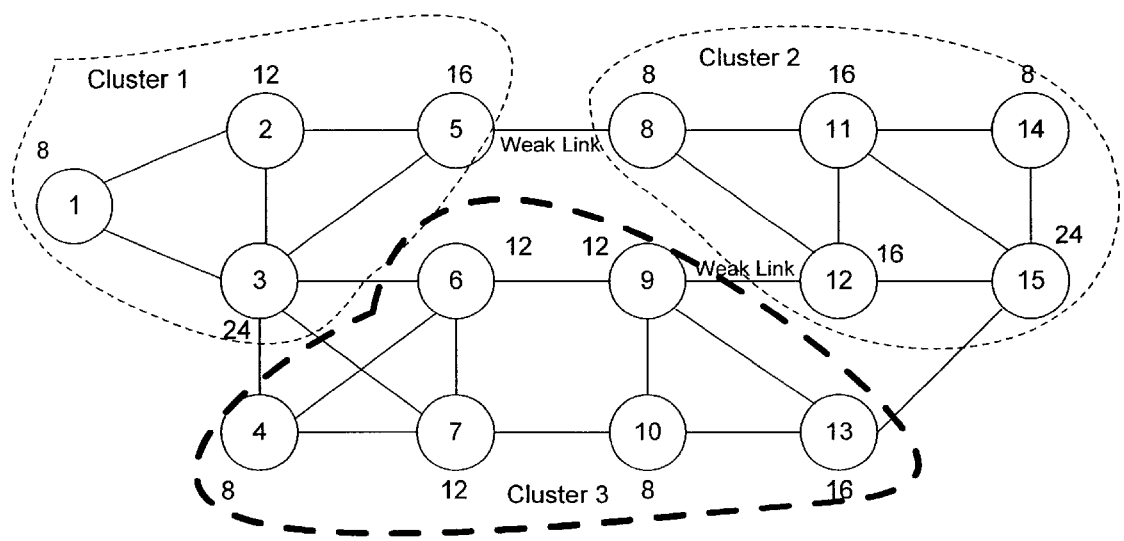
Figure 23E:
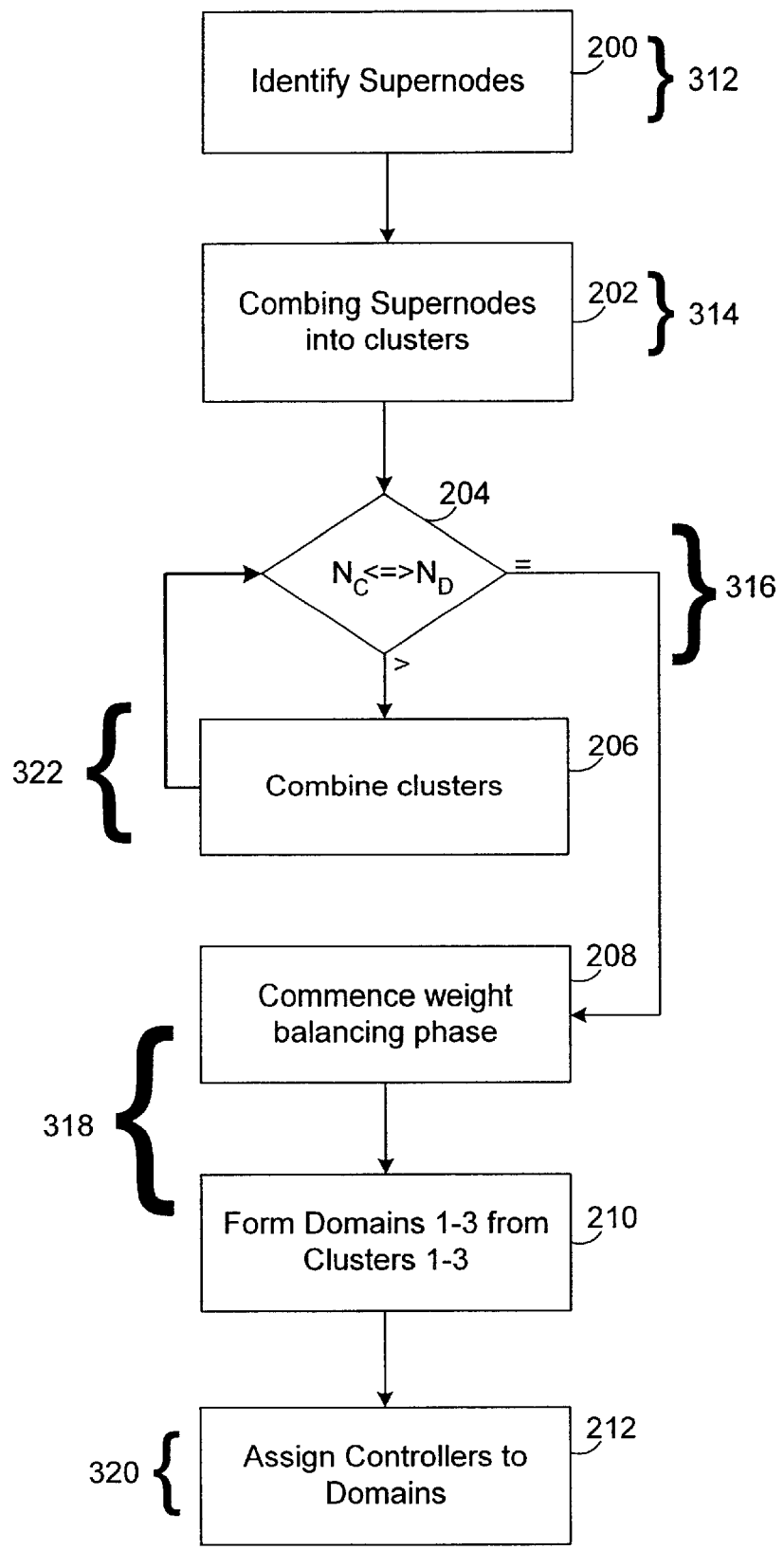
FIG. 23E is a flow chart of a process performed in the example of FIGS. 22A–22D.

In the example of FIGS. 23A–23D, a case where $N_c>N_D$ is shown. FIG. 23A shows a graph having the weights of each node listed next to the node. The graph includes weak links between nodes 5 and 8 and nodes 9 and 12. The partitioning solution is shown in the flowchart of FIG. 23E and begins with the identification of the supernodes (step 200). FIG. 23B shows four clusters, 1–4, derived from the supernodes in step 202. Cluster 1 is formed as a result of combining the supernode consisting of nodes 1, 2 and 3 and the supernode consisting of nodes 2, 3 and 5. Cluster 2 is formed as a result of combining the supernode consisting of nodes 8, 11 and 12, the supernode consisting of nodes 11, 12 and 14, and the supernode consisting of nodes 11, 14 and 15. Cluster 3 is formed as a result of converting the quad consisting of nodes 3, 4, 6 and 7 into a cluster and Cluster 4 is formed from the supernode consisting of nodes 9, 10 and 13. All the nodes in the graph are covered, and since four clusters ($N_c=4$) have been generated and there are three controllers ($N_D=3$) (step 204), clusters must be combined (step 206) to produce a total of three clusters. Since the total weight of the graph is 200, a weight in the range [59–75] (which is 200/3 plus or minus a tolerance factor t of 8; is required in each of the domains to be generated. First, it is observed that node 3 is common to cluster 1 and cluster 3. The weight of cluster 1 is 60, and the weight of cluster 3 is 56, which is below the desired range. Thus, node 3 is assigned to cluster 1. The updated configuration is shown in FIG. 23C. There are still four clusters, 1–4, with weights 60, 72, 32, and 36, respectively. Since cluster 3 and cluster 4 are the lowest-weight clusters and are adjacent via two non-weak edges between nodes 6 and 9 and nodes 7 and 10, they are combined into one cluster giving the configuration shown in FIG. 23D.

Since the number of clusters is now three, the cluster combination is complete and the domain weight balancing phase is commenced (step 208). Now the clusters are disjoint and span all the nodes. The weights of the clusters are 60, 72 and 68 respectively. Since all clusters have weights that lie within the range, the clusters are transformed into the required domains (step 210) and a controller is assigned to each domain (step 212).

Load Balancing

While the network is operating, the load on each server is monitored by the VNS. If the load on a server exceeds a specified threshold, the domain in which the server is operating can be slightly reconfigured. The VNS instructs the overloaded server to give up control of one of its edge nodes to an adjacent server which is capable of taking on another node (e.g., has a lower load). This alleviates the load on the overloaded server without the need for completely re-partitioning the network. In the preferred embodiment of the invention, the load threshold is 50% of the server's capacity. When the VNS determines that a particular server is operating above 50% capacity, it initiates the node passing method described above to alleviate the load on the server. In the case where adjacent nodes are overloaded such that passing edge nodes would not solve the overload condition, then the VNS re-partitions the network into load-balanced domains.

Figure 24:
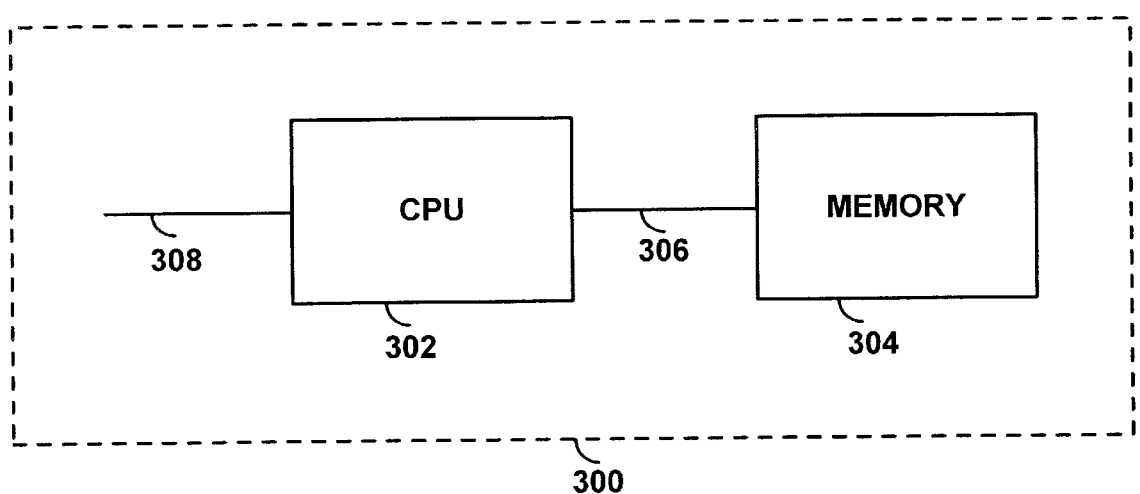
FIG. 24 illustrates a computer system which may be implemented to carry out the method of the present invention.

The method of the present invention may be implemented in a general purpose computer 300 as shown in FIG. 24. The computer may include a computer processing unit (CPU) 302, memory 304, a processing bus 306 by which the CPU can access the memory 304, and access to a network 308.

The invention may be a computer apparatus which performs the method previously described. Alternatively, the invention may be a memory 304, such as a floppy disk, compact disk, or hard drive, which contains a computer program or data structure, for providing to a general computer instructions and data for carrying out the method. In the preferred embodiment, the computer is part of a partitioning engine of a Network Management Server, as described above.

Having thus described the invention, various modifications and improvements will readily occur to those skilled in the art which are intended to be within the scope of the invention. While the invention has been described as a method for automatically partitioning a graph having a plurality of nodes interconnected by edges, where the nodes represent network devices and the edges represent links between the network devices, the method may be applied to other media. For example, the nodes of the graph which is partitioned may represent components of a VLSI chip and the edges of the graph may represent interconnections between the components, or the nodes of the graph may represent tasks to be performed on a computer in a distributed computer system and the edges may represent data dependencies among the tasks. Accordingly, the foregoing description is by way of example only, and not intended to be limiting.

What is claimed is:

1. A method for partitioning a communication network into partitions, the method comprising:
    modeling the network as a graph comprising nodes which represent network devices and edges which represent links between the devices; and
    automatically partitioning the graph;
        and wherein the partitioning step includes a step of generating partitions such that links identified as weak links are not included within any one partition.

2. The method of claim 1, further comprising assigning domain controllers to each of said partitions.

3. A method for partitioning a communication network into partitions, the method comprising:
    modeling the network as a graph comprising nodes which represent network devices and edges which represent links between the devices;
    automatically partitioning the graph; and
    assigning a weight to each node in the graph;
        and wherein the partitioning step includes a step of balancing the combined weights of the nodes in each partition.

4. The method of claim 3, wherein the generating step includes the step of determining a range of acceptable weights for each partition.

5. The method of claim 4, wherein the determining step includes the step of determining a total of the weights of all nodes in the graph divided by a number of possible domains for the graph, plus and minus a smallest weight of all of the nodes.

6. A method for partitioning a communication network, the method comprising:
    modeling the network as a graph comprising nodes which represent network devices and edges which represent links between the devices;
    automatically partitioning the graph;
    wherein the partitioning step comprises:
        a step of identifying supernodes in the graph; and
        a step of combining supernodes which have at least two nodes in common into a cluster.

7. The method of claim 6, wherein each identified supernode comprises three fully connected nodes.

8. The method of claim 7, wherein the network is partitioned into domains and the partitioning step further comprises a step of generating the domains from the clusters.

9. The method of claim 8, wherein the domains are generated around anchor nodes such that each domain includes only one anchor node.

10. A domain partitioning engine comprising:
    means for receiving, a representation of a graph comprising nodes and edges;
    means for identifying a plurality of supernodes; and
    means, responsive to the means for identifying, for automatically partitioning the graph into a number of domains, at least one of which comprises one or more of the plurality of supernodes.

11. The domain partitioning engine of claim 10, further comprising means for assigning a weight to each node in the graph; and wherein the means for partitioning includes means for to balancing the combined weights of the nodes in each respective partition.

12. The method of claim 11, wherein the means for generating includes means for determining a range of acceptable weights for each partition.

13. The domain partitioning engine of claim 10, wherein the means for identifying identifies supernodes consisting of three fully connected nodes.

14. The domain partitioning engine of claim 10, further comprising:
    means for identifying a number of anchor nodes;
    means for combining the supernodes into a number of clusters;
    means for generating each of the number of clusters around each of said number of anchor nodes, such that each cluster includes only one anchor node; and
    means for generating the number of domains from the clusters.

15. The domain partitioning engine of claim 14, further comprising means for balancing a weight of the graph between the number of domains.

16. The domain partitioning engine of claim 10, wherein the nodes represent switches in a computer network and the edges represent links between the switches.

17. The domain partitioning engine of claim 10, wherein the nodes represent components of a VLSI chip and the edges represent interconnections among the components.

18. The domain partitioning engine of claim 10, wherein the nodes represent tasks to be performed on a computer in a distributed computing system and the edges represent data dependencies among the tasks.

19. A method for using a computer to automatically partition a graph comprising a plurality of nodes interconnected by edges, the method comprising:
    (a) identifying a plurality of supernodes, each supernode comprising one or more plurality of nodes;
    (b) forming clusters including one or more of the identified supernodes; and
    (c) forming partitions from the clusters.

20. The method of claim 19, wherein the forming partitions step includes a step of forming partitions such that links identified as weak links are not included within any one partition.

21. The method of claim 19, wherein the step (b) comprises the steps of:
    combining supernodes having two or more nodes in common into a cluster, wherein a cluster is a set of nodes in which each node in the set is linked to at least two other nodes in the set;
    absorbing supernodes which share two or more nodes with a cluster into the cluster; and separating clusters having a node in common by removing the common node from one of the clusters.

22. The method of claim 19, wherein each of the nodes includes a quantifiable characteristic, the method further comprising the steps of:

(d) determining a sum of the quantifiable characteristic for each cluster; and (e) manipulating the clusters such that the sum of the quantifiable characteristic for each cluster falls within a range.

23. The method of claim 22, wherein, if the sum of a particular domain falls above the range, step (e) comprises steps of:

detecting an adjacent domain having a smaller sum; and transferring a node from the particular domain to the domain having a smaller sum.

24. The method of claim 22, wherein, if the sum of a particular domain falls below the range, step (e) comprises the steps of:

detecting an adjacent domain having a greater sum; and transferring a node from the domain having a greater sum to the particular domain.

25. The method of claim 19, wherein the nodes represent switches in a computer network and the edges represent links between the switches.

26. The method of claim 25, wherein each of the nodes includes a number of ports, the method further comprising the steps of:

(d) determining a sum of the number of ports in each cluster; and (e) manipulating the clusters such that the sum of the ports of each cluster falls within a range.

27. The method of claim 19, wherein the nodes represent tasks to be performed on a computer in a distributed computing system and the edges represent dependencies among the tasks.

28. The method of claim 19, wherein the nodes represent components on a VLSI chip and the edges represent interconnections among the components.

29. A method of automatically partitioning a graph into domains, the graph having a plurality of nodes interconnected by a plurality of edges, the method comprising:

identifying a number of anchor nodes in the graph; and combining the nodes into a number of control groups, which number is the same as the number of domains, such that each control group includes only one anchor node.

* * * * *